(12) United States Patent
Gotou et al.

(10) Patent No.: US 9,010,918 B2
(45) Date of Patent: Apr. 21, 2015

(54) INKJET RECORDING METHOD AND INKJET RECORDING DEVICE

(71) Applicants: Hiroshi Gotou, Shizuoka (JP); Hidetoshi Fujii, Shizuoka (JP)

(72) Inventors: Hiroshi Gotou, Shizuoka (JP); Hidetoshi Fujii, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/444,009

(22) Filed: Jul. 28, 2014

(65) Prior Publication Data

US 2015/0035896 A1 Feb. 5, 2015

(30) Foreign Application Priority Data

Aug. 2, 2013 (JP) .................. 2013-161538
Jul. 11, 2014 (JP) .................. 2014-143246

(51) Int. Cl.
*G01D 11/00* (2006.01)
*B41J 11/00* (2006.01)
*B41J 2/01* (2006.01)

(52) U.S. Cl.
CPC ............... *B41J 11/0015* (2013.01); *B41J 2/01* (2013.01)

(58) Field of Classification Search
CPC ................................ B41J 11/0015; B41J 2/01
USPC ................. 347/20, 21, 95, 100–101
See application file for complete search history.

(56) References Cited

U.S. PATENT DOCUMENTS

| | | | | |
|---|---|---|---|---|
| 6,010,564 A * | 1/2000 | Zhu et al. | .................. | 347/100 |
| 6,646,024 B2 * | 11/2003 | Beach et al. | .................. | 523/160 |
| 8,382,271 B2 | 2/2013 | Goto et al. | | |
| 8,746,869 B2 | 6/2014 | Matsuyama et al. | | |
| 2009/0291213 A1 | 11/2009 | Ohshima et al. | | |
| 2010/0196673 A1 | 8/2010 | Nagashima et al. | | |
| 2010/0295891 A1 | 11/2010 | Goto et al. | | |
| 2011/0057981 A1 | 3/2011 | Aruga et al. | | |

(Continued)

FOREIGN PATENT DOCUMENTS

| | | |
|---|---|---|
| JP | 2860123 | 12/1998 |
| JP | 2004-330568 | 11/2004 |

(Continued)

OTHER PUBLICATIONS

U.S. Appl. No. 14/158,969, filed Jan. 20, 2014.

(Continued)

*Primary Examiner* — Juanita D Jackson
(74) *Attorney, Agent, or Firm* — Oblon, McClelland, Maier & Neustadt, L.L.P.

(57) ABSTRACT

An inkjet recording method including applying stimuli to inkjet recording ink to make the ink jet onto recording medium, wherein the recording medium includes support, and surface layer provided on at least one surface of the support, where transfer amount of pure water with contact time of 100 ms determined by measuring the surface of the recording medium to which the surface layer is provided by dynamic scanning absorptometer is 1 to 10 mL/m$^2$, the recording medium is surface-treated through corona discharge or plasma treatment, the ink contains water-dispersible colorant, organic solvent, surfactant, and water, the organic solvent contains at least one polyhydric alcohol having equilibrium moisture content of 30% by mass or greater at 23° C. and 80% RH, and dynamic surface tension of the ink, as measured by maximum bubble pressure method with surface lifetime of 15 ms, is 35 mN/m or lower at 25° C.

9 Claims, 7 Drawing Sheets

(56) References Cited

U.S. PATENT DOCUMENTS

| | | |
|---|---|---|
| 2011/0310166 A1 | 12/2011 | Namba et al. |
| 2011/0318543 A1 | 12/2011 | Goto |
| 2012/0128949 A1 | 5/2012 | Goto |
| 2012/0207983 A1 | 8/2012 | Matsuyama et al. |
| 2012/0293582 A1 | 11/2012 | Goto et al. |
| 2012/0320137 A1 | 12/2012 | Fujii et al. |
| 2013/0002776 A1 | 1/2013 | Nagashima et al. |
| 2013/0065028 A1 | 3/2013 | Fujii et al. |
| 2013/0070017 A1 | 3/2013 | Fujii et al. |
| 2013/0071637 A1 | 3/2013 | Matsuyama et al. |
| 2013/0101814 A1 | 4/2013 | Gotou et al. |
| 2013/0113860 A1 | 5/2013 | Gotou et al. |
| 2013/0143008 A1 | 6/2013 | Gotou et al. |
| 2013/0155145 A1 | 6/2013 | Gotou et al. |
| 2013/0169724 A1 | 7/2013 | Gotou |
| 2013/0176369 A1 | 7/2013 | Gotou et al. |
| 2013/0194343 A1 | 8/2013 | Yokohama et al. |
| 2013/0194344 A1 | 8/2013 | Yokohama et al. |
| 2013/0194345 A1 | 8/2013 | Tamai et al. |
| 2013/0321525 A1 | 12/2013 | Fujii et al. |
| 2013/0323474 A1 | 12/2013 | Gotou et al. |
| 2014/0002539 A1 | 1/2014 | Goto et al. |

FOREIGN PATENT DOCUMENTS

| | | |
|---|---|---|
| JP | 2006-281767 | 10/2006 |
| JP | 2007-144975 | 6/2007 |
| JP | 2008-163238 | 7/2008 |
| JP | 2009-006485 | 1/2009 |
| JP | 2011-167968 | 9/2011 |
| JP | 2012-107210 | 6/2012 |
| JP | 2013-123852 | 6/2013 |

OTHER PUBLICATIONS

U.S. Appl. No. 14/154,595, filed Jan. 14, 2014.
U.S. Appl. No. 13/973,042, filed Aug. 22, 2013.
U.S. Appl. No. 14/348,794, filed Oct. 12, 2012.

\* cited by examiner

INKJET RECORDING METHOD AND INKJET RECORDING DEVICE

BACKGROUND OF THE INVENTION

1. Field of the Invention

The present invention relates to an inkjet recording method and an inkjet recording device.

2. Description of the Related Art

Use of an inkjet recording method has been recently rapidly increased, as a color image is easily recorded, and running cost is low. However, this method has problems that an image defect tends to occur depending on a combination of an ink and a recording medium for use, and image quality is significantly reduced.

When coated paper using filler (e.g., calcium carbonate, and kaolin) as a coating layer material, such as a commercial printing or publication printing coated paper is used as a recording medium, for example, an image may be significantly blurred, or density of the image may not be appeared. This is because the coated paper is not designed to absorb a large amount of the ink within a short period of time, unlike inkjet paper, and therefore absorption of the ink is not sufficient and hence causing blurring, or even when the ink is penetrated into a coating layer, the colorant of the ink is sealed with the filler having high sealing properties, such as kaolin, in the coating layer. Accordingly, it has been considered that this type of paper is not suitable for inkjet recording at all.

Meanwhile, as for an inkjet ink, an aqueous pigment ink, in which a pigment is turned into fine particles and dispersed in water, has been attracted attention. As a pigment has a similar composition to that of a colorant used in a typical commercial printing ink, use of such ink is expected to achieve a print which is similar to that of commercial printing. When recording is performed on a commercial printing or publication printing coated paper using the pigment ink, however, there are the following problems. Specifically, an image is blurred as absorption of an ink is insufficient, the pigment is not fixed at all after drying the ink, and sufficient glossiness cannot be achieved.

Therefore, disclosed is a recording method using a pigment ink having high permeability and a recording medium having low absorption (see Japanese Patent Application Laid-Open (JP-A) No. 2007-144975).

Moreover, disclosed is use of a heat roller as a drying auxiliary unit in order to improve drying or fixing ability on a printed surface just after printing (see Japanese Patent (JP-B) No. 2860123).

Furthermore, disclosed is to provide a protective layer with a UV varnish in order to protect a surface of paper abrasion resistance of which is reduced by pigment residues (see JP-A No. 2004-330568).

In the case where commercial printing or publication printing is performed, it is often necessary to output several hundreds to several thousands prints at once. Therefore, a printer for use needs to continuously and stably produce an image without causing any image defect. If an inkjet printer is used for this use, a problem is particularly clocking or nozzle due to drying of an ink, or formation of lines in an image due to an obscured ejection angle by the dried ink adhered around the nozzle. The most effect method for preventing this problem is to add a water-soluble organic solvent having a high boiling point to an ink to prevent drying of the ink.

The method disclosed in JP-A No. 2007-144975, however, has a problem that it takes to a long time for the ink to become a state, where the ink is not blurred even with abrasion (fixed state), if a recording medium having extremely low ink absorption, such as a commercial printing sheet, is combined with an ink containing a water-soluble organic solvent having a high boiling point, which has a high effect of preventing drying of a printer head (clogging of a nozzle). When inkjet recording for commercial printing is performed in accordance with the method disclosed in JP-A No. 2007-144975, therefore, it takes a long time for fixing, and it cannot be used if it is desired to send out the prints, as flyers or catalogs, just after the printing.

The method disclosed in JP-B No. 2860123 uses a solvent ink containing aliphatic hydrocarbon as a main component, and therefore there is a problem that a large load is provided to the environment, as a volatile organic compound is released by heating.

In accordance with the method disclosed in JP-A No. 2004-330568, moreover, a heating unit is necessary for image formation, and the UV varnish needs to be cured by a UV lamp after ejecting the UV varnish on an entire surface of a paper medium by a post-processing unit. Therefore, there is a problem that a device for use is complicated, as well as a large load is provided to the environment.

SUMMARY OF THE INVENTION

The present invention aims to provide an ideal inkjet recording method, which can realize high quality full-color recording on a commercial printing sheet at high speed, and is excellent drying performance of an ink and produces recorded matter having excellent abrasion resistance.

As the means for solving the aforementioned problems, the inkjet recording method of the present invention includes:

applying stimuli to an inkjet recording ink to make the inkjet recording ink jet onto a recording medium to thereby form an image, wherein the recording medium contains a support, and a surface layer provided on at least one surface of the support, where a transfer amount of pure water with contact time of 100 ms determined by measuring the surface of the recording medium to which the surface layer is provided by means of a dynamic scanning absorptometer is 1 mL/m$^2$ to 10 mL/m$^2$, wherein the recording medium is surface treated through a corona discharge treatment, or a plasma treatment, wherein the inkjet recording ink contains a water-dispersible colorant, an organic solvent, a surfactant, and water, wherein the organic solvent contains at least one polyhydric alcohol, which has an equilibrium moisture content of 30% by mass or greater at temperature of 23° C. and relative humidity of 80%, and wherein a dynamic surface tension of the inkjet recording ink, as measured by a maximum bubble pressure method with surface lifetime of 15 ms, is 35 mN/m or lower at 25° C.

The present invention can solve the aforementioned various problems in the art, achieves the aforementioned object, and provides an inkjet recording method, which can realize high quality full-color recording on a commercial printing sheet at high speed, and is excellent drying performance of an ink and produces recorded matter having excellent abrasion resistance.

Figure 1:
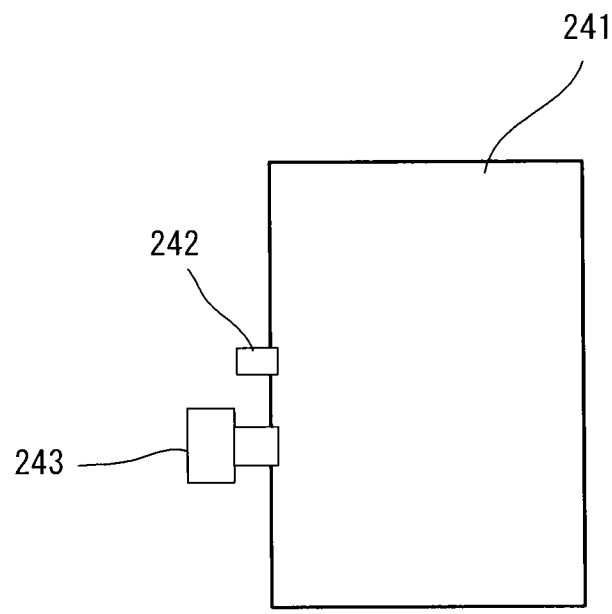
FIG. 1 is a schematic diagram illustrating one example of an ink cartridge.

DETAILED DESCRIPTION OF THE INVENTION (Inkjet Recording Method and Inkjet Recording Device)

The inkjet recording method of the present invention contains at least an inkjet step, and may further contain appropriately selected other steps according to the necessity.

The inkjet recording device of the present invention contains at least an inkjet unit, and may further contain a surface treatment unit, and appropriately selected other units according to the necessity.

The inkjet recording method of the present invention is suitably carried out by the inkjet recording device of the present invention, and the inkjet step is suitably carried out by the inkjet unit. Moreover, the aforementioned other steps are suitably carried out by the aforementioned other units.

In accordance with the present invention, full-color recording of excellent quality can be performed at high speed on a commercial printing sheet, and an ideal inkjet recording method and inkjet recording device providing excellent drying performance of an ink and excellent abrasion resistance of recorded matter can be provided.

Moreover, the present invention can also deal with the following phenomena.
(1) Use of a coated paper having a surface layer (a coated layer), which has low ink absorbency, such as a printing sheet causes bleeding of a solid image (a phenomenon that spots-like unevenness is made in an image by joining adjacent dots), or color bleeding between colors.
(2) Use of conventionally researched polyvalent metal salt for a pretreatment agent makes fixing of an ink difficult.
(3) A pretreatment agent significantly improves beading of a solid image or color bleeding between colors, but glossiness of an image is low.

<Inkjet Step and Inkjet Unit>

The inkjet step contains applying stimuli to an inkjet recording ink (may be also referred to as a "recording ink, or an "ink" hereinafter) to make the recording ink jet to thereby record an image on a recording medium, and is carried out by an inkjet unit.

The inkjet unit is appropriately selected depending on the intended purpose without any limitation, and examples thereof include various inkjet nozzles for ejecting an ink.

The stimuli can be generated, for example, by the stimuli generating member. Examples of the stimuli is appropriately selected depending on the intended purpose without any limitation, and examples thereof include heat (temperature), pressure, vibration, and light. These may be used alone, or in combination. Among them, heat and pressure are preferable.

Note that, examples of the stimuli generating member include a heating device, a pressure device, a piezoelectric element, a vibration generator, an ultrasonic wave oscillator, and a light. Specific examples thereof include: a piezoelectric actuator, such as a piezoelectric element; a thermal actuator utilizing a phase change due to film boiling of a liquid caused by using an electric-heat transducer, such as a heat element; a shape memory actuator utilizing a metal phase change caused by a temperature change; and an electrostatic actuator utilizing electrostatic force.

An embodiment of the jet of the inkjet recording ink is not particularly limited, and varies depending on the stimuli for use. In the case where the stimuli is "heat," for example, there is a method, in which thermal energy corresponding to a recording signal is applied to the recording ink present in a recording heat, for example, by a thermal heat to generate air bubbles in the ink due to the thermal energy, and the recording ink is ejected and jetted as droplets from nozzle openings of the recording head by the pressure from the air bubbles. In the case where the stimuli is "pressure," for example, there is a method, in which voltage is applied to a piezoelectric element adhered to a location, so-called a pressure chamber, in the ink flow channel within the recording head to bend the piezoelectric element, and as a result, the volume of the pressure chamber is reduced to thereby eject and jet the recording ink as droplets from nozzle openings of the recording head.

<<Recording Medium>>

The recording medium is appropriately selected depending on the intended purpose without any limitation, provided that it is a recording medium having a surface layer at least on one surface of a support. In view of required image quality to be achieved, preferred are general-purpose printing sheets, such as those called as coated paper, glossy paper, coated paper, art paper, and super art paper. In order to form an image having excellent image quality (image density, saturation, beading, color bleeding), as well as excellent drying performance and fixing ability, liquid absorption properties need to be within certain ranges. Among those listed above, therefore, used is a recording medium, in which a transfer amount of pure water at the contact time of 100 ms, determined by measuring a side of the recording medium where a surface layer is provided by means of a dynamic scanning absorptometer, is 1 mL/m$^2$ to 10 mL/m$^2$. The transfer amount of pure water is preferably 2 mL/m$^2$ to 8 mL/m$^2$. When the transfer amount thereof is in the range of 1 mL/m$^2$ to 10 mL/m$^2$, absorption of an ink is excellent, and image fixing of a resulting image after being dried is excellent without blurring the image. Therefore, such a transfer amount is suitable for glossy commercial print image.

Note that, the transfer amount of pure water is a value before the recording medium is subjected to surface modification through a corona discharge treatment or a plasma treatment.

Here, the dynamic scanning absorptometer (Journal from Japan Technical Association of the Pulp and Paper Industry, Vol. 48, May 1994, pp 88-92, Kukan Shigenori) is a device that can accurately measure a liquid absorption amount during a very short period of time. This device automates the measurement through a method (i) a speed of liquid absorption is directly read from a movement of meniscus in a capillary; or a method (ii), in which a disc-shaped sample is prepared, an liquid absorption head is scanned over the sample in a spiral manner, the scanning speed is automatically changed according to a predetermined pattern, and one sample is used for measurements of a required number of dots. The head for supplying liquid to the paper sample is connected to the capillary via a Teflon (registered trademark) tube. The position of the meniscus in the capillary is automatically read by an optical sensor. Specifically, the transfer amount of pure water is measured by means of a dynamic scanning absorptometer (KM500win type, manufactured by Kumagai Riki Kogyo Co., Ltd.). The transfer amount of pure time at the contact time of 100 ms can be determined by interpolation of the measurements of the transfer amount with contact times around each contact time.

—Support—

The support is appropriately selected depending on the intended purpose without any limitation, and examples thereof include paper mainly formed of wood fibers, and a sheet material (e.g. nonwoven fabric) mainly formed of wood fibers and synthetic fibers.

The paper is appropriately selected from those known in the art depending on the intended purpose without any limitation, and examples thereof include wood pulp, and recycled pulp. Examples of the wood pulp include hardwood bleached kraft pulp (LBKP), softwood bleached kraft pulp (NBKP), NBSP, LBSP, GP, and TMP.

Examples of raw materials for the recycled pulp include super white, white with rule marks, cream white, cards, extra super white, medium white, simili paper, color white, Kent paper, white art paper, special high cut, another high cut, news paper, and magazines shown in the used paper standard quality specification table specified by Paper Recycling Promotion Center. These may be used alone, or in combination.

The used paper pulp is generally produced by the combination of the following four steps.

(1) In disaggregation, used paper is broken into filaments by mechanical force and chemicals by means of a pulper and print ink are detached from filaments;
(2) In dusting, foreign substances (such as plastics) and dirt in the used paper is removed by screens and cleaners;
(3) In deinking, print ink detached from the filaments using surfactants is removed out by the flotation or cleaning technique; and
(4) In bleaching, the filaments are whitened by oxidization or reduction.

In the case where the used paper pulp is mixed, the blending ratio of the used paper pulp in the total pulps is preferably 40% or lower to prevent curling after recording.

As for internal filler used in the support, for example, a conventional pigment is used as a white pigment. Examples of the white pigment include light calcium carbonate, heavy calcium carbonate, kaolin, clay, and talc. These may be used alone, or in combination.

Examples of an internal sizing agent used for making the support include neutral rosin-based sizing agent used to make neutral sheets, alkenyl succinic anhydride (ASA), alkyl ketene dimer (AKD), and petroleum resin-based sizing agent. Among these, the neutral rosin-based sizing agent and alkenyl succinic anhydride are particularly preferable.

A thickness of the support is appropriately selected depending on the intended purpose without any limitation, but the thickness thereof is preferably 50 μm to 300 μm. A basis weight of the support is appropriately selected depending on the intended purpose without any limitation, but the basis weight thereof is preferably 45 g/m$^2$ to 290 g/m$^2$.

—Surface Layer—

The surface layer contains a pigment, and a binder, and may further contain a surfactant, and other components according to the necessity.

As for the pigment, an inorganic pigment, or a combination of an inorganic pigment and an organic pigment can be used.

Examples of the inorganic pigment include kaolin, talc, heavy calcium carbonate, and light calcium carbonate. Among them, kaolin is particularly preferable, because it exhibits excellent gloss and yields texture close to offset printing sheets.

Examples of the organic pigment include a water-soluble dispersion of styrene-acryl copolymer particles, styrene-butadiene copolymer particles, polystyrene particles, or polyethylene particles. These may be used alone, or in combination.

As for the binder, an aqueous resin is preferably used.

As for the aqueous resin, a water-soluble resin, or a water-dispersible resin, or both thereof is preferably used. The water-soluble resin is appropriately selected depending on the intended purpose without any limitation, and examples thereof include polyvinyl alcohol, anion-modified polyvinyl alcohol, cation-modified polyvinyl alcohol, acetal-modified polyvinyl alcohol, polyester, polyurethane, and a copolymer of polyester and polyurethane. These may be used alone, or in combination.

The water-dispersible resin is appropriately selected depending on the intended purpose without any limitation, and examples thereof include polyvinyl acetate, an ethylene-vinyl acetate copolymer, polystyrene, and a styrene-(meth)acrylate copolymer. Moreover, the aqueous resin may contain a crosslinking agent, such as methylol melamine, methylol urea, methylol hydroxypropylene urea, and isocyanate, or may be a self-crosslinkable copolymer containing a unit, such as N-methylolacrylamide. These aqueous resins can be used in combination.

An amount of the aqueous resin added is appropriately selected depending on the intended purpose without any limitation, but the amount thereof is preferably 2 parts by mass to 100 parts by mass, more preferably 3 parts by mass to 50 parts by mass, relative to 100 parts by mass of the pigment. The amount of the aqueous resin is determined so that the liquid absorption properties of the recording medium fall into the desired range.

In the case where a water-dispersible colorant is used as the colorant, it is not necessary to add a cationic organic compound to the surface layer. The cationic organic compound added to the surface layer is appropriately selected depending on the intended purpose without any limitation. Examples of the cationic organic compound added to the surface layer include monomers, oligomers, polymers of primary to tertiary amine and quaternary ammonium salt that react with sulfonic, carboxyl, or amino group in the direct dyes or acidic dyes in the aqueous ink to form insoluble salts. Among them, the oligomers or polymer is preferable.

Examples of the cationic organic compound include dimethylamine-epichlorhydrin polycondensate, and dimethylamine-ammonia-epichlorhydrin polycondensate. These may be used alone, or in combination.

Among them, preferred are dimethylamine-epichlorhydrin polycondensate, and a combination of a low molecular weight cationic organic compound (e.g., polyarylamine hydrochloride) and another relatively high molecular weight cationic organic compound (e.g., poly(diaryldimethylammonium chloride)). Combined use improves image densities and further reduces feathering compared to individual use.

A cation equivalent of the cationic organic compound determined by a colloid titration method (using potassium polyvinyl sulfate, and toluidine blue) is appropriately selected depending on the intended purpose without any limitation, but the cation equivalent is preferably 3 meq/g to 8 meq/g. When the cation equivalent is within the aforementioned range, a desirable range of the dry deposition amount can be attained.

For determining the cation equivalent by the colloid titration method, the cationic organic compound is diluted with water to a solid content of 0.1% by mass and no pH adjustment is conducted.

A dry deposition amount of the cationic organic compound is appropriately selected depending on the intended purpose without any limitation, but it is preferably 0.3 g/m² to 2.0 g/m². When the deposition amount of the cationic organic compound 0.3 g/m² or greateron dry basis, effects of sufficiently improving image densities and reducing feathering can be obtained.

A surfactant optionally added to the surface layer is appropriately selected depending on the intended purpose without any limitation, and examples thereof include an anionic active agent, a cationic active agent, an amphoteric active agent, and a nonionic active agent. Among them, a nonionic active agent is particularly preferable. By adding the surfactant, water resistance of the resulting image improves, and the resulting image has higher image density with improved bleeding.

Examples of the nonionic active agent include higher alcohol ethylene oxide adducts, alkylphenol ethylene oxide adducts, and fatty acid ethylene oxide adducts. These may be used alone, or in combination.

The polyhydric alcohol is appropriately selected depending on the intended purpose without any limitation, and examples thereof include glycerol, trimethylol propane, pentaerythrit, sorbitol, and sugar. As for the ethylene oxide adducts, ethylene oxide partly substituted by alkylene oxide such as propylene oxide or butylene oxide is also effective as long as they remain water-soluble. The substitute rate is preferably 50% or lower. The HLB (hydrophilic/lipophilic balance) of the nonionic active agent is appropriately selected depending on the intended purpose without any limitation, but it is preferably 4 to 15, more preferably 7 to 13.

An amount of the surfactant added is appropriately selected depending on the intended purpose without any limitation, but the amount thereof is preferably 10 parts by mass or less, more preferably 0.1 parts by mass to 1.0 part by mass, relative to 100 parts by mass of the cationic organic compound.

Other components may be further added to the surface layer according to the necessity, provided that they do not adversely affect the object and obtainable effect of the present invention. Examples of other components include additives such as alumina powder, a pH regulator, a preservative, and antioxidant.

A formation method of the surface layer is appropriately selected is depending on the intended purpose without any limitation. The surface layer can be formed by a method, in which a surface layer solution is impregnated or applied on the support. The method for impregnating or applying the surface layer solution is appropriately selected depending on the intended purpose without any limitation. For example, it can be applied by various coaters such as a conventional size press, gate roll size press, film transfer size press, blade coater, rod coater, air knife coater, and curtain coater. Among them, a conventional size press, gate roll size press, or film transfer press, which is equipped in the papermaking machine, can be used for impregnation or deposition, which is followed by on-machine finishing in view of cost.

A deposition amount of the surface layer solution is appropriately selected depending on the intended purpose without any limitation, but it is preferably 0.5 g/m² to 20 g/m², more preferably 1 g/m² to 15 g/m² on solid basis.

After the impregnation or application of the surface layer solution, the surface layer solution may be dried, as necessary. In this case, the to temperature for drying is appropriately selected depending on the intended purpose without any limitation, but it is preferably 100° C. to 250° C.

The recording medium may further contain a back layer on the back surface of the support, or between the support and the surface layer. Another layer may be formed between the support and the back layer. Moreover, a protective layer may be optionally provided on the surface layer. Each of these layers may be a single layer, or a multi layer.

The recording medium is not particularly limited, and a commercial product may be used as the recording medium. Examples of the commercial product include: Ricoh Business Coat Gloss 100 (manufactured by Ricoh Company Limited); OK Top Coat+, OK Kanefuji+, and SA Kanefuji+ (all manufactured by Oji Paper Co., Ltd.); Super MI Dull, Aurora Coat, and Space DX (all manufactured by NIPPON PAPER INDUSTRIES CO., LTD.); a Mat, and Mu Coat (both manufactured by Hokuetsu Paper Mills, Ltd.); Raicho Art, and Raicho Super Art (all manufactured by Chuetsu Pulp & Paper Co., Ltd.); and Pearl Coat N (manufactured by Mitsubishi Paper Mills Limited).

The recording medium is surface modified through a corona discharge treatment or a plasma treatment by a surface treatment unit. The polymer material contained in the surface layer of the recording medium is modified by performing the corona discharge treatment or the plasma treatment. When image formation is performed on a surface-modified recording medium, drying performance of an ink is excellent, and beading and color bleeding can be prevented.

The surface treatment unit may be provided inside, or outside of the inkjet recording device. In view of deterioration of surface modification, and handling associated with divided devices, the surface treatment unit is preferably provided inside the inkjet recording device.

The corona discharge treatment can be performed by means of a commercially available corona discharge device, such as a corona surface modification evaluation device TEC-4AX manufactured by KASUGA ELECTRIC WORKS LTD.

The throughput rate at the time when the corona discharge treatment is performed is appropriately selected depending on the intended purpose without any limitation, but the throughput rate is preferably 20 W·min/m² to 1,000 W·min/m², more preferably 50 W·min/m² to 500 W·min/m².

The plasma treatment can be performed by a commercially available plasma treatment device, such as a plasma shower irradiation device PS-601SW, manufactured by Asakusa Machinery Co., Ltd.

The throughput rate at the time when the plasma treatment is performed is appropriately selected depending on the intended purpose without any limitation, but it is preferably 20 W·min/m² to 1,000 W·min/m², more preferably 50 W·min/m² to 500 W·min/m².

When the throughput rate of the corona discharge treatment or the plasma treatment is too low, effects, such as (1) a surface cleaning effect (improvement of wetting ability through removal of dirt), (2) a rough surface effect (improvement of binding ability through formation of molecular-order irregularities on a surface), (3) an active effect (improvement of wetting ability through providing hydrophilic groups to a polymer on a surface), and (4) a minute porous treatment effect (improvement of penetration by minute pores) are reduced. Therefore, drying failures, beading, and color bleeding may not be inhibited.

When the throughput rate of the corona discharge treatment or the plasma treatment is too high, on the other hand, a damage made on a commercial printing sheet becomes significant to cause deterioration of the commercial printing sheet, and at the same time, the surface is significantly roughened. Therefore, it may be difficult to attain spherical dots.

<<Inkjet Recording Ink>>

The inkjet recording ink for use in the present invention contains at least a water-dispersible colorant, an organic solvent, a surfactant, and water, preferably further contains a penetrating agent and a water-dispersible resin, and may further contain other components according to the necessity.

<<<Organic Solvent>>>>

The ink for use in the present invention contains, as an organic solvent, at least one polyhydric alcohol having an equilibrium moisture content of 30% by mass or greater at the temperature of 23° C. and relative humidity of 80%. Use of the aforementioned polyhydric alcohol can improve an effect of improving ejection stability, or preventing the waste ink from adhering inside a maintaining device of an ink ejection device.

The polyhydric alcohol is appropriately selected depending on the intended purpose without any limitation, and examples thereof include 1,2,3-butanetriol (38% by mass), 1,2,4-butanetriol (41% by mass), glycerin (49% by mass), diglycerin (38% by mass), triethylene glycol (39% by mass), tetraethylene glycol (37% by mass), diethylene glycol (43% by mass), and 1,3-butanediol (35% by mass).

In the above, the equilibrium moisture content at temperature of 23° C. and relative humidity of 80% is depicted in the brackets. These polyhydric alcohols may be used alone, or in combination. Among them, particularly preferred are glycerin, and 1,3-butanediol.

The equilibrium moisture content of the polyhydric alcohol can be measured by storing a laboratory dish, in which 1 g of the polyhydric alcohol is weighed, in a desiccator the temperature and relative humidity of which has been maintained at 23° C.±1° C., and 80%±3%, respectively, using a potassium chloride/sodium chloride saturated aqueous solution. The equilibrium moisture content of the polyhydric alcohol can be calculated from the following equation 1.

(Mass of moisture absorbed by polyhydric alcohol)/
(Mass of polyhydric alcohol+Mass of moisture
absorbed by polyhydric alcohol)×100     [Equation 1]

An amount of the polyhydric alcohol in the recording ink is appropriately selected depending on the intended purpose without any limitation, but the amount thereof is preferably 2% by mass to 50% by mass, more preferably 5% by mass to 40% by mass. When the amount thereof is 2% by mass or greater, ejection stability is secured. When the amount thereof is 50% by mass or less, an excellent image can be attained without causing beading even in the case where the image having a large ink deposition amount is formed on a commercial printing sheet.

Note that, the recording ink may further contain other organic solvents, which have an equilibrium moisture content of less than 30% by mass at the temperature of 23° C., and the relative humidity of 80%.

Examples of other organic solvents include: polyhydric alcohol having an equilibrium moisture content of less than 30% by mass at 80% RH, such as dipropylene glycol, 1,5-pentanediol, propylene glycol, 2-methyl-2,4-pentanediol, ethylene glycol, tripropylene glycol, hexylene glycol, polyethylene glycol, polypropylene glycol, 1,6-hexanediol, 1,2,6-hexanetriol, trimethylol ethane, and trimethylol propane; polyhydric alcohol alkyl ether, such as ethylene glycol monoethyl ether, ethylene glycol monobutyl ether, diethylene glycol monomethyl ether, diethylene glycol monoethyl ether, diethylene glycol monobutyl ether, ethylene glycol mono-2-ethylhexyl ether, and propylene glycol monoethyl ether; polyhydric alcohol aryl ether, such as ethylene glycol monophenyl ether, and ethylene glycol monobenzyl ether; a nitrogen-containing heterocyclic compound, such as 2-pyrrolidone, N-methyl-2-pyrrolidone, 1,3-dimethyl-2-imidazolidinone, ε-caprolactam, and γ-butyrolactone; amide, such as formamide, N-methylformamide, N,N-dimethylformamide, and N,N-diethylformamide; amine, such as monoethanol amine, diethanol amine, triethanol amine, N,N-dimethyl monoethanol amine, N-methyl diethanol amine, N-methylethanol amine, N-phenyl ethanol amine, and 3-aminopropyl diethyl amine; a sulfur-containing compound, such as dimethyl sulfoxide, sulfolane, and thiodiglycol; propylene carbonate; and ethylene carbonate. These may be used alone, or in combination.

Moreover, it is preferred that at least one selected from compounds represented by the following general formulae (I) and (II) be added. Furthermore, it is preferred that the amide compound represented by the following structural formula (1). Use of the amide compound represented by the general formula (I), or the oxetane compound represented by the general formula (II), or both in combination give excellent ejection stability at the time of ejection of an ink, and drying performance of the ink. The reasons for this is probably because these compounds are a hydrophobic group-rich in a balance between hydrophilic groups and hydrophobic groups, and thus the resulting ink easily penetrates into a recording medium.

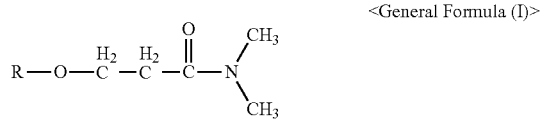

<General Formula (I)>

In the general formula (I), R is a C4-C6 alkyl group.

Examples of the C4-C6 alkyl group include a butyl group, an isobutyl group, a tertiary butyl group, a pentyl group, an isopentyl group, a hexyl group, and an isohexyl group.

<General Formula (II)>

In the general formula (II), $R_1$ is a hydrogen atom, a C1-C8 alkyl group, a cyclohexyl group, or an aryl group, and $R_2$ is a methyl group or an ethyl group.

Examples of the C1-C8 alkyl group for $R_1$ include a methyl group, an ethyl group, a propyl group, an isopropyl group, a butyl group, an isobutyl group, a tertiary butyl group, a pentyl group, an isopentyl group, a hexyl group, an isohexyl group, a heptyl group, an isoheptyl group, an octyl group, and an isooctyl group.

Examples of the aryl group for $R_1$ include a phenyl group, a tolyl group, and a xylyl group.

Specific examples of the amide compound represented by the general formula (I) are listed below, but examples thereof are not limited to the following compounds.

[Structural Formula (I-1)]

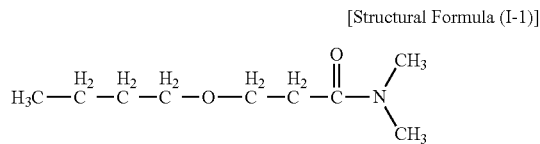

[Structural Formula (I-2)]

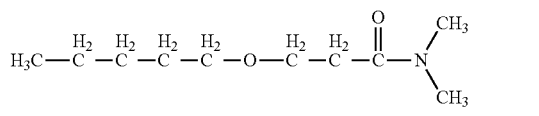

[Structural Formula (I-3)]

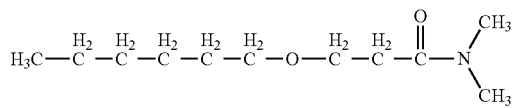

Specific examples of the oxetane compound represented by the general formula (II) are listed below, but examples thereof are not limited to the following compounds.

[Structural Formula (II-1)]

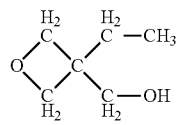

[Structural Formula (II-2)]

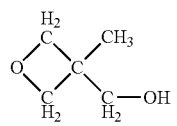

[Structural Formula (II-3)]

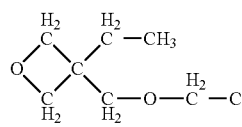

[Structural Formula (II-4)]

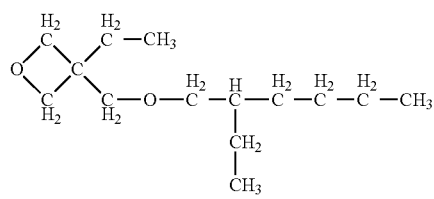

[Structural Formula (II-5)]

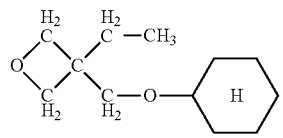

[Structural Formula (II-6)]

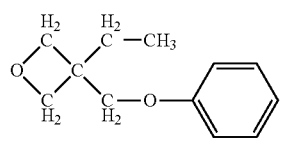

A total amount of the amide compound represented by the general formula (I) and the oxetane compound represented by the general formula (II) is preferably 1% by mass to 50% by mass, more preferably 2% by mass to 40% by mass, and even more preferably 3% by mass to 30% by mass. When the amount thereof is 1% by mass or greater, an excellent penetrating effect is attained, and an effect of improving image quality is attained. Moreover, an effect of improving a drying performance of a resulting ink to general-purpose printing sheets can be attained. When the amount thereof is 50% by mass or less, moreover, an appropriate ink viscosity is attained, to thereby achieve excellent ejection stability.

The inkjet recording ink preferably contains an amide compound represented by the following structural formula (1). The amide compound represented by the structural formula (1) is preferably used, because the amide compound represented by the structural formula (1) can reduce a viscosity of a recording ink, in which the amide compound represented by the general formula (I), the oxetane compound represented by the general formula (II), or both can be mixed and used.

<Structural Formula (1)>

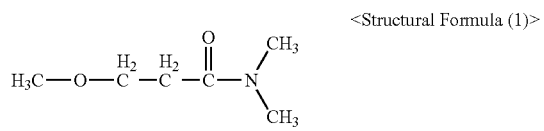

The amide compound represented by the structural formula (1) has a high boiling point, i.e., 216° C., and also a high equilibrium moisture content at the temperature of 23° C., and relative humidity of 80%, i.e., 39.2% by mass, and an extremely low fluid viscosity at 25° C., i.e., 1.48 mPa·s, and therefore a viscosity of a recording ink can be made low. Accordingly, the amide compound represented by the structural formula (1) is extremely preferable as an organic solvent.

An amount of the amide compound represented by the structural formula (1) in the inkjet recording ink is preferably 1% by mass to 50% by mass, more preferably 2% by mass to 40% by mass. When the amount thereof is 1% by mass or greater, a resulting ink has an appropriately low viscosity. When the amount thereof is 50% by mass or less, an excellent drying performance is attained on paper, and moreover, quality of characters is improved on plane paper.

Moreover, the organic solvent preferably contains alkyl alkane diol.

As long as the alkyl alkane diol has a C3-C6 alkane diol in a principle chain, and a C1-C2 alkyl in a side chain, the alkyl alkane diol is water soluble in terms of a balance between hydrophilic groups and hydrophobic groups, and is hydrophobic group-rich. Therefore, a resulting ink containing the alkyl alkane diol easily penetrate into a recording medium. Among them, particularly preferred are 2-methyl-1,3-propanediol (bp: 214° C.), 3-methyl-1,5-pentanediol (bp: 250° C.), and 2-ethyl-1,3-hexanediol (bp: 243.2° C.).

An amount of the alkyl alkane diol in the recording ink is appropriately selected depending on the intended purpose without any limitation, but the amount thereof is preferably 2% by mass to 40% by mass, more preferably 5% by mass to 30% by mass. When the amount thereof is 2% by mass or greater, a penetrating effect to a recording medium is attained, and an effect of improving image quality is attained. Moreover, penetration of a resulting ink to a commercial printing sheet becomes excellent, and beading and color breading does not occur. When the amount thereof is 40% by mass or smaller, an appropriate viscosity of a resulting ink is attained, to thereby achieve excellent ejecting performance of the ink.

Note that, examples of other organic solvents include saccharides, and derivatives of saccharides.

The saccharides are appropriately selected depending on the intended purpose without any limitation, and examples thereof include; monosaccharides, such as glucose, mannose, fructose, ribose, xylose, arabinose, and galactose; dissacharides, such as maltose, cellobiose, lactose, sucrose, and trehalose; oligosaccharides, such as maltotriose; and polysaccharides, such as α-cyclodextrin and cellulose.

Examples of the derivatives of saccharides include; reducing sugar of saccharides of sugar alcohol (e.g., maltitol, and sorbit); oxidizing sugar, such as aldonic acid, and uronic acid; amino acid; and thio acid.

A total amount of the organic solvents for use is appropriately selected depending on the intended purpose without any limitation, but the amount thereof in the recording ink is preferably 20% by mass to 80% by mass, more preferably 30% by mass to 70% by mass. When the total amount thereof is 20% by mass or greater, penetration of a resulting ink is excellent, and excellent ejection stability is attained. In addition, the waste ink thereof does not adhered in a maintaining device. When the total amount thereof is 80% by mass or less, an appropriate viscosity of an ink is attained, and therefore the ink is excellently ejected by an ink ejection device. In addition, the ink has excellent drying performance on paper, and a quality of printed characters is excellent.

<<<Water-Dispersible Colorant>>>

The water-dispersible colorant is preferably a pigment. In the case where the colorant is a pigment, the preferable embodiments thereof include the following thirst to third embodiments.

(1) In the first embodiment, the colorant contains a pigment, which has at least one type of a hydrophilic group at a surface thereof, and exhibits water-dispersibility without a dispersing agent (may be also referred to as a "self-dispersible pigment").

(2) In the second embodiment, the colorant is a pigment dispersion liquid containing a pigment, a pigment dispersing agent, and a high molecular dispersion stabilizer, where the high molecular dispersion stabilizer is at least one selected from the group consisting of α-olefin-maleic anhydride copolymer, styrene-(meth)acryl copolymer, a water-soluble urethane resin, and a water-soluble polyester resin.

(3) In the third embodiment, the colorant contains pigment-containing polymer particles, in each of which a pigment is contained in a polymer particle.

As for the pigment, an organic pigment, or an inorganic pigment can be used. The colorant may contain a dye in order to adjust a color tone, as long as it does not deteriorate weather resistance of a resulting ink.

Examples of the inorganic pigment include titanium oxide, iron oxide, calcium carbonate, barium sulfate, aluminum hydroxide, barium yellow, cadmium red, chrome yellow, and carbon black. Among them, the carbon black is particularly preferable. Examples of the carbon black include those produced by the conventional methods such as a contact method, furnace method and thermal method.

Examples of the organic pigment include an azo pigment, polycyclic pigment, dye chelate, nitro pigment, nitroso pigment, and aniline black. Among them, the azo pigment, and polycyclic pigment are more preferable.

Examples of the azo pigment include azo lake, an insoluble azo pigment, a condensed azo pigment, and a chelate azo pigment.

Examples of the polycyclic pigment include a phthalocyanine pigment, a perylene pigment, a perynone pigment, an anthraquinone pigment, a quinacridon pigment, a dioxazine pigment, an indigo pigment, a thioindigo pigment, an isoindolinone pigment, and a quinophthalone pigment.

Examples of the dye chelate include a basic dye chelate, and an acidic dye chelate.

A color of the colorant is appropriately selected depending on the intended purpose without any limitation. For example, there are a colorant for black, and colorants for colors. These may be used alone, or in combination.

Examples of the colorant for black include: carbon blacks (C.I. Pigment Black 7) such as furnace black, lamp black, acetylene black, and channel black; metals such as copper, iron (C.I. Pigment Black 11), and titanium oxide; and organic pigments such as aniline black (C.I. Pigment Black 1).

Examples of the commercial products of the carbon black include carbon black obtained from Cabot Corporation under the trade names of Regal®, Black Pearls®, Elftex®, Monarch®, Mogul®, and Vulcan®.

Examples of the colorant for colors include: C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 128, 138, 150, 151, 153, 155, 183, 213; C.I. Pigment Orange 5, 13, 16, 17, 36, 43, 51; C.I. Pigment Red 1, 2, 3, 5, 17, 22, 23, 31, 38, 48:2, 48:2 (Permanent Red 2B(Ca)), 48:3, 48:4, 49:1, 52:2, 53:1, 57:1 (Brilliant Carmine 6B), 60:1, 63:1, 63:2, 64:1, 81, 83, 88, 101 (colcothar), 104, 105, 106, 108 (Cadmium Red), 112, 114, 122 (quinacridon magenta), 123, 146, 149, 166, 168, 170, 172, 177, 178, 179, 185, 190, 193, 209, 219; C.I. Pigment Violet 1(Rhodamine Lake), 3, 5:1, 16, 19, 23, 38; C.I. Pigment Blue 1, 2, 15 (phthalocyanine blue), 15:1, 15:2, 15:3 (phthalocyanine blue), 15:4 (phthalocyanine blue), 16, 17:1, 56, 60, 63; C.I. phthalocyanine Green 1, 4, 7, 8, 10, 17, 18, 36. Other suitable pigments for use are disclosed in The Color Index, 3rd edit. (The Society of Dyers and Colourists, 1982).

—Water-Dispersible Colorant of First Embodiment—

The water-dispersible colorant of the first embodiment is a pigment whose surface has been modified so that at least one hydrophilic group is, directly or via another atom group, bonded to the surface of the pigment. To achieve the surface modification, for example, the following methods are employed: a method in which a specific functional group (functional group such as a sulfone group and a carboxyl group) is chemically bonded to the surface of a pigment, or a method in which the surface of a pigment is subjected to wet oxidization treatment using at least one of a hypohalous acid or a salt thereof. Among them, preferred is an embodiment where a carboxyl group is bonded to a surface of a pigment, and the pigment is dispersed in water. As the pigment is surface modified in the aforementioned manner, and a carboxyl group is bonded to a surface thereof, not only the dispersion stability but also higher print quality can be obtained, and the water resistance of recording media after printing is further improved.

An ink containing the self-dispersible pigment of the first embodiment is excellent in re-dispersibility after being dried, and therefore excellent printing can be performed with a simple cleaning operation without causing clogging, even when the printing operation is stopped for a long period, and the moisture in the ink present near the inkjet heat nozzle is evaporated.

The volume average particle diameter of the self-dispersible pigment is appropriately selected depending on the intended purpose without any limitation, but the volume average particle diameter thereof in the ink is preferably 0.01 μm to 0.16 μm.

Examples of the anionic functional group in the self-dispersible pigment include —COOM, —$SO_3M$, —$PO_3HM$, —$PO_3M_2$, —$CONM_2$, —$SO_3NM_2$, —NH—$C_6H_4$—COOM, —NH—$C_6H_4$—$SO_3M$, —NH—$C_6H_4$—$PO_3HM$, —NH—$C_6H_4$—$PO_3M_2$, —NH—$C_6H_4$—$CONM_2$, and —NH—$C_6H_4$—$SO_3NM_2$ (where M is a hydrogen atom, an alkali metal, quaternary ammonium or organic ammonium, preferably quaternary ammonium). These may be used alone, or in combination.

Among them, —COOM, —SO₃M, —PO₃HM, and —PO₃M₂ are preferable, and —COOM, and —SO₃M are particularly preferable.

Examples of the alkali metal denoted by M in the functional group include lithium, sodium and potassium. Examples of the organic ammonium denoted by M include monomethyl ammonium to trimethyl ammonium, monoethyl ammonium to triethyl ammonium, and monomethanol ammonium to trimethanol ammonium. As a method of obtaining the anionically charged color pigment, examples of the method for introducing —COONa to a surface of a color pigment include a method for oxidizing a color pigment with sodium hypochlorite, a method for sulfonating a color pigment, and a method in which a color pigment is reacted with the diazonium salt.

As for the cationic hydrophilic group, for example, a quaternary ammonium group is preferable, and the quaternary ammonium groups represented by the following formulae are more preferable.

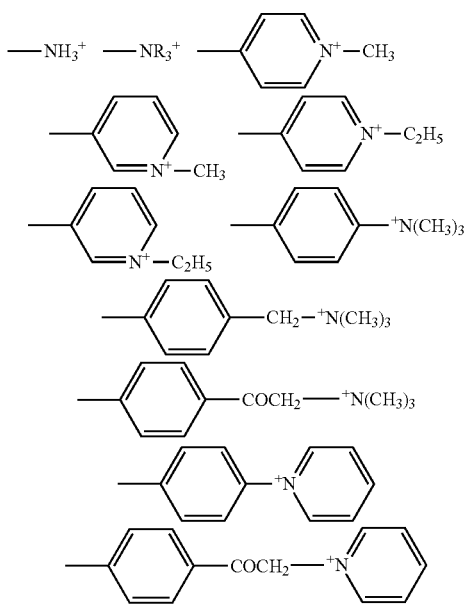

Examples of the quaternary ammonium ion include tetramethyl ammonium ion, tetraethyl ammonium ion, tetrapropyl ammonium ion, tetrabutyl ammonium ion, tetraoentyl ammonium ion, benzyltrimethyl ammonium ion, benzyl triethyl ammonium ion, and tetrahexyl ammonium ion. Among them, tetraethyl ammonium ion, tetrabutyl ammonium ion, and benzyl trimethyl ammonium ion are preferably, and tetrabutyl ammonium ion is particularly preferable.

Examples of the anionic functional group include anionic polar groups, such as a carboxylic acid group, a sulfonic acid group, a phosphate group, an amide group, a sulfonamide group, and a p-aminobenzoic acid. Among them, carboxylic acid, and p-aminobenzoic acid are preferable.

The anionic functional groups can be bonded to surfaces of pigment particles in accordance with the methods disclosed in JP-B No. 4697757, JP-A No. 2003-513137, International Application Publication No. WO 97/48769, and JP-A Nos. 10-110129, 11-246807, 11-57458, 11-189739, 11-323232, and 2000-265094.

Use of the water-dispersible pigment having the anionic functional group and quaternary ammonium ion enables to maintain the stable dispersion state of the water-dispersible pigment either in a water-rich ink, or in an organic solvent-rich ink from which the moisture has been evaporated, as the anionic functional group and quaternary ammonium ion exhibits affinity.

A method for producing a cationic self-dispersible pigment to which the hydrophilic group is bonded is appropriately selected depending on the intended purpose without any limitation. For example, there is a method where carbon black is treated with 3-amino-N-ethylpyridinium bromide, as for a method for bonding N-ethyl pyridyl group represented by the following structural formula.

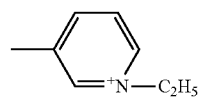

The hydrophilic group may be bonded to a surface of carbon black via another atom group.

Examples of another atom group include a C1-C12 alkyl group, a substituted or unsubstituted phenyl group, and a substituted or unsubstituted naphthyl group. Specific examples of the case where the hydrophilic group is bonded to the surface of the carbon black via another atom group include —$C_2H_4$COOM (where M is an alkali metal, or quaternary ammonium), -Ph$SO_3$M (where Ph is a phenyl group, and M is an alkali metal, or quaternary ammonium), and —$C_5H_{10}NH_3^+$.

<<Another Embodiment in First Embodiment>>

As for another embodiment within the first embodiment, preferred is a modified pigment, which is modified with a geminal bisphosphonic acid group, or a geminal bisphosphonate group.

Examples of such the modified pigment include modified pigments, which have been modified with any of the groups represented by the following structural formulae (i), (ii), (iii) and (iv).

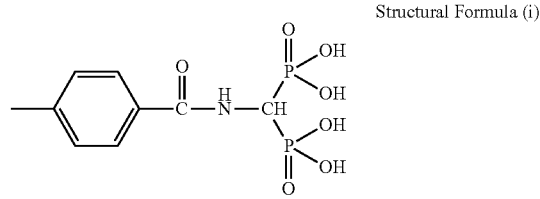

Structural Formula (i)

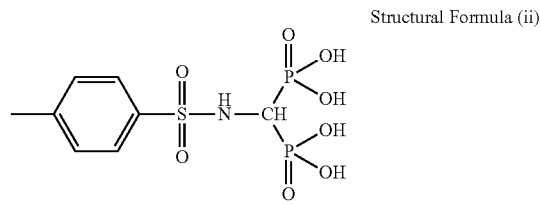

Structural Formula (ii)

Structural Formula (iii)

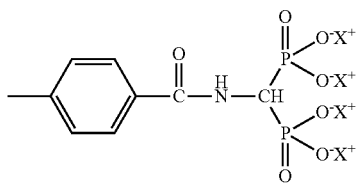

In the structural formula (iii), $X^+$ is $Li^+$, $K^+$, $Na^+$, $NH_4^+$, $N(CH_3)_4^+$, $N(C_2H_5)_4^+$, $N(C_3H_7)_4^+$ or $N(C_4H_9)_4^+$.

Structural Formula (iv)

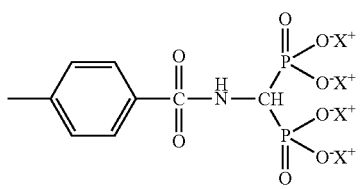

In the structural formula (iv), $X^+$ is $Li^+$, $K^+$, $Na^+$, $NH_4^+$, $N(CH_3)_4^+$, $N(C_2H_5)_4^+$, $N(C_3H_7)_4^+$ or $N(C_4H_9)_4^+$.

The surface modification will be specifically explained next.

The dispersion containing the modified pigment is prepared by means of one of the following general methods. The method is preferably a method, in which the compound represented by the following structural formula (IV) or the compound represented by the following structural formula (V) are allowed to react with a pigment, and a phosphonic acid group of a resultant is substituted with alkali metal and organic ammonium to enhance dispersibility to water.

[Compound Represented by Structural Formula (IV)]

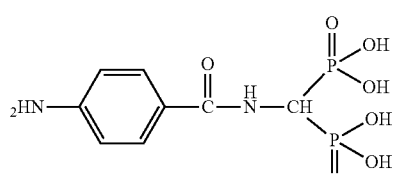

[Compound represented by Structural Formula (V)]

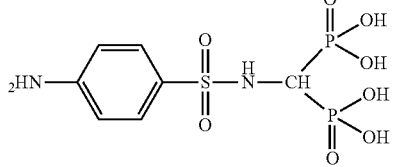

[Pigment Surface Modification Treatment]

—Method A—

By means of Silverson Mixer (6,000 rpm), 20 g of carbon black, 20 mmol of the compound represented by the structural formula (IV) or the compound represented by the structural formula (V), and 200 mL of ion-exchanged ultra-pure water are mixed at room temperature. In the case where the pH of the obtained slurry is higher than 4, 20 mmol of nitric acid is added. Thirty minutes later, sodium nitrite (20 mmol) dissolved in a small amount of ion-exchanged ultra pure water is gradually added to the aforementioned mixture. The resulting mixture is heated to 60° C. with stirring, and is allowed to react for 1 hour, to thereby generate a modified pigment, in which the compound represented by the structural formula (IV) or the compound represented by the structural formula (V) is added to the carbon black. Subsequently, the pH of the resultant is adjusted to 10 with a NaOH aqueous solution. Thirty minutes later, a modified pigment dispersion is obtained. Ultrafiltration with a permeable membrane is performed using the dispersion containing the pigment bonded with a geminal bisphosphonic acid group or geminal bisphosphonate group or both, and ion-exchanged ultra pure water, and ultrasonic wave dispersion is performed on the resultant to thereby obtain a modified pigment dispersion a solid content of which has been concentrated.

—Method B—

ProcessAll 4HV Mixer (4 L) is charged with 500 g of dry carbon black, 1 L of ion-exchanged ultra pure water, and 1 mol of the compound represented by the structural formula (IV) or the compound represented by the structural formula (V). Subsequently, the mixture is strongly mixed at 300 rpm for 10 minutes with heating to 60° C. To the resultant, a 20% by mass sodium nitrite aqueous solution [1 mole equivalent based on the compound represented by the structural formula (IV) or the compound represented by the structural formula (V)] was added over 15 minutes. The resulting mixture was mixed and stirred for 3 hours with heating to 60° C. The resulting reaction product is taken out with diluting 750 mL of ion-exchanged ultra pure water, to thereby obtain a modified pigment dispersion. Ultrafiltration with a permeable membrane is performed using the modified pigment dispersion, and ion-exchanged ultra pure water, and ultrasonic wave dispersion is performed on the resultant to thereby obtain a modified pigment dispersion a solid content of which has been concentrated. In the case where a large amount of coarse particles are contained therein, coarse particles are preferably removed by means of a centrifugal separator.

The sodium ion content of each modified pigment dispersion is measured by an ion meter. Moreover, a total amount of phosphorous is measured through elementary analysis. Furthermore, the volume average particle diameter ($D_{50}$) of the modified pigment dispersed in the dispersion is measured by means of Microtrac (registered trade mark) particle size distribution measuring device.

The volume average particle diameter ($D_{50}$) of the modified pigment dispersion in the recording ink is preferably 0.01 μm to 0.16 μm.

A recording ink containing a surface modified pigment dispersion, in which the pigment is bonded a geminal bisphosphonic acid group, or a geminal bisphosphonate group, or both, has excellent re-dispersibility after being dried. Therefore, the recording ink does not cause clogging even when printing is stopped for a long period, and moisture in the ink adjacent to an inkjet head nozzle is evaporated, and excellent printing is easily carried out with a simple cleaning operation. Moreover, the aforementioned recording ink has high stability when the ink is stored over time, and an increase in the viscosity thereof is prevented even when the moisture is evaporated therefrom. Therefore, the aforementioned recording ink is a recording ink, which prevents adherence thereof in an ink head maintaining device, and has extremely excellent ejection stability.

—Water-Dispersible Colorant of Second Embodiment—

In the second embodiment, the colorant is a pigment dispersion containing a pigment, such as an inorganic pigment, an organic pigment, and a complex pigment, a pigment dispersing agent, and a high molecular dispersion stabilizer, where the high molecular dispersion stabilizer is at least one selected from the group consisting of an α-olefin-maleic anhydride copolymer, a styrene-(meth)acryl copolymer, a water-soluble polyurethane resin, and a water-soluble polyester resin.

The high molecular dispersion stabilizer is a material effective for stably maintaining a dispersion state of a pigment dispersion, which is finely dispersed in water with a pigment dispersing agent. The α-olefin-maleic anhydride copolymer, styrene-(meth)acryl copolymer, water-soluble polyurethane resin, and water-soluble polyester resin are solids at room temperature and hardly dissolve in cold water. They however exhibit an effect as a dispersion stabilizer, when they are dissolved in an alkali solution or alkali aqueous solution equivalent to or greater than (preferably 1.0 time or greater the acid value, but 1.5 times or less the acid value) the acid value of the copolymer or resin, and are used as an alkali solution.

In order to dissolve the copolymer or resin in an alkali solution or alkali aqueous solution, heating and stirring are performed to thereby easily dissolve the copolymer or resin. In the case where a length of an olefin chain the α-olefin-maleic anhydride copolymer is long, however, it is relatively difficult to dissolve the copolymer, and insoluble residues may remain. In this case, the residues are removed with an appropriate filter, so that an effect as a dispersion stabilizer is not impaired.

Examples of the base in the alkali solution or alkali aqueous solution include: hydroxide of alkali metal, such as sodium hydroxide, potassium hydroxide, and lithium hydroxide; a basic material, such as ammonia, triethyl amine, and morpholine; and alcohol amine, such as triethanol amine, diethanol amine, N-methyldiethanol amine, 2-amino-2-ethyl-1,3-propanediol, and choline.

The α-olefin-maleic anhydride copolymer is not particularly limited, and may be appropriately synthesized for use, or selected from commercial products. Examples of the commercial products thereof include T-YP110, T-YP111, T-YP112, and T-YP113 (all manufactured by SEIKO PMC CORPORATION).

The styrene-(meth)acryl copolymer is not particularly limited, and may be appropriately synthesized for use, or selected from commercial products. Examples of the commercial products thereof include: JC-05 (manufactured by SEIKO PMC CORPORATION); and ARUFON UC-3900, ARUFON UC-3910, ARUFON UC-3920 (manufactured by TOAGOSEI CO., LTD.).

The water-soluble urethane resin is not particularly limited, and may be appropriately synthesized for use, or selected from commercial products. The commercial product thereof is appropriately selected depending on the intended purpose without any limitation, and examples thereof include TAKELAC W-5025, TAKELAC W-6010, TAKELAC W-5661 (manufactured by Mitsui Chemicals, Inc.).

The water-soluble polyester resin is not particularly limited, and may be appropriately synthesized for use, or selected from commercial products. The commercial products thereof is appropriately selected depending on the intended purpose without any limitation, and examples thereof include: NICHIGO POLYESTER W-0030, NICHIGO POLYESTER W-0005S30WO, NICHIGO POLYESTER WR-961 (manufactured by manufactured by Nippon Synthetic Chemical Industry Co., Ltd.); and PESRESIN A-210, PESRESIN A-520 (manufactured by TAKAMATSU OIL & FAT CO., LTD.).

An acid value of the high molecular dispersion stabilizer is appropriately selected depending on the intended purpose without any limitation, but the acid value thereof is preferably 40 mgKOH/g to 400 mgKOH/g, more preferably 60 mgKOH/g to 350 mgKOH/g. When the acid value is in the range of 40 mgKOH/g to 400 mgKOH/g, solubility to an alkali solution is excellent, a viscosity of the pigment is desirable, and excellent ejection ability of a resulting ink and excellent dispersion stability of a pigment dispersion can be attained.

The weight average molecular weight of the high molecular dispersion stabilizer is appropriately selected depending on the intended purpose without any limitation, but the weight average molecular weight thereof is preferably 20,000 or less, more preferably 5,000 to 20,000. When the weight average molecular weight thereof is 5,000 or greater, excellent dispersion stability of the pigment dispersion is achieved. When the weight average molecular weight thereof is 20,000 or less, excellent solubility of the alkali solution can be attained, and appropriate viscosity is achieved.

An amount of the high molecular dispersion stabilizer is appropriately selected depending on the intended purpose without any limitation, but the amount thereof is preferably 1 part by mass to 100 parts by mass on solid basis, more preferably 5 parts by mass to 50 parts by mass, relative to 100 parts by mass of the pigment. When the amount thereof is 1 part by mass or greater, an excellent effect of dispersion stability can be attained. When the amount thereof is 100 parts by mass or less, the desirable viscosity of the ink is attained, and therefore ejection of the ink from the nozzle can be excellently performed.

In the second embodiment, the colorant preferably contains a pigment dispersing agent. The pigment dispersing agent is preferably an anionic surfactant, or a nonionic surfactant having a HLB value of 10 to 20.

Examples of the anionic surfactant include polyoxyethylene alkyl ether acetic acid salt, alkyl benzene sulfonic acid salt (e.g., of $NH_4$, Na, and Ca), alkyldiphenyl ether disulfonic acid salt (e.g., of $NH_4$, Na, and Ca), dialkyl succinate sodium sulfonate (Na salt), a sodium naphthalene sulfonate-formalin condensate (Na salt), polyoxyethylene polycyclic phenyl ether sulfuric acid ester salt (e.g., of $NH_4$, and Na), lauric acid salt, polyoxyethylene alkyl ether sulfate salt, and oleic acid salt. Among them, particularly preferred are Na salt of dioctyl sulfosuccinic acid, and $NH_4$ salt of polyoxyethylene styrene phenyl ether sulfonic acid.

Examples of the nonionic surfactant having the HLB value of 10 to 20 include polyoxyethylene alkyl ether, polyoxyalkylene alkyl ether, polyoxyethylene polycyclic phenyl ether, sorbitan fatty acid ester, polyoxyethylene sorbitan fatty acid ester, polyoxyethylene alkyl phenyl ether, polyoxyethylene alkyl amine, polyoxyethylene alkyl amide, and acetylene glycol. Among them, particularly preferred are polyoxyethylene lauryl ether, polyoxyethylene-β-naphthyl ether, polyoxyethylene sorbitan mono-oleate, and polyoxyethylene styrene phenyl ether.

An amount of the pigment dispersing agent is appropriately selected depending on the intended purpose without any limitation, but the amount thereof is preferably 1 part by mass to 100 parts by mass, more preferably 10 parts by mass to 50 parts by mass, relative to 100 parts by mass of the pigment. When the amount thereof is in the range of 1 part by mass to 100 parts by mass, the pigment is sufficiently finely dispersed, and therefore image blurring, or deterioration in water resistance or abrasion resistance does not occur.

The pigment dispersion, in which the pigment is finely dispersed in water with the pigment dispersing agent, can be produced by a method containing dissolving the pigment dispersing agent in an aqueous medium, adding the pigment thereto, sufficiently wetting the pigment with the aqueous medium, and dispersing the pigment by high-speed stirring by means of a homogenizer, or a disperser using balls, such as a bead mill and a ball mill, or a knead disperser using a shearing force, such as a roll mill, or a ultrasonic wave disperser. After the aforementioned kneading and dispersing operation, however, it is often leave coarse particles, which may cause clogging of an inkjet nozzle or supply channel. Therefore, it is preferred that particles having particle diameters of 1 μm or greater be removed with a filter, or a by means of a centrifuge.

The volume average particle diameter of the pigment dispersed element is appropriately selected depending on the intended purpose without any limitation, but the volume average particle diameter thereof is preferably 150 nm or smaller in the recording ink, more preferably 100 nm or smaller. When the volume average particle diameter is 150 nm or smaller, ejection stability of a resulting ink is excellent, and clogging of a nozzle, or curvature of the jetted ink does not occur.

—Water-Dispersible Colorant of Third Embodiment—

As for the water-dispersible colorant of the third embodiment, in addition to the pigment, use of a polymer emulsion, in which a pigment is contained in polymer particles, is preferable. The polymer emulsion, in which a pigment is contained in polymer particles, is a polymer emulsion, in which a pigment is encapsulated in polymer particles, or a polymer emulsion, in which a pigment is adsorbed on surfaces of polymer particles. In this case, all of the pigment particles are not necessarily encapsulated or absorbed in or on the polymer particles, and the pigment particles may be dispersed in the emulsion as long as they do not adversely affect the obtainable effect of the present invention. Examples of the polymer (polymer of the polymer particles) for forming the polymer emulsion include a vinyl-based polymer, a polyester-based polymer, and a polyurethane-based polymer. Among them, preferred are the vinyl-based polymer and the polyester-based polymer, and more preferred are polymers disclosed in JP-A Nos. 2000-53897, and 2001-139849.

In the third embodiment, a composite pigment, in which a typical organic pigment or inorganic pigment is coated with an organic pigment or carbon black, is suitably used. The composite pigment can be produced by a method for precipitating an organic pigment under the presence of inorganic pigment particles, and a mechanochemical method in which an inorganic pigment and an organic pigment are mechanically mixed and ground. If necessary, moreover, a layer of an organosilane compound generated from polysiloxane or alkyl silane is provided between the inorganic pigment and the organic pigment so that the adhesion between the inorganic pigment and the organic pigment can be improved.

As for the organic pigment, examples of the black pigment include aniline black, and examples of the color pigment include anthraquinone, phthalocyanine blue, phthalocyanine green, diazo, monoazo, pyranthrone, perylene, heterocyclic yellow, quinacridon, and (thio)indigoid. Among them, carbon black, a phthalocyanine-based pigment, a quinacridon-based pigment, a monoazo yellow-based pigment, a disazo yellow-based pigment, and a heterocyclic yellow pigment are preferable in view of coloring abilities thereof.

Examples of the phthalocyanine blue include copper phthalocyanine blue or a derivative thereof (C.I. Pigment Blue 15:3, 15:4), and aluminum phthalocyanine.

Examples of the quinacridon include C.I. Pigment Orange 48, C.I. Pigment Orange 49, C.I. Pigment Red 122, C.I. Pigment Red 192, C.I. Pigment Red 202, C.I. Pigment Red 206, C.I. Pigment Red 207, C.I. Pigment Red 209, C.I. Pigment Violet 19, and C.I. Pigment Violet 42.

Examples of the monoazo yellow include C.I. Pigment Yellow 74, C.I. Pigment Yellow 109, C.I. Pigment Yellow 128, and C.I. Pigment Yellow 151.

Examples of the disazo yellow include C.I. Pigment Yellow 14, C.I. Pigment Yellow 16, and C.I. Pigment Yellow 17.

Examples of the heterocyclic yellow include C.I. Pigment Yellow 117, and C.I. Pigment Yellow 138.

Other suitable pigments for use are disclosed in The Color Index, 3rd edit. (The Society of Dyers and Colourists, 1982).

Examples of the inorganic pigment include titanium dioxide, silica, alumina, iron oxide, iron hydroxide, and tin oxide. As for the particle shape thereof, those having a small aspect ratio are preferable, and the spherical shapes are more preferable. In the case where a color material is adsorbed on surfaces thereof, a color of the inorganic pigment is preferably clear or white. In the case where a black material is adsorbed thereon, the black inorganic pigment may be used.

A primary particle diameter of the inorganic pigment particles is appropriately selected depending on the intended purpose without any limitation, but it is preferably 100 nm or smaller, more preferably 5 nm to 50 nm.

A mass ratio of the inorganic pigment particles to a color material, which is an organic pigment or carbon black, is appropriately selected depending on the intended purpose without any limitation, but the mass ratio is preferably 3:1 to 1:3, more preferably 3:2 to 1:2. When the mass of the color material is small, coloring ability or tinting ability may be low. When the mass of color material is large, transparency or color tone may be impaired.

As the colorant particles in which the inorganic pigment particles coated with the organic pigment or carbon black, a silica-carbon black composite material, a silica-phthalocyanine PB 15:3 composite material, a silica-diazo yellow composite material, and a silica-quinacridon PR122 composite material, which are manufactured by TODA KOGYO CORPORATION, are suitably used because these material have the small average primary particle diameters.

For example, if inorganic pigments having a primary particle diameter of 20 nm are coated with an equipment of an organic pigment, the coated particles will have a primary diameter of approximately 25 nm. Therefore, provided that these particles are dispersed maintaining the state of primary particles by using an appropriate dispersing agent, an extremely finely dispersed pigment ink having a dispersed particle diameter of 25 nm can be obtained. Note that, not only the organic pigment present on the surface of the composite pigment contributes to the dispersion state thereof, but also the characteristics of the inorganic pigment present in the center of the composite pigment affect the dispersion state through the about 2.5 nm-thick layer of the organic pigment. Therefore, it is also important that a pigment dispersing agent that can stabilize both the organic pigment and inorganic pigment in the composite pigment in the dispersion is selected.

Note that, the recording ink may contain a dye in combination for the purpose of adjusting the color tone, but the dye is preferably used as long as it does not adversely affect weather resistance of the recording ink.

An amount of the water-dispersible colorant in the recording ink is appropriately selected depending on the intended purpose without any limitation, but a solid content thereof is preferably 1% by mass to 10% by mass, more preferably 2% by mass to 9% by mass. When the amount thereof is 1% by mass or greater on solid basis, excellent coloring ability and image density of the recording ink are attained. When the amount thereof is 10% by mass or less on solid basis, an appropriate viscosity of the recording ink is attained, to thereby achieve excellent ejecting properties of the ink.

<<<Surfactant>>>

The surfactant is preferably a surfactant, which does not impair dispersion stability regardless of a type of the water-dispersible colorant for use, or a combination of organic solvents, has low surface tension, and high penetration ability, and high leveling ability, and examples thereof include an anionic surfactant, a nonionic surfactant, a silicone-based surfactant, and a fluorine-based surfactant. These may be used alone, or in combination. Among them, particularly preferred are a silicone-based surfactant, a fluorine-based surfactant, an acetylene glycol-based surfactant, and an acetylene alcohol-based surfactant.

As for the fluorine-based surfactant, a number of carbon atoms substituted with fluorine is preferably 2 to 16, more preferably 4 to 16. When the number of carbon atoms substituted with fluorine is less than 2, an effect of fluorine may not be exhibited. When the number thereof is greater than 16, a problem may be caused in storage stability of the ink.

Examples of the nonionic fluorine-based surfactant include a perfluoroalkyl phosphate compound, a perfluoroalkyl ethylene oxide adduct, and a polyoxyalkylene ether polymer compound containing a perfluoroalkyl ether group at a side chain thereof. Among them, a polylxyalkylene ether polymer compound containing a perfluoroalkyl ether group at a side chain thereof is preferable, as it is less foamable. A fluorine-based surfactant represented by the following general formula (1) or (2) is more preferable.

[General Formula (1)]

In the compound represented by the general formula (1), m is preferably an integer of 0 to 10 and n is preferably an integer of 0 to 40 in order to impart water solubility.

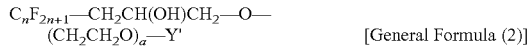
[General Formula (2)]

In the general formula (2), n is an integer of 2 to 6, a is an integer of 15 to 50, and Y' is $-C_bH_{2b+1}$ (b is an integer of 11 to 19), or $-CH_2CH(OH)CH_2-C_dF_{2d+1}$ (d is an integer of 2 to 6).

The anionic fluorine-based surfactant is appropriately selected depending on the intended purpose without any limitation, and examples thereof include a perfluoroalkyl sulfonic acid compound, a perfluoroalkyl carboxylic acid compound, a perfluoroalkyl phosphate compound, and a polyoxyalkylene ether polymer compound containing a perfluoroalkyl ether group at a side chain thereof.

Examples of the perfluoroalkyl sulfonic acid compound include perfluoroalkyl sulfonic acid, and perfluoroalkyl sulfonic acid salt.

Examples of the perfluoroalkyl carboxylic acid compound include perfluoroalkyl carboxylic acid, and perfluoroalkyl carboxylic acid salt.

Examples of the perfluoroalkyl phosphate compound include perfluoroalkyl phosphate, and a salt of perfluoroalkyl phosphate.

Examples of the polyoxyalkylene ether polymer compound containing a perfluoroalkyl ether group at a side chain thereof include a polyoxyalkylene ether polymer containing a perfluoroalkyl ether group at a side chain thereof, a sulfuric acid ester salt of polyoxyalkylene ether polymer having a perfluoroalkyl ether group at a side chain thereof, and a salt of polyoxyalkylene ether polymer containing a perfluoroalkyl ether group at a side chain thereof. Examples of a counter ion of the salt in any of the aforementioned fluorine-based surfactants include Li, Na, K, $NH_4$, $NH_3CH_2CH_2OH$, $NH_2(CH_2CH_2OH)_2$, and $NH(CH_2CH_2OH)_3$.

As for specific examples of the fluorine-based surfactant, compounds represented by the following general formulae (3) to (12) are suitably used.

(1) Anionic Fluorine-Based Surfactant

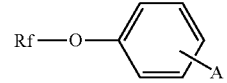
[General Formula (3)]

In the general formula (3), Rf is a mixture of fluorine-containing hydrophobic groups represented by the following structural formula (3-1); and A is $-SO_3X$, $-COOX$, or $-PO_3X$ (with proviso that X is a counter anion, specific examples of which are a hydrogen atom, Li, Na, K, $NH_4$, $NH_3CH_2CH_2OH$, $NH_2(CH_2CH_2OH)_2$, and $NH(CH_2CH_2OH)_3$).

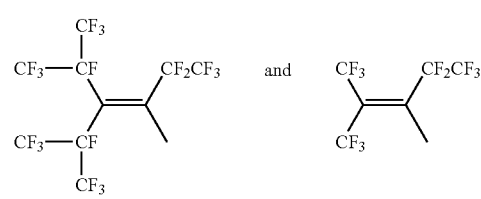
[Structural Formula (3-1)]

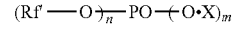
[General Formula (4)]

In the general formula (4), Rf' is a fluorine-containing group represented by the following general formula (4-1); X is a counter anion, which is a hydrogen atom, Li, Na, K, $NH_4$, $NH_3CH_2CH_2OH$, $NH_2(CH_2CH_2OH)_2$, or $NH(CH_2CH_2OH)_3$; n is an integer of 1 or 2; and m is 2-n.

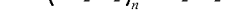
[General Formula (4-1)]

In the general formula (4-1), n is an integer of 3 to 10.

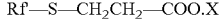
[General Formula (5)]

In the general formula (5), Rf and X are the same as in the general formula (4).

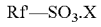
[General Formula (6)]

In the general formula (6), Rf and X are the same as in the general formula (4).

(2) Nonionic Fluorine-Based Surfactant

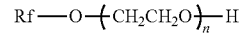
[General Formula (7)]

In the general formula (7), Rf is the same as Rf of the general formula (3); and n is an integer of 5 to 20.

[General Formula (8)]

In the general formula (8), Rf' is the same as Rf' of the general formula (4); and n is an integer of 1 to 40.

(3) Amphoteric Fluorine-Based Surfactant

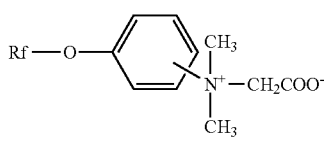

[General Formula (9)]

In the general formula (9), Rf is the same as Rf of the general formula (3).

(4) Oligomer-Type Fluorine-Based Surfactant

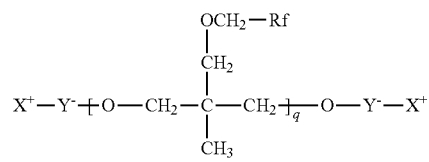

[General Formula (10)]

In the general formula (10), Rf is a perfluoroalkyl group; X is a quaternary ammonium group, alkali metal (e.g., sodium, and potassium), triethyl amine, or triethanol amine; Y is $-COO^-$, $-SO_3^-$, $-SO_4^-$, or $-PO_4^-$; and q is an integer of 1 to 6.

$$F-(CF_2CF_2)_n-CH_2-$$

[General Formula (11)]

In the general formula (11), n is an integer of 1 to 4.

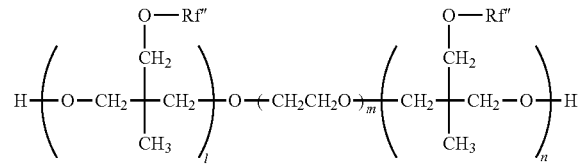

[General Formula (12)]

In the general formula (12), Rf' is a perfluoroalkyl group; m is an integer of 6 to 25; and l and n are each an integer of 1 to 10.

In the compound represented by the general formula (1), moreover, a molecular weight (MWEO) of the polyoxyethylene group [$(CH_2CH_2O)_a$ site] and a molecular weight (MWF) of the fluoroalkyl group ($C_nF_{2n+1}$ site and $C_mF_{2m+1}$ site) preferably satisfy the relationship represented by the following formula: MWEO/MWF=2.2 to 10, in view of a function as a surfactant, and a balance of solubility to water.

Preferable examples of the compound represented by the general formula (2) include compounds represented by the following formulae (a) to (v), as these have a high ability to reduce surface tension, and gives high penetration ability.

$C_4F_9-CH_2CH(OH)CH_2O-(CH_2CH_2O)_{21}-C_{12}H_{25}$ (a)

$C_4F_9-CH_2CH(OH)CH_2O-(CH_2CH_2O)_{25}-C_{12}H_{25}$ (b)

$C_4F_9-CH_2CH(OH)CH_2O-(CH_2CH_2O)_{30}-C_{12}H_{25}$ (c)

$C_4F_9-CH_2CH(OH)CH_2O-(CH_2CH_2O)_{20}-C_{14}H_{29}$ (d)

$C_4F_9-CH_2CH(OH)CH_2O-(CH_2CH_2O)_{30}-C_{14}H_{29}$ (e)

$C_4F_9-CH_2CH(OH)CH_2O-(CH_2CH_2O)_{20}-C_{16}H_{33}$ (f)

$C_4F_9-CH_2CH(OH)CH_2O-(CH_2CH_2O)_{23}-C_{16}H_{33}$ (g)

$C_4F_9-CH_2CH(OH)CH_2O-(CH_2CH_2O)_{25}-C_{16}H_{33}$ (h)

$C_4F_9-CH_2CH(OH)CH_2O-(CH_2CH_2O)_{30}-C_{16}H_{33}$ (i)

$C_4F_9-CH_2CH(OH)CH_2O-(CH_2CH_2O)_{40}-C_{16}H_{33}$ (j)

$C_4F_9-CH_2CH(OH)CH_2O-(CH_2CH_2O)_{20}-C_{18}H_{37}$ (k)

$C_4F_9-CH_2CH(OH)CH_2O-(CH_2CH_2O)_{30}-C_{18}H_{37}$ (l)

$C_4F_9-CH_2CH(OH)CH_2O-(CH_2CH_2O)_{40}-C_{18}H_{37}$ (m)

$C_4F_9-CH_2CH(OH)CH_2O-(CH_2CH_2O)_{23}-CH_2CH(OH)CH_2-C_4F_9$ (n)

$C_4F_9-CH_2CH(OH)CH_2O-(CH_2CH_2O)_{35}-CH_2CH(OH)CH_2-C_4F_9$ (o)

$C_4F_9-CH_2CH(OH)CH_2O-(CH_2CH_2O)_{45}-CH_2CH(OH)CH_2-C_4F_9$ (p)

$C_6F_{13}-CH_2CH(OH)CH_2O-(CH_2CH_2O)_{21}-C_{12}H_{25}$ (q)

$C_6F_{13}-CH_2CH(OH)CH_2O-(CH_2CH_2O)_{25}-C_{12}H_{25}$ (r)

$C_6F_{13}-CH_2CH(OH)CH_2O-(CH_2CH_2O)_{30}-C_{12}H_{25}$ (s)

$C_6F_{13}-CH_2CH(OH)CH_2O-(CH_2CH_2O)_{23}-CH_2CH(OH)CH_2-C_6F_{13}$ (t)

$C_6F_{13}-CH_2CH(OH)CH_2O-(CH_2CH_2O)_{35}-CH_2CH(OH)CH_2-C_6F_{13}$ (u)

$C_6F_{13}-CH_2CH(OH)CH_2O-(CH_2CH_2O)_{45}-CH_2CH(OH)CH_2-C_6F_{13}$ (v)

Among them, the compounds represented by the formula (a) to (c), and (n) to (v) are particularly preferable, as they have excellent compatibility to the organic solvent.

As for the fluorine-based surfactant, a commercial product may be used. Examples of the commercial product thereof include: SURFLON S-111, S-112, S-113, S-121, S-131, S-132, S-141, S-145 (all manufactured by ASAHI GLASS CO., LTD.); FLOURAD FC-93, FC-95, FC-98, FC-129, FC-135, FC-170C, FC-430, FC-431 (all manufactured by Sumitomo 3M Limited); MEGAFACE F-470, F-1405, F-474 (all manufactured by DIC Corporation); Zonyl TBS, FSP, FSA, FSN-100, FSN, FSO-100, FSO, FS-300, UR (all manufactured by Du Pont Kabushiki Kaisha); FT-110, FT-250, FT-251, FT-400S, FT-150, FT-400SW (all manufactured by NEOS COMPANY LIMITED); PolyFox PF-136A, PF-156A, PF-151N, PF-154, PF-159 (all manufactured by Omnova Solutions, Inc.); and UNIDYNE DSN-403N (manufactured by DAIKIN INDUSTRIES, LTD.).

Among them, particularly preferred are FS-300 manufactured by Du Pont Kabushiki Kaisha, FT-110, FT-250, FT-251, FT-400S, FT-150, and FT-400SW manufactured by NEOS COMPANY LIMITED, PolyFox PF-151N manufactured by Omnova Solutions, Inc., and UNIDYNE DSN-403N manufactured by DAIKIN INDUSTRIES, LTD., in view of excellent print quality, and wetting ability.

The silicone-based surfactant is appropriately selected depending on the intended purpose without any limitation, and examples thereof include side chain-modified polydimethylsiloxane, both terminal-modified polydimethylsiloxane, one terminal-modified polydimethylsiloxane, and side chain and both terminals-modified polydimethylsiloxane.

Among them, particularly preferred is a polyether-modified silicone-based surfactant containing a polyoxyethylene group and polyoxyethylene polyoxypropylene group as a modified group, as it has excellent properties as an aqueous surfactant.

The silicone-based surfactant is not particularly limited, and may be appropriately synthesized for use, or selected from commercial products. The commercial products thereof are readily available, for example, from BYK Japan K.K., Shin-Etsu Chemical Co., Ltd., Dow Corning Toray Co., Ltd., Nihon Emulsion Co., Ltd., and KYOEISHA CHEMICAL CO., LTD.

The polyether-modified silicone-based surfactant is appropriately selected depending on the intended purpose without any limitation, and examples thereof include a compound, in which a polyalkylene oxide structure represented by the following general formula (13) is introduced into a Si site of the side chain of dimethyl polysiloxane.

[General Formula (13)]

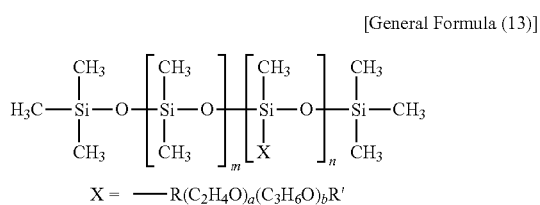

In the general formula (13), m, n, a, and b are each an integer; and R and R' are each an alkyl group or an alkylene group.

The polyether-modified silicone-based surfactant is not particularly limited, and may be appropriately synthesized for use, or selected from commercial products. Examples of the commercial products thereof include: KF-618, KF-642, KF-643 (all manufactured by Shin-Etsu Chemical Co., Ltd.); EMALEX-SS-5602, SS-1906EX (all manufactured by Nihon Emulsion Co., Ltd.); FZ-2105, FZ-2118, FZ-2154, FZ-2161, FZ-2162, FZ-2163, FZ-2164 (all manufactured by Dow Corning Toray Co., Ltd.); BYK-33, BYK-387 (both manufactured by BYK Japan KK); and TSF4440, TSF4452, and TSF4453 (all manufactured by Momentive Performance Materials Inc.).

The acetylene glycol-based surfactant, or the acetylene alcohol-based surfactant is preferably a compound represented by the following structural formula (14), (15), or (16).

[Structural Formula (14)]

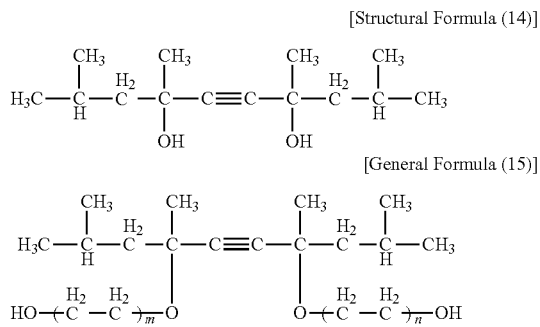

[General Formula (15)]

In the general formula (15), m or n is an integer.

[General Formula (16)]

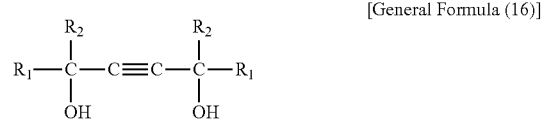

In the general formula (16), $R_1$ and $R_2$ are each an alkyl group.

The acetylene glycol-based surfactant or acetylene alcohol-based surfactant is not particularly limited, and may be appropriately synthesized for use, or selected from commercial products. Examples of the commercial products thereof include: Dynol 604, Dynol 607 (both manufactured by Air Products and Chemicals Inc.); Surfynol 104, Surfynol 420, Surfynol 440, Surfynol SE (all manufactured by Nissin Chemical Industry Co., Ltd.); OLFINE E1004, OLFINE E1010, OLFINE EXP.4001, OLFINE EXP.4200, OLFINE EXP.4051F, OLFINE EXP.4123 (all manufactured by Nissin Chemical Industry Co., Ltd.).

Examples of the anionic surfactant include an acetic acid salt of polyoxyethylene alkyl ether, dodecylbenzene sulfonic acid salt, lauric acid salt, and polyoxyethylene alkyl ether sulfate salt.

Examples of the nonionic surfactant include polyoxyethylene alkyl ether, polyoxypropylene polyoxyethylene alkyl ether, polyoxyethylene alkyl ester, polyoxyethylene sorbitan fatty acid ester, polyoxyethylene alkyl phenyl ether, polyoxyethylene alkyl amine, and polyoxyethylene alkyl amide.

An amount of the surfactant is appropriately selected depending on the intended purpose without any limitation, but the amount thereof is preferably 0.001% by mass to 5% by mass, more preferably 0.05% by mass to 1% by mass, relative to a total amount of the recording ink. When the amount thereof is in the range of 0.001% by mass to 5% by mass, an excellent effect obtainable by adding a surfactant is exhibited.

<<<Water>>>

As for the water, for example, pure water (e.g., ion-exchanged water, ultrafiltration water, Milli-Q water, and distilled water) or ultra pure water can be used.

An amount of the water in the recording ink is appropriately selected depending on the intended purpose without any limitation.

<<<Penetrating Agent>>>

The recording ink preferably contains, as a penetrating agent, a C8-C11 non-wetting polyol compound, or glycol ether compound, or both, in order to achieve both penetrating ability and solubility to water. The term "non-wetting" means the solubility falling in the range of 0.2% by mass to 5.0% by mass in water at 25° C. Among them, a 1,3-diol compound represented by the general formula (17) is preferable, and 2-ethyl-1,3-hexanediol [solubility: 4.2% (25° C.)], and 2,2,4-trimethyl-1,3-pentanediol [solubility: 2.0% (25° C.)] are particularly preferable.

[General Formula (17)]

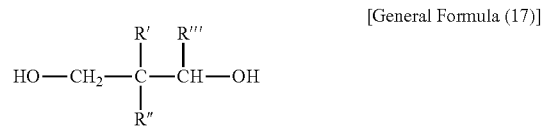

In the general formula (17), R' is a methyl group or an ethyl group; R″ is a hydrogen atom or a methyl group; and R‴ is an ethyl group or a propyl group.

Examples of aliphatic diol as other non-wetting polyol compound include 2-ethyl-2-methyl-1,3-propanediol, 3,3-dimethyl-1,2-butanediol, 2,2-diethyl-1,3-propanediol, 2-methyl-2-propyl-1,3-propanediol, 2,4-dimethyl-2,4-pentanediol, 2,5-dimethyl-2,5-hexanediol, and 5-hexene-1,2-diol.

Other than the above, a penetrating agent used in combination is appropriately selected depending on the intended purpose without any limitation, provided that it dissolves in the recording ink, and adjusts the ink to desired properties. Examples thereof include: alkyl or aryl ether of polyhydric alcohol, such as diethylene glycol monophenyl ether, ethylene glycol monophenyl ether, ethylene glycol monoallyl ether, diethylene glycol monophenyl ether, diethylene glycol monobutyl ether, propylene glycol monobutyl ether, and tetraethylene glycol chlorophenyl ether; and lower alcohol, such as ethanol.

An amount of the penetrating agent in the recording ink is appropriately selected depending on the intended purpose without any limitation, but the amount thereof is preferably 0.1% by mass to 4.0% by mass. When the amount thereof is 0.1% by mass or greater, excellent penetrating ability is attained, and an excellent image can be formed. When the amount thereof is 4.0% by mass or less, dispersion stability of the water-dispersible colorant is secured, a nozzle is not clogged, appropriate penetrating ability of the recording ink to a recording medium is attained, and therefore reduction in image density or break-through does not occur.

<<<Water-Dispersible Resin>>>

As for the water-dispersible resin, a water-dispersible resin having excellent film formability (image formability), high water repellency, high water resistance, and high weather resistance is effective for formation of an image having high water resistance and high image density (high coloring ability). Examples of the water-dispersible resin include a condensed synthetic resin, an addition synthetic resin and a natural polymer compound.

Examples of the condensed synthetic resin include a polyester resin, a polyurethane resin, a polyepoxy resin, a polyamide resin, a polyether resin, a poly(meth)acrylic resin, an acryl-silicone resin, and a fluororesin.

Examples of the addition synthetic resin include a polyolefin resin, a polystyrene resin, a polyvinyl alcohol resin, a polyvinyl ester resin, a polyacrylic acid resin, and an unsaturated carboxylic acid resin.

Examples of the natural polymer compound include cellulose, rosin, and natural rubbers.

These water-dispersible resins may be used alone, or in combination.

Among them, particularly preferred are a urethane resin, an acryl-silicone resin, and a fluororesin.

The fluororesin is preferably a fluororesin containing a fluoroolefin unit. Among them, particularly preferred is a fluorine-containing vinyl ether-based resin composed of a fluoroolefin unit and a vinyl ether unit.

The fluoroolefin unit is appropriately selected depending on the intended purpose without any limitation, and examples thereof include —$CF_2CF_2$—, —$CF_2CF(CF_3)$—, and —$CF_2CFCl$—.

The vinyl ether unit is appropriately selected depending on the intended purpose without any limitation, and examples thereof include compounds represented by the following structural formulae.

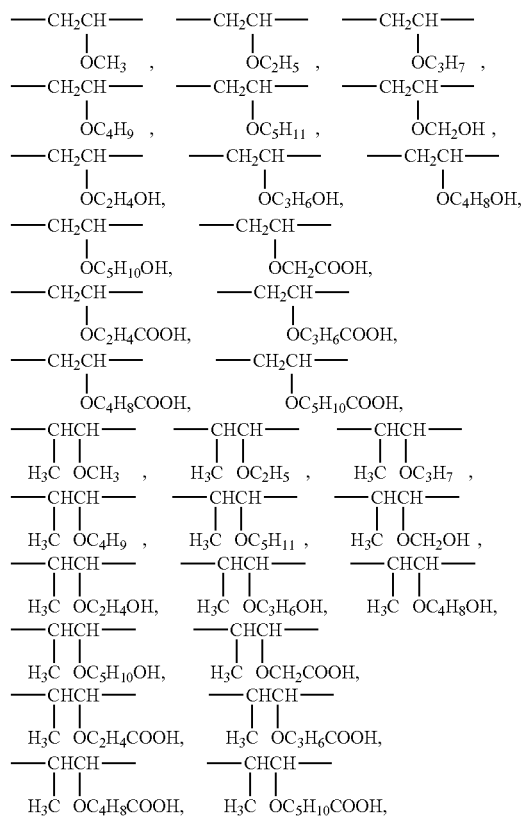

As for the fluorine-containing vinyl ether-based resin composed of the fluoroolefin unit and the vinyl ether unit, an alternating copolymer formed by alternatively copolymerizing the fluoroolefin unit and the vinyl ether unit.

The fluororesin is not particularly limited, and may be appropriately synthesized for use, or selected from commercial products. Examples of the commercial products thereof include: FLUONATE FEM-500, FEM-600, DICGUARD F-52S, F-90, F-90M, F-90N, and AQUAFURAN TE-5A, all manufactured by DIC Corporation; and LUMIFLON FE4300, FE4500, FE4400, ASAHI GUARD AG-7105, AG-950, AG-7600, AG-7000, and AG-1100, all manufactured by ASAHI GLASS CO., LTD.

As for the water-dispersible resin, a homopolymer may be used, or a copolymer may be used as a composite resin. Moreover, the water-dispersible resin for use may have a monophase structure or core-shell structure, or may be prepared by power-feed emulsion.

As the water-dispersible resin, it is possible to use a resin itself having a hydrophilic group and self-dispersibility, and a resin itself having no dispersibility but to which the dispersibility is imparted with use of a surfactant or another resin having a hydrophilic group. Among them, particularly preferred are a polyester resin, a polyurethane resin, and emulsion of resin particles formed by emulsion polymerization or suspension polymerization of an unsaturated monomer. In case of emulsion polymerization of an unsaturated monomer, a resin emulsion is obtained by reacting water into which an unsaturated monomer, a polymerization initiator, a surfactant, a chain transfer agent, a chelating agent and a pH adjustor are added. Thus, a water-dispersible resin can be easily obtained, and desired properties are easily obtained because the resin components can be easily changed.

Examples of the unsaturated monomer include unsaturated carboxylic acid, a monofunctional or polyfunctional (meth) acrylic acid ester monomer, a (meth)acrylic acid amide monomer, an aromatic vinyl monomer, a vinyl cyano compound monomer, a vinyl monomer, an allyl compound monomer, an olefin monomers, a diene monomer, and an oligomer containing a unsaturated carbon. These may be used alone, or in combination. By combining these monomers, properties of the resulting resin can be flexibly modified. The properties of the resulting resin can be also modified with use of an oligomer type polymerization initiator, through a polymerization reaction or graft reaction.

Examples of the unsaturated carboxylic acid include acrylic acid, methacrylic acid, itaconic acid, fumaric acid, and maleic acid.

Examples of the monofunctional (meth)acrylic acid ester monomer include methyl methacrylate, ethyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, octyl methacrylate, decyl methacrylate, dodecyl methacrylate, octadecyl methacrylate, cyclohexyl methacrylate, phenyl methacrylate, benzyl methacrylate, glycidyl methacrylate, 2-hydroxyethyl methacrylate, 2-hydroxypropyl methacrylate, dimethylaminoethyl methacrylate, methacryloxyethyltrimethyl ammonium salt, 3-methacryloxypropyltrimethoxy silane, methyl acrylate, ethyl acrylate, isopropyl acrylate, n-butyl acrylate, isobutyl acrylate, n-amyl acrylate, isoamyl acrylate, n-hexyl acrylate, 2-ethylhexyl acrylate, octyl acrylate, decyl acrylate, dodecyl acrylate, octadecyl acrylate, cyclohexyl acrylate, phenyl acrylate, benzyl acrylate, glycidyl acrylate, 2-hydroxyethyl acrylate, 2-hydroxypropyl acrylate, dimethylaminoethyl acrylate, and acryloxyethyltrimethyl ammonium salt. These may be used alone, or in combination.

Examples of the polyfunctional (meth)acrylic acid ester include ethylene glycol dimethacrylate, diethylene glycol dimethacrylate, triethylene glycol dimethacrylate, polyethylene glycol dimethacrylate, 1,3-butylene glycol dimethacrylate, 1,4-butylene glycol dimethacrylate, 1,6-hexanediol dimethacrylate, neopentyl glycol dimethacrylate, dipropylene glycol dimethacrylate, propylene glycol dimethacrylate, polybutylene glycol dimethacrylate, 2,2'-bis(4-methacryloxydiethoxyphenyl)propane, trimethylol propane trimethacrylate, trimethylol ethane trimethacrylate, polyethylene glycol diacrylate, triethylene glycol diacrylate, 1,3-butylene glycol diacrylate, 1,4-butylene glycol diacrylate, 1,6-hexanediol diacrylate, neopentyl glycol diacrylate, 1,9-nonanediol diacrylate, propylene glycol diacrylate, 2,2'-bis (4-acryloxypropyloxypheny)propane, 2,2'-bis(4-acryloxydiethoxyphenyl)propane trimethylol propane triacrylate, trimethylol ethane triacrylate, tetramethyl ethane triacrylate, ditrimethylol tetraacrylate, tetramethylol methane tetraacrylate, pentaerythritol tetraacrylate, and dipentaerythritol hexaacrylate. These may be used alone, or in combination.

Examples of the (meth)acrylic acid amide monomer include acryl amide, methacryl amide, N,N-dimethyl acryl amide, methylene bisacryl amide, and 2-acrylamide-2-methylpropane sulfonic acid. These may be used alone, or in combination.

Examples of the aromatic vinyl monomer include styrene, α-methyl styrene, vinyl toluene, 4-t-butyl styrene, chlorostyrene, vinyl anisole, vinyl naphthalene, and vinyl benzene. These may be used alone, or in combination.

Examples of the vinyl cyano compound monomer include acrylonitrile, and methacrylonitrile.

Examples of the vinyl monomer include vinyl acetate, vinylidene chloride, vinyl chloride, vinyl ether, vinyl ketone, vinyl pyrrolidone, vinylsulfonic acid or a salt thereof, vinyl trimethoxysilane, and vinyl triethoxysilane.

Examples of the allyl compound monomer include allyl sulfonic acid or a salt thereof, allyl amine, allyl chloride, diallyl amine, and diallylmethyl ammonium salt.

Examples of the olefin monomer include ethylene, and propylene.

Examples of the diene monomer include butadiene, and chloroprene.

Examples of the oligomer containing an unsaturated carbon include a styrene oligomer containing a methacryloyl group, a styrene-acrylnitrile oligomer containing a methacryloyl group, a methyl methacrylate oligomer containing a methacryloyl group, a dimethylsiloxane oligomer containing a methacryloyl group, and a polyester oligomer containing an acryloyl group.

The water-dispersible resin suffers from breakage of the molecular chains, such as dispersion breakage and hydrolysis, in the presence of a strong alkali or strong acid, and thus the pH of the water-dispersible resin is preferably 4 to 12, and particularly, from the view point of miscibility with a water-dispersible colorant, it is more preferably 6 to 11, and still more preferably 7 to 10.

The volume average particle diameter of the water-dispersible resin is relevant to the viscosity of the dispersion liquid. In the case of water-dispersible resins having the same composition, the smaller the particle diameter is, the higher the viscosity is at the same solid content. The volume average particle diameter of the water-dispersible resin is preferably 50 nm or greater to prevent the resulting ink from having excessively high viscosity. When the average particle diameter is several tens micrometers, the water-dispersible resin cannot be used because the diameter of the water-dispersible resin is greater than that of nozzle holes of an inkjet head. When the diameter of the water-dispersible resin is smaller than that of nozzle holes but particles having large particle diameters are present in an ink, the ink ejection stability degrades. In order not to impair the ink ejection stability, the volume average particle diameter thereof is preferably 200 nm or smaller, more preferably 150 nm or smaller.

The water-dispersible resin preferably has a function to fix the water-dispersible colorant on the surface of paper, to form a coat at normal temperature to improve fixability of the colorant. Therefore, the minimum film forming temperature (MFT) of the water-dispersible resin is appropriately selected depending on the intended purpose without any limitation, but it is preferably 30° C. or lower. When the glass transition temperature of the water-dispersible resin is −40° C. or lower, tucks occur in printed matters because of the increased viscosity of the resin coat. Thus, the water-dispersible resin preferably has glass transition temperature of −30° C. or higher.

An amount of the water-dispersible resin in the recording ink is appropriately selected depending on the intended purpose without any limitation, but the solid content thereof is preferably 2% by mass to 30% by mass, more preferably 5% by mass to 25% by mass.

<<<Other Components>>>

The aforementioned other components are appropriately selected depending on the intended purpose without any limitation, and examples thereof include a foam inhibitor (defoaming agent), a pH regulator, an antiseptic-antifungal agent, a chelating agent, an anti-rust agent, an antioxidant, an ultraviolet absorber, an oxygen absorber, and a photostabilizer.

—Foam Inhibitor (Defoaming Agent)—

The foam inhibitor is used by adding in a small amount thereof to the recording ink to thereby inhibit foaming of the recording ink. The term "foaming" means that air is encapsulated with thin films of the liquid. The foaming is related to properties of the recording ink, such as surface tension, and viscosity. Specifically, with a liquid having high surface tension, such as water, a force for minimizing the surface area of the liquid as little as possible works, and therefore such liquid is difficult to foam. In contrast, an recording ink having high viscosity and high permeability has low surface tension. Therefore the recording ink easily foams, and the generated foams tend to be remained because of the viscosity of the ink solution, and it is difficult to defoam.

The foam inhibitor typically destroys bubbles by partially reducing the surface tension of the film of the bubble, or by scattering the foam inhibitor insoluble to the foaming liquid on a surface of the foaming liquid. In the case where a fluorosurfactant, which has a very strong effect of reducing the surface tension, is used as a surfactant in the recording ink, the foam inhibitor of the former mechanism cannot partially reduce the surface tension of the film of the bubble. Therefore, it is generally not used. Accordingly, the latter foam inhibitor which is insoluble to the foaming liquid (e.g. the ink) is used. In this case, the stability of the inkjet ink reduces because of the foam inhibitor insoluble to the ink.

Contrary to these, the foam inhibitor represented by the following general formula (18) has high affinity to a fluorine-based surfactant, although it does not have a high effect of reducing the surface tension compared to the fluorine-based surfactant. Therefore, the foam inhibitor is effectively included in the bubble film, and the surface of the bubble film partially becomes in an unbalanced state due to a difference in surface tension between the fluorine-based surfactant and the foam inhibitor, to thereby destroy the bubbles.

As for the foam inhibitor, a compound represented by the following general formula (18) is suitably used.

[General Formula (18)]

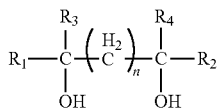

In the general formula (18), $R_1$ and $R_2$ are each independently a C3-C6 alkyl group; $R_3$ and $R_4$ are each independently a C1-C2 alkyl group; and n is an integer of 1 to 6.

Examples of the compound represented by the general formula (18) include 2,4,7,9-tetramethyldecane-4,7-diol, and 2,5,8,11-tetramethyldodecane-5,8-diol. Among them, particularly preferred is 2,5,8,11-tetramethyldodecane-5,8-diol, as it has an effect of inhibiting foaming, and high compatibility to an ink.

An amount of the foam inhibitor in the recording ink is appropriately selected depending on the intended purpose without any limitation, but the amount thereof is preferably 0.01% by mass to 10% by mass, more preferably 0.1% by mass to 5% by mass. When the amount of the foam inhibitor in the range of 0.01% by mass to 10% by mass, an excellent effect of inhibiting foaming can be attained.

—pH Regulator—

The pH regulator is appropriately selected depending on the intended purpose without any limitation, provided that it does not adversely affect a recording ink to be prepared, and can adjust pH of the ink to the range of 7 to 11. Examples of the pH regulator include alcohol amine, hydroxide of an alkali metal element, hydroxide of ammonium, phosphonium hydroxide, and carbonate of alkali metal. When the pH of the recording ink is lower than 7 or greater than 11, problems such as degeneration and leakage of ink and ejection defects may occur due to the large amount of ink dissolving an inkjet head and an ink supply unit.

Examples of the alcohol amine include diethanol amine, triethanol amine, and 2-amino-2-ethyl-1,3-propanediol.

Examples of the hydroxide of an alkali metal element include lithium hydroxide, sodium hydroxide, and potassium hydroxide.

Examples of the hydroxide of ammonium include ammonium hydroxide, and quaternary ammonium hydroxide.

Examples of the phosphonium hydroxide include quaternary phosphonium hydroxide.

Examples of the carbonate of alkali metal include lithium carbonate, sodium carbonate, and potassium carbonate.

—Antiseptic-Antifungal Agent—

Examples of the antiseptic-antifungal agent include sodium dehydroacetate, sodium sorbate, sodium 2-pyridinethiol-1-oxide, sodium benzoate, and sodium pentachlorophenol.

—Chelating Agent—

Examples of the chelating agent include sodium ethylenediamine tetraacetate, sodium nitrilotriacetate, sodium hydroxyethylethylenediamine triacetate, sodium diethylenetriamine pentaacetate, and sodium uramil diacetate.

—Anti-Rust Agent—

Examples of the anti-rust agent include acid sulfite, sodium thiosulfate, thiodiglycolic acid ammonium, diisopropyl ammonium nitrate, pentaerythritol tetranitrate, and dicyclohexyl ammonium nitrate.

—Antioxidant—

Examples of the antioxidant include a phenolic antioxidant (including hindered phenolic antioxidant), an amine antioxidant, a sulfuric antioxidant, and a phosphoric antioxidant.

Examples of the phenolic antioxidant (including hindered phenolic antioxidant) include butylated hydroxyanisole, 2,6-di-tert-butyl-4-ethyl phenol, and stearyl-β-(3,5-di-tert-butyl-4-hydroxyphenyl) propionate.

Examples of the amine antioxidant include phenyl-β-naphthyl amine, α-naphthyl amine, and N,N'-di-sec-butyl-p-phenylene diamine.

Examples of the sulfuric antioxidant include dilauryl-3,3'-thiodipropionate, distearylthiodipropionate, and laurylstearylthiodipropionate.

Examples of the phosphoric antioxidant include triphenyl phosphate, octadecyl phosphate, triisodecyl phosphate, trilauryltrithio phosphate, and trinonylphenyl phosphate.

—Ultraviolet Absorber—

Examples of the ultraviolet absorber include a benzophenone ultraviolet absorber, a benzotriazole ultraviolet absorber, a salicylate ultraviolet absorber, a cyanoacrylate ultraviolet absorber, and a nickel complex salt ultraviolet absorber.

Examples of the benzophenone ultraviolet absorber include 2-hydroxy-4-n-octoxybenzophenone, 2-hydroxy-4-n-dodecyloxybenzophenone, 2,4-dihydroxybenzophenone, 2-hydroxy-4-methoxybenzophenone, and 2,2',4,4'-tetrahydroxybenzophenone.

Examples of the benzotriazole ultraviolet absorber include 2-(2'-hydroxy-5'-tert-octylphenyl)benzotriazole, 2-(2'-hydroxy-5'-methylphenyl)benzotriazole, 2-(2'-hydroxy-4'-octoxyphenyl)benzotriazole, and 2-(2'-hydroxy-3'-tert-butyl-5'-methylphenyl)-5-chlorobenzotriazole.

Examples of the salicylate ultraviolet absorber include phenyl salicylate, p-tert-butylphenyl salicylate, and p-octylphenyl salicylate.

Examples of the cyanoacrylate ultraviolet absorber include ethyl-2-cyano-3,3'-diphenyl acrylate, methyl-2-cyano-3-methyl-3-(p-methoxyphenyl)acrylate, and butyl-2-cyano-3-methyl-3-(p-methoxyphenyl)acrylate.

Examples of the nickel complex salt ultraviolet absorber include nickelbis(octylphenyl) sulfide, nickel(II) 2,2'-thiobis (4-tert-octylferrate)-n-butyl amine, nickel(II) 2,2'-thiobis(4-tert-octylferrate)-2-ethylhexyl amine, and nickel(II) 2,2'-thiobis(4-tert-octylferrate)triethanol amine.

The recording ink is prepared by dispersing or dissolving, in water, a water-dispersible colorant, an organic solvent, a water-dispersible resin, a surfactant, preferably a penetrating agent, and optionally other components, and optionally stirring and mixing the mixture. The stirring and mixing can be performed, for example, by a sand mill, a homogenizer, a ball mill, a paint shaker, or an ultrasonic disperser, and the stirring and mixing can be performed by an agitator using a typical agitating blade, a magnetic stirrer, or a high-speed disperser.

The viscosity of the inkjet recording ink at 25° C. is appropriately selected depending on the intended purpose without any limitation, but the viscosity thereof is preferably 5 mPa·s to 25 mPa·s. When the viscosity of the ink is 5 mPa·s or greater, an effect of improving print density and quality of printed characters can be attained. When the viscosity of the ink is 25 mPa·s or less, moreover, excellent ejection ability can be secured.

The viscosity can be measured at 25° C., for example, by means of a viscometer (RE-550L, manufactured by Toki Sangyo Co., Ltd.).

The dynamic surface tension of the inkjet recording ink of 25° C. as measured by the maximum bubble pressure method with the surface lifetime of 15 ms is 35 mN/m or lower, more preferably 33 mN/m or lower. When the dynamic surface tension is 35 mN/m or lower, wetting ability and penetration of a resulting ink to a commercial printing sheet are excellent, and a high effect of preventing beading and color breading can be attained.

The dynamic surface tension of the inkjet ink as measured by the maximum bubble pressure method with the surface lifetime of 15 ms can be measured at 25° C., for example, by means of SITA_DynoTester (manufactured by SITA Messtechnik).

The static surface tension of the inkjet recording ink is appropriately selected depending on the intended purpose without any limitation, but the static surface tension thereof is preferably 30 mN/m or lower at 25° C., more preferably 28 mN/m or lower at 25° C. When the surface tension is 30 mN/m or lower, an effect of reducing beading is high as penetrating ability is enhanced, and penetration and drying performance of an ink are excellent at the time of printing using plane paper.

—Ink Cartridge—

The ink cartridge contains a container that houses the recording ink, and may further contain appropriately selected other members according to the necessity.

The container is not particularly limited, and a shape, structure, size, and material thereof are appropriately selected depending on the intended purpose. For example, the container is preferably selected from those having at least an ink bag formed of an aluminum laminate film or a resin film.

Figure 2:
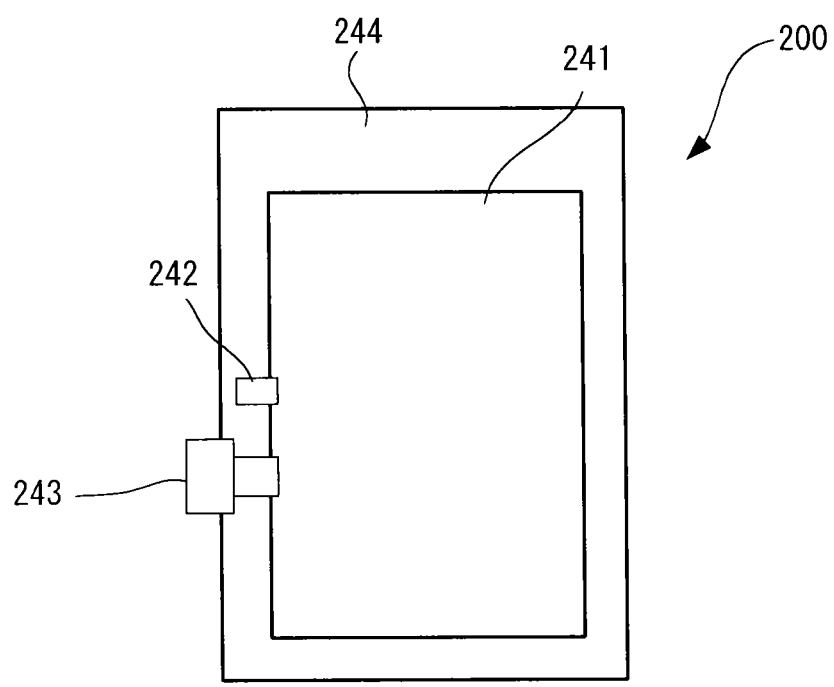
FIG. 2 is a schematic diagram including a case of the ink cartridge of FIG. 1.

The ink cartridge is explained with reference to FIGS. 1 and 2 next. FIG. 1 is a diagram illustrating one example of the ink cartridge, and FIG. 2 is a diagram illustrating the ink cartridge of FIG. 1 including a case (exterior).

As illustrated in FIG. 1, an ink bag 241 of the ink cartridge 200 filled with the recording ink from an ink inlet 242, and after removing air present inside the ink bag 241, the ink inlet 242 is sealed by fusing. At the time of use, a needle of a device main body is inserted into the ink outlet 243 formed of a rubber member to supply ink to the device.

The ink bag 241 is formed of a wrapping member, such as an aluminum laminate film that is non-permeable to air. As illustrated in FIG. 2, the ink bag 241 is typically housed in a cartridge case 244 formed of plastic, and is designed so that it is used by detachably mounting in various inkjet recording devices.

<Other Steps and Other Units>

The aforementioned other steps are appropriately selected depending on the intended purpose without any limitation, and examples thereof include a drying step, and a controlling step.

The aforementioned other units are appropriately selected depending on the intended purpose without any limitation, and examples thereof include a drying unit, and a controlling unit.

—Drying Step and Drying Unit—

The drying step is heating the recording medium, to which an image has been recorded with the recording ink, to dry the recording ink, and is carried out by the drying unit.

The drying is appropriately selected depending on the intended purpose without any limitation. For example, the drying can be performed by infrared drying equipment, microwave drying equipment, a roll heater, a drum heater, or warm air. Note that, a fixing step, which is contains heating to 100° C. to 150° C. to thermally fix the recording ink, may be provided in order to level a surface of an image formed, and fix the image.

—Controlling Step and Controlling Unit—

The controlling step is controlling each step, and is carried out by the controlling unit.

The controlling unit is appropriately selected depending on the intended purpose without any limitation, provided that it is capable of controlling operation of each unit. Examples thereof include devices, such as a sequencer, and a computer.

One embodiment for carrying out the inkjet recording method of the present invention by the inkjet recording device of the present invention is explained hereinafter with reference to drawings.

Figure 3:
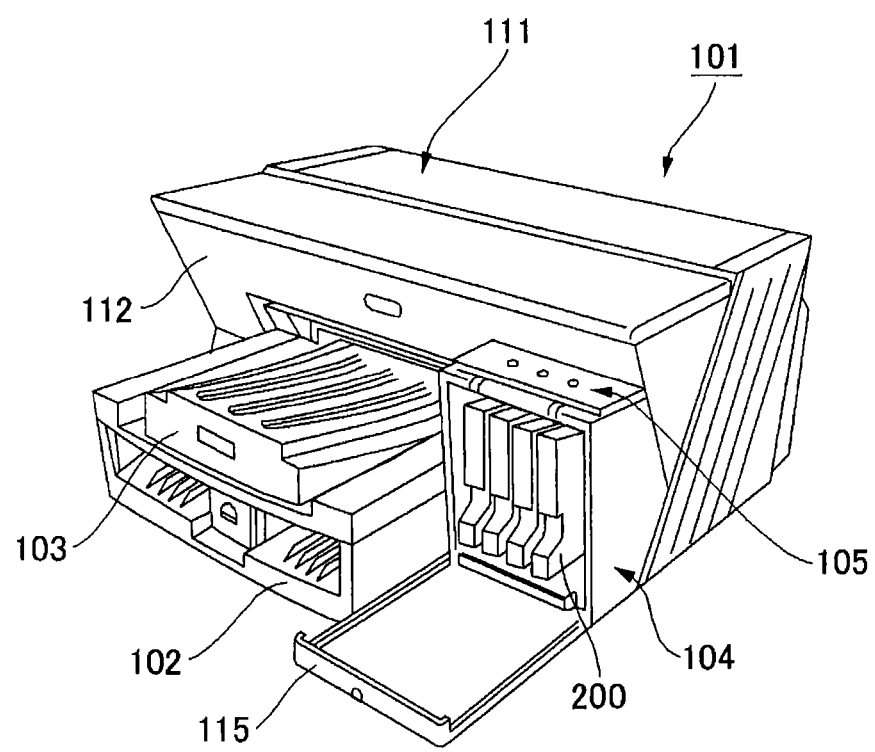
FIG. 3 is a perspective diagram illustrating one example of an inkjet recording device.

The inkjet recording device illustrated in FIG. 3 contains a device main body 101, a paper feeding tray 102 for feeding sheets to the device main body 101, a paper discharging tray 103 for storing the recording sheets which have been fed to the device main body 101 and on which images have been formed (recorded), and an ink cartridge loading unit 104. Various recording media can be fed using this paper feeding tray 102.

On the upper plane of the ink cartridge loading unit 104, a control unit 105 such as operation keys and a display is provided. The ink cartridge loading unit 104 has a front cover 115 that can be open for attaching or detaching the ink cartridge 200.

Figure 4:
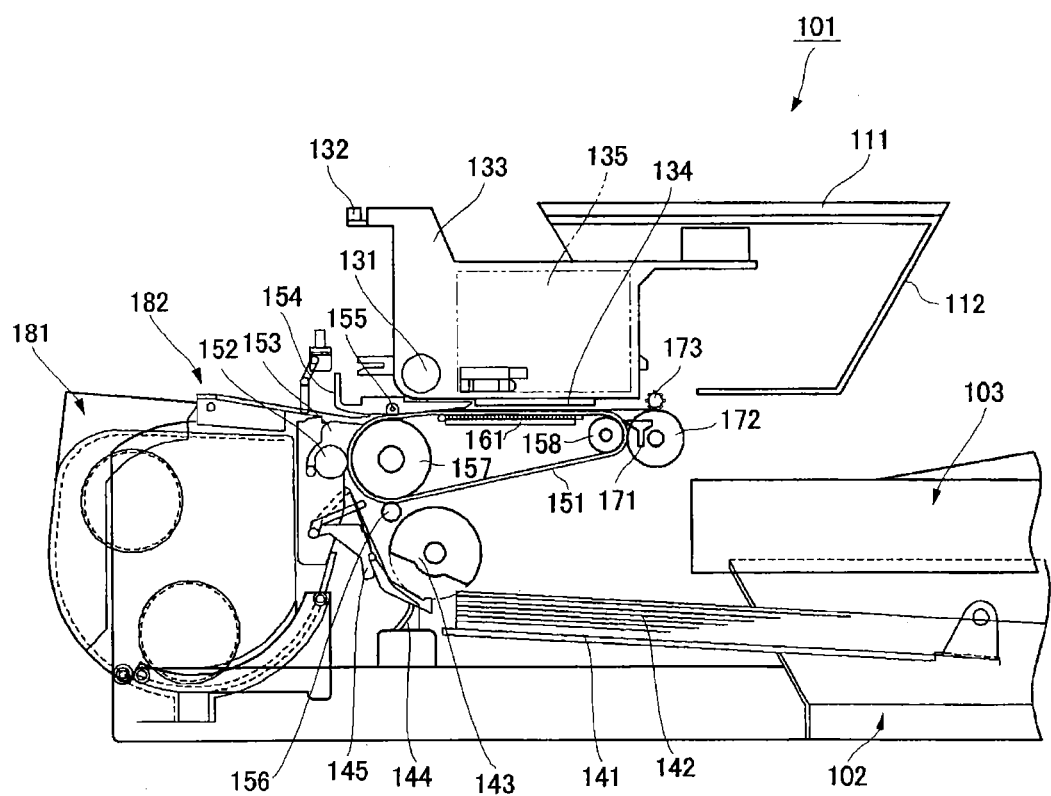
FIG. 4 is a diagram illustrating one example of an inkjet recording device.
Figure 5:
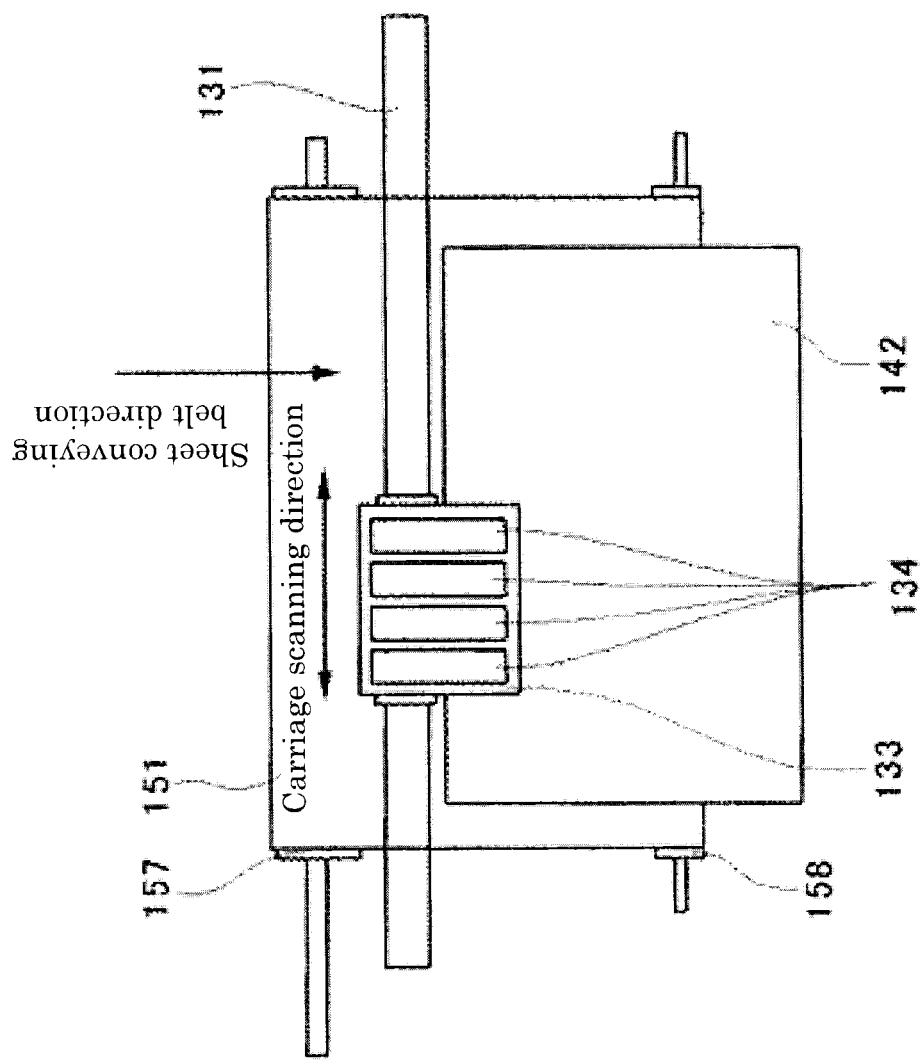
FIG. 5 is a schematic enlarged diagram illustrating one example of an inkjet head of an inkjet recording device.

In the device main body 101, as illustrated in FIGS. 4 and 5, a carriage 133 is freely slidably held in the main scanning direction by a guide rod 131, which is a guide member laterally passed between left and right side plates (not depicted), and a stay 132; and the carriage 133 is moved for scanning in the arrow direction in FIG. 5 by a main scanning motor (not depicted).

A recording head 134 composed of four ink-jet recording heads which eject recording ink droplets of yellow (Y), cyan (C), magenta (M) and black (Bk) is installed in the carriage 133 such that a plurality of ink ejection outlets are aligned in the direction intersecting the main scanning direction and that the ink droplet ejection direction faces downward.

As for each of the inkjet recording heads constituting the recording head 134, it is possible to use, for example, a head provided with an energy generating unit, such as a piezoelectric actuator (e.g., a piezoelectric element), a thermal actuator that uses a thermoelectric transducer such as a heat element and utilizes phase change caused by film boiling of a liquid, a shape-memory-alloy actuator that utilizes a metal phase change caused by a temperature change, and an electrostatic actuator that utilizes electrostatic force.

Moreover, sub-tanks 135 of each color for supplying the inks of each color to the recording head 134 are also provided with the carriage 133. To the sub-tank 135, the recording ink is supplied and replenished from the ink cartridge 200 mounted in the ink cardridge loading unit 104 through an ink supply tube (not depicted in the drawing).

Meanwhile, as a paper feeding unit configured to feed the sheets 142 stacked on a paper loading unit (pressurizing plate) 141 of the paper feeding tray 102, a half-moon shaped roller (paper feeding roller 143) configured to separate and feed the sheets 142 one by one from the paper loading unit 141, and a separation pad 144, which faces the paper feeding roller 143, and is formed of a material with a large friction coefficient, are provided. The separation pad 144 is pressed against the paper feeding roller 143.

As for a conveyance unit for conveying the sheet 142 fed from the paper feeding unit to the bottom side of the recording head 134, provided are: a conveyance belt 151 configure to electrostatically adsorb and convey the sheet 142; a counter roller 152 configured to nip the sheet 142, which has been fed from the paper feeding unit through the guide, with the conveying belt 151, and convey the sheet 142; a conveyance quid 153 configured to switch the direction of the sheet 142, which has been fed substantially vertically upwards, by substantially 90°, and place the sheet 142 on the conveyance belt 151; an edge press roller 155, which is pressed against the conveyance belt 151 with a press member 154; and a charging roller 156, which is a charging unit configured to charge a surface of the conveyance belt 151.

The conveyance belt 151 is an endless belt, is supported with a conveying roller 157 and a tension roller 158, and is capable of rotating in a belt conveying direction. The conveyance belt 151 contains, for example, a surface layer, which is functions as a sheet adsorbing surface, and is formed of a resin material having a thickness of about 40 μm and resistance of which has not been controlled, such as a tetrafluoroethylene-ethylene copolymer (ETFE), and a back layer (intermediate resistance layer, or earthing layer) formed of the same material to the surface layer, and resistance of which has been controlled with carbon. At the back side of the conveyance belt 151, a guide member 161 is provided corresponding to a region of printing performed by the recording head 134. As for a discharging unit for discharging the sheet recorded by the recording head 134, provided are a separation claw 171 configured to separate the sheet 142 from the conveyance belt 151, and a paper discharge roller 172 and a paper discharge roller 173. At the bottom of the paper discharge roller 172, a paper discharge tray 103 is provided.

At the back side of the device main body 101, a double-sided paper feeding unit 181 is detachably provided. The double-sided paper feeding unit 181 is configured to take in the sheet 142 returned by the rotation of the conveyance belt 151 in the opposite direction, reverse it, followed by again feeding between the counter roller 152 and the conveyance belt 151. On the top plane of the double-sided paper feeding unit 181, a manual paper feeding unit 182 is provided.

In the inkjet recording device, sheets 142 are separated and fed one by one from the paper feeding unit, and the sheet 142 fed in a substantially vertically upwards direction is guided by the guide 145, and is then nipped between the conveyance belt 151 and the counter roller 152 to be transferred. Moreover, an edge of the sheet is guided by the conveyance guide 153 and pressed against the conveyance belt 151 with the edge press roller 155, to change the travelling direction by about 90°.

On this occasion, the conveyance belt 151 is charged by the charging roller 156, and the sheet 142 is electrostatically adsorbed onto the conveyance belt 151 to be conveyed. By driving the recording head 134 according the image signal with moving the carriage 133, the ink droplets are ejected on the stopped sheet 142 to record for 1 line. After transporting the sheet 142 at the predetermined distance, recording for the next line is carried out. The recording operation is terminated by receiving a recording termination signal or a signal that inform that a rear edge of the sheet 142 reaches the recording region, followed by discharging the sheet 142 to a paper discharge tray 103.

As a remaining amount of the recording ink in the sub-tank 135 is detected to be close to none, the predetermined amount of the recording ink is supplied from the ink cartridge 200 to the sub-tank 135.

When the recording ink in the ink cartridge 200 is run out in the inkjet recording device, a housing of the ink cartridge 200 is dismantled and only the ink bag present inside can be exchanged. Moreover, the ink cartridge 200 can stably supply the recording ink, even when the ink cartridge 200 is longitudinally placed and employs a front-loading structure. Even in the case where the device main body 101 is installed with little space over it, the ink cartridge 200 is easily exchanged, for example, when the device main body 101 is stored in a rack or when an object is placed over the device main body 101.

Note that, the example where a serial (shuttle) type inkjet recording device in which the carriage scans is explained above, but the present invention can be also applied for a line inkjet recording device equipped with a line-type head.

Figure 6:
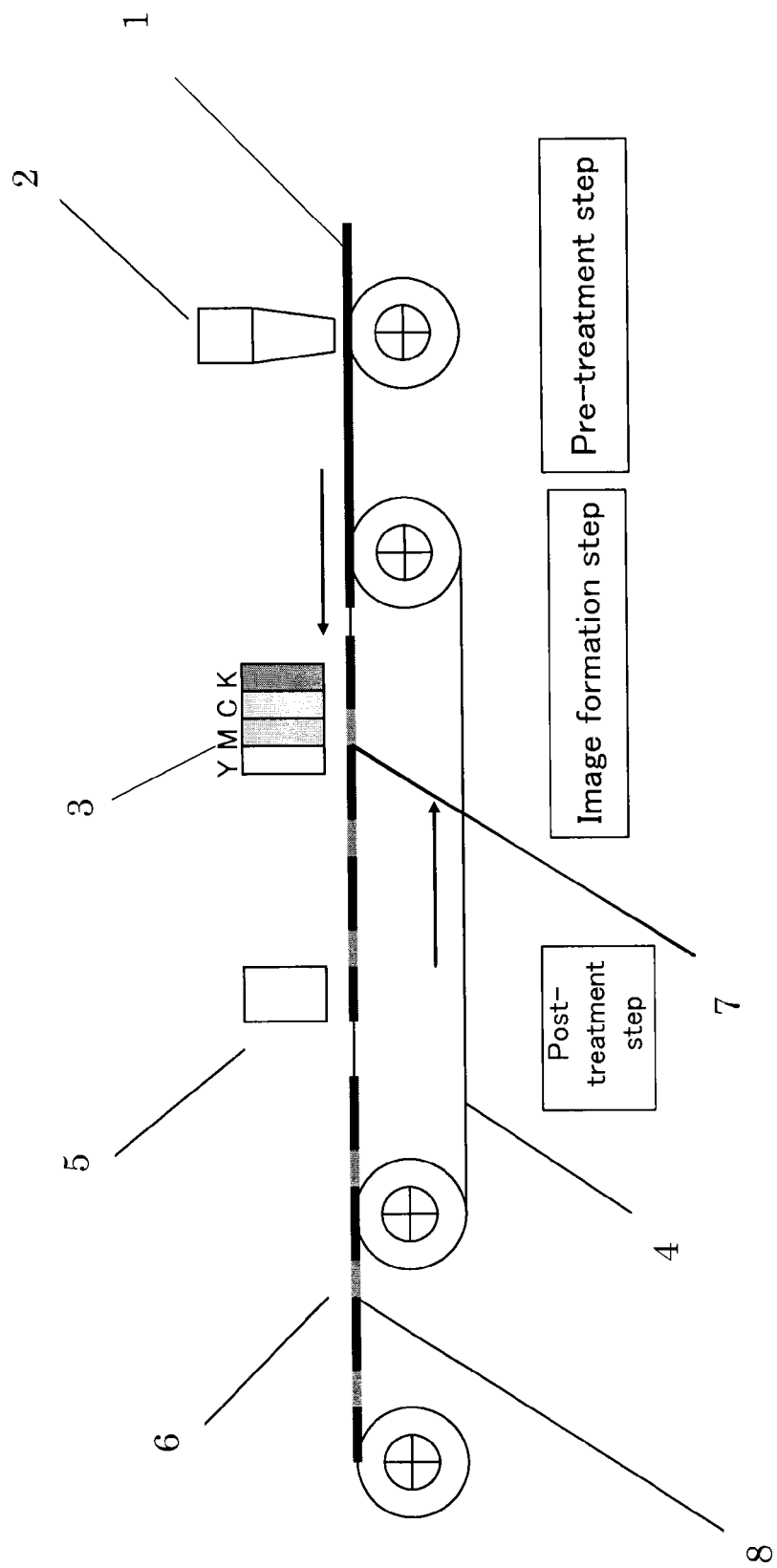
FIG. 6 is a diagram illustrating one example of an embodiment of the image forming method of the present invention.
Figure 7:
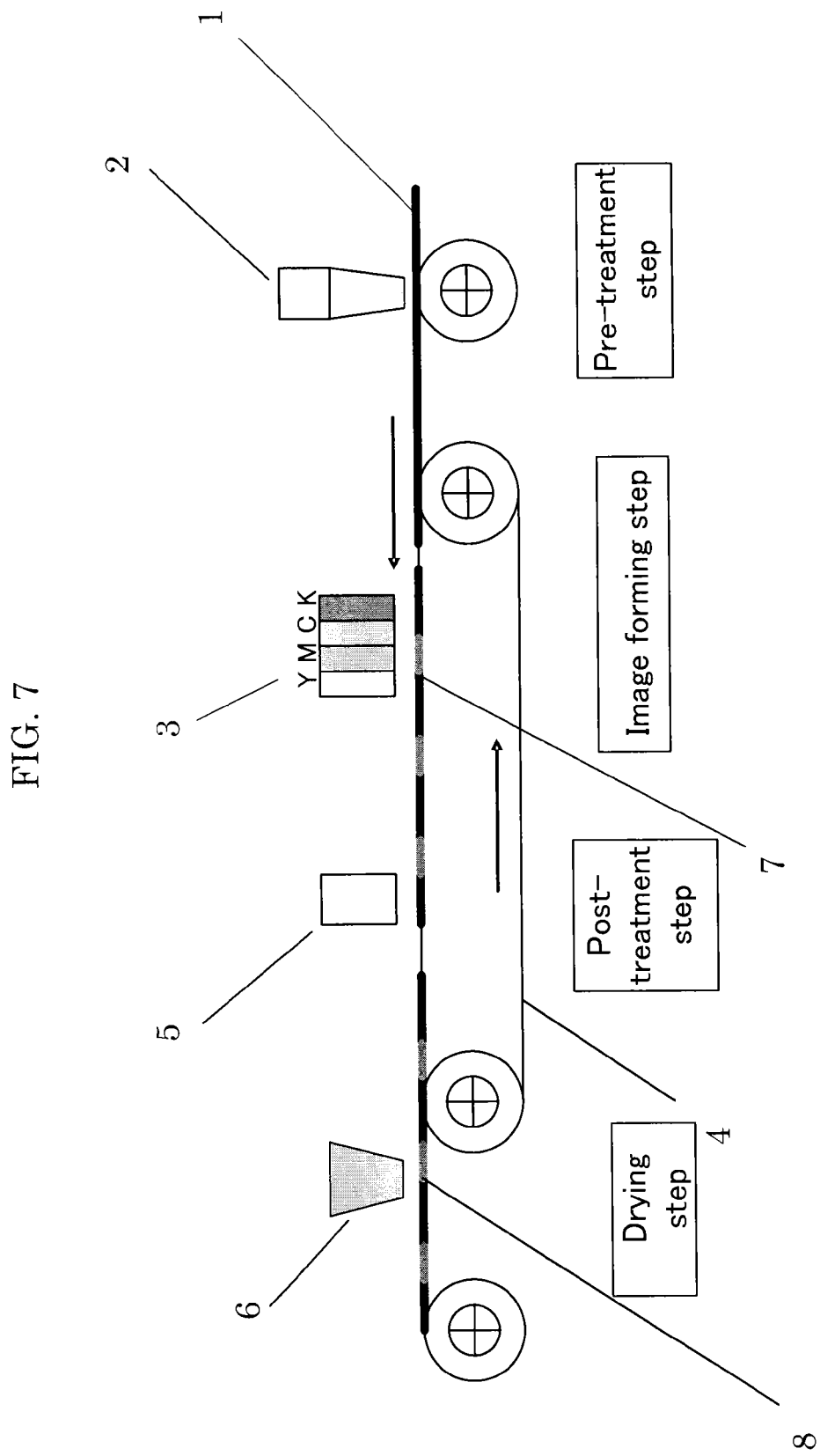
FIG. 7 is a diagram illustrating another example of an embodiment of the image forming method of the present invention.
Figure 8:
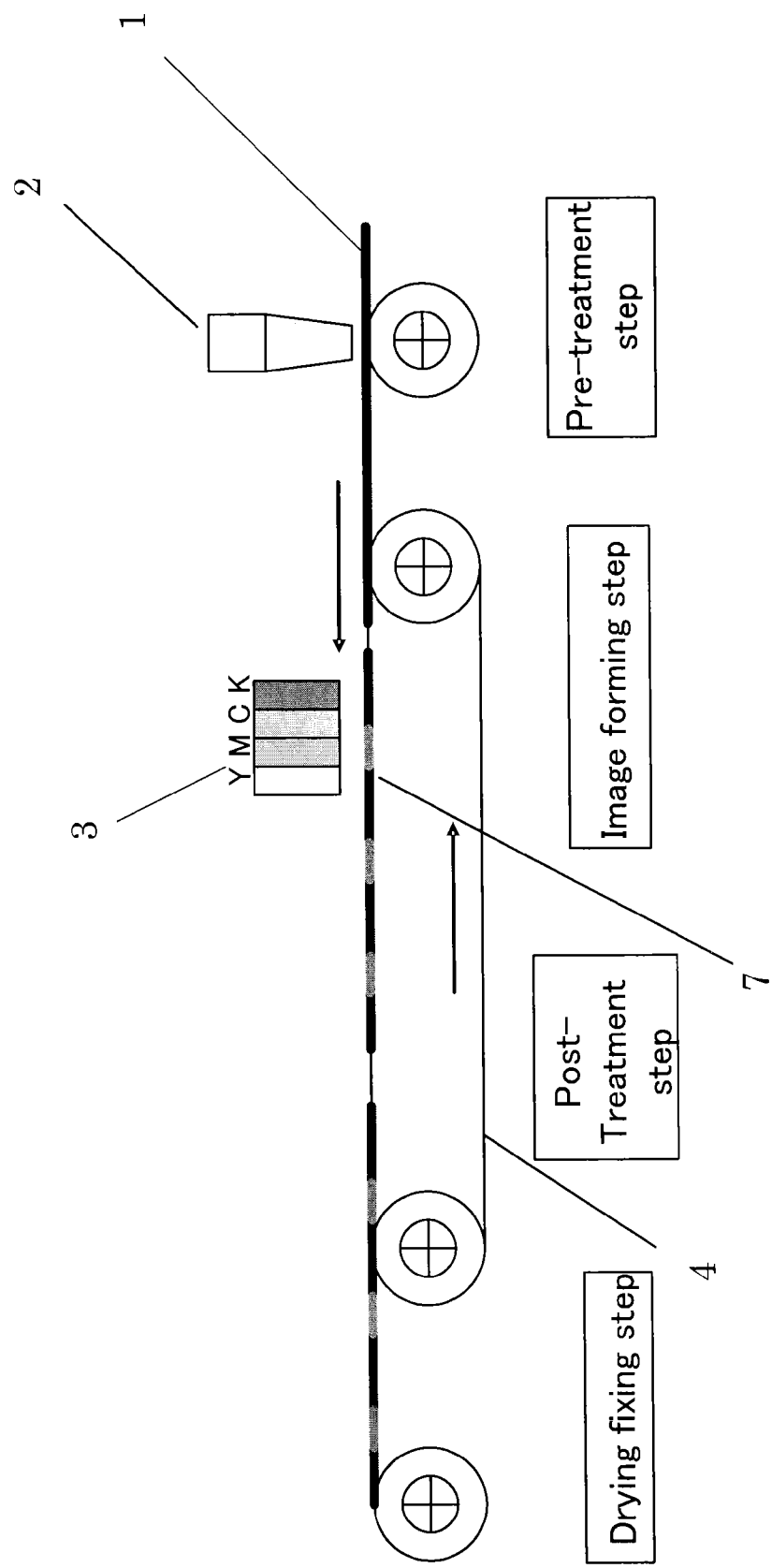
FIG. 8 is a diagram illustrating another example of an embodiment of the image forming method of the present invention.

One example of the embodiment of the image forming method of the present invention is illustrated in FIGS. 6 to 8.

FIG. 6 is a schematic diagram illustrating a whole scheme of the image forming method. In FIG. 6, 1 is a recording medium, 2 is surface modification performed by a plasma treatment, 3 is an ejection of an ink by an inkjet head, 4 is a conveying belt, 5 is an ejection of a post treatment liquid, 6 is drying performed by a drying unit (not illustrated), 7 is an image forming area, and 8 is a post treatment on the image forming area.

FIG. 7 is a schematic diagram illustrating a whole scheme of the image forming method, and illustrating an embodiment where drying is performed with warm air just after image formation. In FIG. 7, 1 is a recording medium, 2 is surface modification performed by a corona discharge treatment, 3 is an ejection of an ink by an inkjet head, 4 is a conveying belt, and 7 is an image forming area.

FIG. 8 is a schematic diagram illustrating a whole scheme of the image forming method. In FIG. 8, 1 is a recording medium, 2 is surface modification performed by a plasma treatment, 3 is an ejection of an ink by an inkjet head, 4 is a conveying belt, and 7 is an image forming area.

The inkjet recording device and inkjet recording method of the present invention can be applied for various recording of an inkjet recording system. For example, the inkjet recording device and inkjet recording method of the present invention can be particularly suitably applied for an inkjet recording printer, a facsimile, a photocopier, and a printer/fax/copier multifunction peripheral.

EXAMPLES

The present invention is explained through Examples hereinafter, but Examples shall not be construed as to limit the scope of the present invention.

Preparation Example 1

Preparation of Surface-Modified Black Pigment Dispersion (1)

By means of Silverson Mixer (6,000 rpm), 100 g of Black Pearls (registered trade mark) 1000 (carbon black having a BET specific surface area of 343 m²/g and DBPA of 105 mL/100 g) manufactured by Cabot Corporation, 100 mmol of the compound represented by the following structural formula (VI), and 1 L of ion-exchanged ultra pure water were mixed at room temperature. In the case where the pH of the obtained slurry was higher than 4, 100 mmol of nitric acid was added to the slurry. Thirty minutes later, sodium nitrite (100 mmol) dissolved in a small amount of ion-exchanged ultra pure water was gradually added to the aforementioned mixture. The resulting mixture was heated to 60° C. with stirring, and was allowed to react for 1 hour, to thereby generate a modified pigment, in which the compound represented by the structural formula (VI) was added to the carbon black.

Subsequently, pH of the resultant was adjusted to 10 with a NaOH aqueous solution. Thirty minutes later, a modified pigment dispersion was obtained. Ultrafiltration with a permeable membrane was performed using the dispersion containing the pigment to which a geminal bisphosphonic acid group, or a geminal bisphosphonate group, or both were bonded, and ion-exchanged ultra pure water, and the resultant was further subjected to ultrasonic dispersion, to thereby obtain a modified pigment dispersion the pigment solid content of which had been concentrated to 20% by mass.

The degree of the surface treatment was 0.75 mmol/g, and the volume average particle diameter as measured by a particle size distribution measuring device (NANOTRACK UPA-EX150, manufactured by Nikkiso Co., Ltd.) was 120 nm. Moreover, the sodium ion content was measured by means of TOA-DKK ion meter IM-32P (manufactured by DKK-TOA CORPORATION), and the result was 27,868 ppm. The phosphorous (P) content as measured by an elementary analysis was 2.31% by mass.

[Compound represented by Structural Formula (VI)]

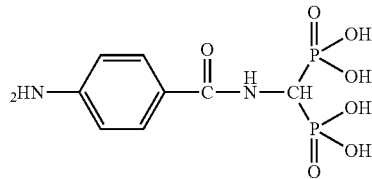

Preparation Example 2

Preparation of Surface Modified Black Pigment Dispersion (2)

Into Process All 4HV Mixer (4 L), 500 g of Black Pearls (registered trade mark) 880 (carbon black having a BET surface area of 220 m²/g and DBPA of 105 mL/100 g) manufactured by Cabot Corporation, 1 L of ion-exchanged ultra pure water, and 1 mol of the compound represented by the structural formula (VI). Subsequently, the resulting mixture was strongly mixed at 300 rpm, for 10 minutes with heating to 60° C. To the resultant, a 20% sodium nitrite aqueous solution [1 mole equivalent based on the compound represented by structural formula (VI)] was added over 15 minutes. The resulting mixture was mixed and stirred for 3 hours with heating to 60° C. The resulting reaction product was taken out by diluting with 750 mL of ion-exchanged ultra pure water. Ultrafiltration with a permeable membrane was carried out using the obtained modified pigment dispersion and ion-exchanged ultra pure water, and ultrasonic wave dispersion was further carried out to thereby obtain a modified pigment dispersion, a pigment solid content of which had been concentrated to 20%.

The degree of the surface treatment was 0.5 mmol/g, and the volume average particle diameter as measured by a particle size distribution measuring device (NANOTRACK UPA-EX150, manufactured by Nikkiso Co., Ltd.) was 104 nm. Moreover, the sodium ion content was measured by means of TOA-DKK ion meter IM-32P (manufactured by DKK-TOA CORPORATION), and the result was 19,940 ppm. The phosphorous (P) content as measured by an elementary analysis was 2.20% by mass.

Preparation Example 3

Preparation of Surface Modified Magenta Pigment Dispersion (1)

By means of Silverson Mixer (6,000 rpm), 690 g of SMART Magenta 3122BA (surface-treated Pigment Red 122 dispersion, pigment solid content: 14.5% by mass) manufactured by Sensient Technologies Corporation, 50 mmol of the compound represented by the structural formula (VI), and 500 mL of ion-exchanged ultra pure water were mixed at room temperature. Thirty minutes later, sodium nitrite (100 mmol) dissolved in a small amount of ion-exchanged ultra pure water was gradually added to the aforementioned mixture. The resulting mixture was heated to 60° C. with stirring, and was allowed to react for 1 hour, to thereby generate a modified pigment, in which the compound represented by the structural formula (VI) was added to Pigment Red 122. Subsequently, pH of the resultant was adjusted to 10 with tetramethylammonium hydroxide. Thirty minutes later, a modified pigment dispersion was obtained. Ultrafiltration with a permeable membrane was performed using the dispersion containing the pigment to which a geminal bisphosphonic acid group, or a geminal bisphosphonate group, or both were bonded, and ion-exchanged ultra pure water, and the resultant was further subjected to ultrasonic dispersion, to thereby obtain a modified pigment dispersion the pigment solid content of which had been concentrated to 20% by mass.

The degree of the surface treatment was 0.50 mmol/g, and the volume average particle diameter as measured by a particle size distribution measuring device (NANOTRACK UPA-EX150, manufactured by Nikkiso Co., Ltd.) was 106 nm. Moreover, the phosphorous (P) content as measured by an elementary analysis was 0.25% by mass.

Preparation Example 4

Preparation of Surface Modified Cyan Pigment Dispersion (1)

By means of Silverson Mixer (6,000 rpm), 690 g of SMART Cyan 3154BA (surface-treated Pigment Blue 15:4 dispersion, pigment solid content: 14.5% by mass) manufactured by Sensient Technologies Corporation, 50 mmol of the compound represented by the structural formula (VI), and 500 mL of ion-exchanged ultra pure water were mixed at room temperature. Thirty minutes later, sodium nitrite (100 mmol) dissolved in a small amount of ion-exchanged ultra pure water was gradually added to the aforementioned mixture. The resulting mixture was heated to 60° C. with stirring, and was allowed to react for 1 hour, to thereby generate a modified pigment, in which the compound represented by the structural formula (VI) was added to Pigment Blue 15:4. Subsequently, pH of the resultant was adjusted to 10 with tetramethylammonium hydroxide. Thirty minutes later, a modified pigment dispersion was obtained. Ultrafiltration with a permeable membrane was performed using the dispersion containing the pigment to which a geminal bisphosphonic acid group, or a geminal bisphosphonate group, or both were bonded, and ion-exchanged ultra pure water, and the resultant was further subjected to ultrasonic dispersion, to thereby obtain a modified pigment dispersion the pigment solid content of which had been concentrated to 20% by mass.

The degree of the surface treatment was 0.50 mmol/g, and the volume average particle diameter as measured by a particle size distribution measuring device (NANOTRACK UPA-EX150, manufactured by Nikkiso Co., Ltd.) was 113 nm. Moreover, the phosphorous (P) content as measured by an elementary analysis was 0.27% by mass.

Preparation Example 5

Preparation of Surface Modified Yellow Pigment Dispersion (1)

By means of Silverson Mixer (6,000 rpm), 690 g of SMART Yellow 3074BA (surface treated Pigment Yellow 74 dispersion, pigment solid content: 14.5% by mass) manufactured by Sensient Technologies Corporation, 50 mmol of the compound represented by the structural formula (VI), and 500 mL of ion-exchanged ultra pure water were mixed. Thirty minutes later, sodium nitrite (100 mmol) dissolved in a small amount of ion-exchanged ultra pure water was gradually added to the aforementioned mixture. Moreover, the resulting mixture was heated to 60° C. with stirring, and was allowed to react for 1 hour, to thereby generate a modified pigment, in which the compound represented by the structural formula (VI) was added to Pigment Yellow 74. Subsequently, pH of the resultant was adjusted to 10 with tetrabutylammonium hydroxide. Thirty minutes later, a modified pigment dispersion was obtained. Ultrafiltration with a permeable membrane was performed using the dispersion containing the pigment to which a geminal bisphosphonic acid group, or geminal tetrabutylammonium phosphonate group, or both were bonded, and ion-exchanged ultra pure water, and the resultant was further subjected to ultrasonic dispersion, to thereby obtain a modified pigment dispersion the pigment solid content of which had been concentrated to 20% by mass.

The degree of the surface treatment was 0.50 mmol/g, and the volume average particle diameter as measured by a particle size distribution measuring device (NANOTRACK UPA-EX150, manufactured by Nikkiso Co., Ltd.) was 142 nm. Moreover, the phosphorous (P) content as measured by an elementary analysis was 0.26% by mass.

Preparation Example 6

Preparation of Magenta Pigment-Containing Polymer Particle Dispersion

—Preparation of Polymer Solution A—
After sufficiently purging a 1 L flask equipped with a mechanical stirrer, a thermometer, a nitrogen inlet tube, a reflux tube, and a dripping funnel with nitrogen gas, the flask was charged with 11.2 g of styrene, 2.8 g of acrylic acid, 12.0 g of lauryl methacrylate, 4.0 g of polyethylene glycol methacrylate, 4.0 g of styrene macromer, and 0.4 g of mercapto ethanol, and the mixture was mixed and heated to 65° C. Next, a mixed solution of styrene (100.8 g), acrylic acid (25.2 g), lauryl methacrylate (108.0 g), polyethylene glycol methacrylate (36.0 g), hydroxyethyl methacrylate (60.0 g), styrene macromer (36.0 g), mercapto ethanol (3.6 g), azobis methylvaleronitrile (2.4 g), and methyl ethyl ketone (18 g) was added dropwise into the flask over 2.5 hours. After the dripping, a mixed solution of azobis methylvaleronitrile (0.8 g) and methyl ethyl ketone (18 g) was added dropwise into the flask over 0.5 hours. After aging the mixture at 65° C. for 1 hour, 0.8 g of azobis methylvaleronitrile was added, and the resultant was further aged for 1 hour. Upon completion of the reaction, methyl ethyl ketone (364 g) was added to the flask, to thereby obtain 800 g of Polymer Solution A having a concentration of 50% by mass.

—Preparation of Pigment-Containing Polymer Particle Dispersion—

After sufficiently stirring a mixture of Polymer Solution A (28 g), C.I. Pigment Red 122 (42 g), a 1 mol/L potassium hydroxide aqueous solution (13.6 g), methyl ethyl ketone (20 g), and ion-exchanged water (13.6 g), the resulting mixture was kneaded by a roll mill. To the obtained paste, 200 g of pure water was added, the resulting mixture was sufficiently stirred, and methyl ethyl ketone and water were removed from the resultant using an evaporator, followed by subjecting the resultant to pressure filtration with a polyvinylidene fluoride membrane filter having the average pore diameter of 5.0 μm to remove coarse particles, to thereby obtain a magenta pigment-containing polymer dispersion liquid having a pigment solid content of 15% by mass, and solid content of 20% by mass.

The volume average particle diameter of the polymer particles in the obtained magenta pigment-containing polymer particle dispersion liquid was measured by a particle size distribution measuring device (NANOTRACK UPA-EX150, manufactured by Nikkiso Co., Ltd.), and the result was 127 nm.

Preparation Example 7

Preparation of Cyan Pigment-Containing Polymer Particle Dispersion

A cyan pigment-containing polymer dispersion liquid was prepared in the same manner as in Preparation Example 6, provided that C.I. Pigment Red 122 used as a pigment in Preparation Example 6 was changed to a phthalocyanine pigment (C.I. Pigment Blue 15:3).

The volume average particle diameter of the polymer particles in the obtained cyan pigment-containing polymer particle dispersion liquid was measured by a particle size distribution measuring device (NANOTRACK UPA-EX150, manufactured by Nikkiso Co., Ltd.) and the result was 93 nm.

Preparation Example 8

Preparation of Yellow Pigment-Containing Polymer Particle Dispersion

A yellow pigment-containing polymer particle dispersion was prepared in the same manner as in Preparation Example 6, provided that C.I. Pigment Red 122 used as a pigment in Preparation Example 6 was changed to a monoazo yellow pigment (C.I. Pigment Yellow 74).

The volume average particle diameter of the polymer particles in the obtained yellow pigment-containing polymer particle dispersion liquid was measured by a particle size distribution measuring device (NANOTRACK UPA-EX150, manufactured by Nikkiso Co., Ltd.) and the result was 76 nm.

Preparation Example 9

Preparation of Carbon Black Pigment-Containing Polymer Particle Dispersion

A carbon black pigment-containing polymer particle dispersion liquid was prepared in the same manner as in Preparation Example 6, provided that C.I. Pigment Red 122 used as a pigment in Preparation Example 6 was changed to carbon black (FW100, manufactured by Degussa AG).

The volume average particle diameter of the polymer particles in is the obtained carbon black pigment-containing polymer particle dispersion liquid was measured by a particle size distribution measuring device (NANOTRACK UPA-EX150, manufactured by Nikkiso Co., Ltd.) and the result was 104 nm.

Preparation Example 10

Preparation of Yellow Pigment Surfactant Dispersion

| | |
|---|---|
| Monoazo yellow pigment (C.I. Pigment Yellow 74, manufactured by Dainichiseika Color & Chemicals Mfg. Co., Ltd.) | 30.0 parts by mass |
| Polyoxyethylene styrene phenyl ether (nonionic surfactant, NOIGEN EA-177 manufactured by Daiichi Kogyo Seiyaku Co., Ltd., HLB value: 15.7) | 10.0 parts by mass |
| Ion-exchanged water | 60.0 parts by mass |

At first, the aforementioned surfactant was dissolved in ion-exchanged water, and to this the aforementioned pigment was mixed to sufficiently wet the pigment. The resulting mixture was dispersed at 2,000 rpm for 2 hours by a wet disperser (DYNO-MILL KDL A, manufactured by WAB) filled with zirconia beads having diameters of 0.5 mm, to thereby obtain a primary pigment dispersion.

Next, 4.26 parts by mass of a water-soluble urethane resin (TAKELAC W-5661, manufactured by Mitsui Chemicals, Inc., active ingredient: 35.2% by mass, acid value: 40 mgKOH/g, molecular weight: 18,000) was added, as a water-soluble polymer compound aqueous solution, to the primary pigment dispersion, and the resulting mixture was sufficiently stirred to thereby obtain a yellow pigment surfactant dispersion liquid.

The volume average particle diameter of the pigment dispersion in the obtain yellow pigment surfactant dispersion liquid was measured by a particle size distribution measuring device (NANOTRACK UPA-EX150, manufactured by Nikkiso Co., Ltd.) and the result was 62 nm.

Preparation Example 11

Preparation of Magenta Pigment Surfactant Dispersion

| | |
|---|---|
| Quinacridon pigment (C.I. Pigment Red 122, manufactured by Dainichiseika Color & Chemicals Mfg. Co., Ltd.) | 30.0 parts by mass |
| Polyoxyethylene-β-napthyl ether (nonionic surfactant, RT-100 manufactured by Takemoto Oil & Fat Co., Ltd., HLB value: 18.5) | 10.0 parts by mass |
| Ion-exchanged water | 60.0 parts by mass |

At first, the aforementioned surfactant was dissolved in ion-exchanged water, and to this the aforementioned pigment was mixed to sufficiently wet the pigment. The resulting mixture was dispersed at 2,000 rpm for 2 hours by a wet disperser (DYNO-MILL KDL A, manufactured by WAB) filled with zirconia beads having diameters of 0.5 mm, to thereby obtain a primary pigment dispersion.

Next, 7.14 parts by mass of a water-soluble styrene-(meth)acrylic acid copolymer (JC-05, manufactured by SEIKO PMC CORPORATION, active ingredient: 21% by mass, acid value: 170 mgKOH/g, the weight average molecular weight: 16,000) was added to the primary pigment dispersion, and the resulting mixture was sufficiently stirred to thereby obtain a magenta pigment surfactant dispersion liquid.

The volume average particle diameter of the pigment dispersion in the obtain magenta pigment surfactant dispersion liquid was measured by a particle size distribution measuring device (NANOTRACK UPA-EX150, manufactured by Nikkiso Co., Ltd.) and the result was 83 nm.

Preparation Example 12

Preparation of Cyan Pigment Surfactant Dispersion Liquid

| | |
|---|---|
| Phthalocyanine pigment (C.I. Pigment Blue 15:3, manufactured by Dainichiseika Color & Chemicals Mfg. Co., Ltd.) | 30.0 parts by mass |
| Polyoxyethylene styrene phenyl ether (nonionic surfactant, NOIGEN EA-177 manufactured by Daiichi Kogyo Seiyaku Co., Ltd., HLB value: 15.7) | 10.0 parts by mass |
| Ion-exchanged water | 60.0 parts by mass |

At first, the aforementioned surfactant was dissolved in ion-exchanged water, and to this the aforementioned pigment was mixed to sufficiently wet the pigment. The resulting mixture was dispersed at 2,000 rpm for 2 hours by a wet disperser (DYNO-MILL KDL A, manufactured by WAB) filled with zirconia beads having diameters of 0.5 mm, to thereby obtain a primary pigment dispersion.

Next, 5.02 parts by mass of a water-soluble polyester resin (NICHIGO POLYESTER W-0030, manufactured by Nippon Synthetic Chemical Industry Co., Ltd., active ingredient: 29.9% by mass, acid value: 100 mgKOH/g, the weight average molecular weight: 7,000) was added to the primary pigment dispersion, and the resulting mixture was sufficiently stirred to thereby obtain a cyan pigment surfactant dispersion liquid.

The volume average particle diameter of the pigment dispersion in the obtain cyan pigment surfactant dispersion liquid was measured by a particle size distribution measuring device (NANOTRACK UPA-EX150, manufactured by Nikkiso Co., Ltd.) and the result was 78 nm.

Production Examples 1 to 28

Production of Inkjet Recording Ink

First, an organic solvent, a penetrating agent, a surfactant, a defoaming agent, an antifungal agent, and water were blended as depicted in Tables 1 to 6, and the resulting mixture was stirred for 1 hour to homogeneously mix the mixture. Depending on the mixed liquid, moreover, an ink was prepared by adding a water-dispersible resin followed by stirring for 1 hour, and then adding a water-dispersible colorant (pigment dispersion) and a pH regulator, followed by stirring for 1 hour. The resulting ink was subjected to pressure filtration using a polyvinylidene fluoride membrane filter having the average pore diameter of 1.2 μm to remove coarse particles and dusts, to thereby obtain each of inkjet recording inks of Production Examples 1 to 28.

TABLE 1

| | Ingredient (% by mass) | Pro. Ex, 1 | Pro. Ex, 2 | Pro. Ex, 3 | Pro. Ex, 4 | Pro. Ex, 5 |
|---|---|---|---|---|---|---|
| Water-dispersible colorant (pigment dispersion) | Surface modified black pigment dispersion (1) (Prep. Ex. 1) | — | — | — | — | 37.50 |
| | Surface modified black pigment dispersion (2) (Prep. Ex. 2) | — | — | — | — | — |
| | Surface modified magenta pigment dispersion (1) (Prep. Ex. 3) | — | — | — | — | — |
| | Surface modified cyan pigment dispersion (1) (Prep. Ex. 4) | — | — | — | — | — |
| | Surface modified yellow pigment dispersion (1) (Prep. Ex. 5) | — | — | — | — | — |
| | Magenta pigment-containing polymer particle dispersion (Prep. Ex. 6) | 50.00 | — | — | — | — |
| | Cyan pigment-containing polymer particle dispersion (Prep. Ex. 7) | — | 30.00 | — | — | — |
| | Yellow pigment-containing polymer particle dispersion (Prep. Ex. 8) | — | — | 30.00 | — | — |
| | Carbon black pigment-containing polymer particle dispersion (Prep. Ex. 9) | — | — | — | 50.00 | — |
| | Yellow pigment surfactant dispersion (Prep. Ex. 10) | — | — | — | — | — |
| | Magenta pigment surfactant dispersion (Prep. Ex. 11) | — | — | — | — | — |
| | Cyan pigment surfactant dispersion (Prep. Ex. 12) | — | — | — | — | — |
| Water-dispersible resin | Acryl-silicone resin emulsion | — | — | — | — | 6.27 |
| | Fluororesin emulsion | — | — | — | — | — |
| | Polyurethane emulsion | — | — | — | — | — |
| Organic solvent represented by formula | Amide compound of structural formula (I-1) | — | — | — | — | 15.00 |
| | Amide compound of structural formula (I-2) | — | — | — | — | — |
| | Amide compound of structural formula (I-3) | — | — | — | — | — |
| | Oxetane compound of structural formula (II-1) | — | — | — | — | — |
| | Oxetane compound of structural formula (II-2) | — | — | — | — | — |
| | Amide compound of structural formula (1) | — | — | — | — | — |
| Alkyl alkane diol | 3-methyl-1,3-butanediol | — | — | — | 17.00 | 2.50 |
| | 3-methyl-1,5-pentanediol | — | — | — | — | — |
| Organic solvent | Propylene glycol | — | — | — | — | — |
| | Glycerin | 12.00 | 21.00 | 21.00 | 17.00 | 15.00 |
| | 1,3-butanediol | 24.00 | 21.00 | 21.00 | — | — |
| Penetrating agent | 2-ethyl-1,3-hexanechol | 2.00 | 2.00 | 2.00 | 1.50 | — |
| | 2,2,4-trimethyl-1,3-pentanediol | — | — | — | — | 2.00 |
| Surfactant | KF-643 | — | — | — | — | 1.00 |
| | Zonyl FS-300 | — | — | — | — | — |
| | Compound of formula (q) of general formula (2) | 0.06 | 0.06 | 0.06 | 0.05 | — |
| | Surfynol 104E | — | — | — | — | — |
| | Softanol EP-7025 | — | — | — | — | — |
| Antifungal agent | Proxel GXL | 0.05 | 0.05 | 0.05 | 0.05 | 0.05 |
| Foam inhibitor (defoaming agent) | 2,4,7,9-tetramethyldecane-4,7-diol | 0.24 | 0.24 | 0.24 | 0.20 | — |
| | 2,5,8,11-tetramethyldodecane-5,8-diol | — | — | — | — | 0.10 |
| pH regulator | 2-amino-2-ethyl-1,3-propanediol | 0.20 | 0.20 | 0.20 | 0.30 | 0.30 |
| | Pure water | balance | balance | balance | balance | balance |
| | Total (% by mass) | 100 | 100 | 100 | 100 | 100 |

TABLE 2

| Ingredient (% by mass) | | Pro. Ex, 6 | Pro. Ex, 7 | Pro. Ex, 8 | Pro. Ex, 9 | Pro. Ex, 10 |
|---|---|---|---|---|---|---|
| Water-dispersible colorant (pigment dispersion) | Surface modified black pigment dispersion (1) (Prep. Ex. 1) | — | — | — | — | — |
| | Surface modified black pigment dispersion (2) (Prep. Ex. 2) | — | — | — | 37.50 | — |
| | Surface modified magenta pigment dispersion (1) (Prep. Ex. 3) | 37.50 | — | — | — | 37.50 |
| | Surface modified cyan pigment dispersion (1) (Prep. Ex. 4) | — | 22.50 | — | — | — |
| | Surface modified yellow pigment dispersion (1) (Prep. Ex. 5) | — | — | 22.50 | — | — |
| | Magenta pigment-containing polymer particle dispersion (Prep. Ex. 6) | — | — | — | — | — |
| | Cyan pigment-containing polymer particle dispersion (Prep. Ex. 7) | — | — | — | — | — |
| | Yellow pigment-containing polymer particle dispersion (Prep. Ex. 8) | — | — | — | — | — |
| | Carbon black pigment-containing polymer particle dispersion (Prep. Ex. 9) | — | — | — | — | — |
| | Yellow pigment surfactant dispersion (Prep. Ex. 10) | — | — | — | — | — |
| | Magenta pigment surfactant dispersion (Prep. Ex. 11) | — | — | — | — | — |
| | Cyan pigment surfactant dispersion (Prep. Ex. 12) | — | — | — | — | — |
| Water-dispersible resin | Acryl-silicone resin emulsion | 6.27 | 6.27 | 6.27 | 5.01 | 5.01 |
| | Fluororesin emulsion | — | — | — | — | — |
| | Polyurethane emulsion | — | — | — | — | — |
| Organic solvent represented by formula | Amide compound of structural formula (I-1) | 15.00 | — | — | 10.00 | 10.00 |
| | Amide compound of structural formula (I-2) | — | — | 15.00 | — | — |
| | Amide compound of structural formula (I-3) | — | 15.00 | — | — | — |
| | Oxetane compound of structural formula (II-1) | — | — | — | — | 10.00 |
| | Oxetane compound of structural formula (II-2) | — | — | — | 12.50 | — |
| | Amide compound of structural formula (1) | — | — | — | 10.00 | 10.00 |
| Alkyl alkane diol | 3-methyl-1,3-butanediol | — | — | — | — | — |
| | 3-methyl-1,5-pentanediol | — | — | — | — | — |
| Organic solvent | Propylene glycol | — | — | — | — | — |
| | Glycerin | 15.00 | 15.00 | 15.00 | 8.00 | 10.50 |
| | 1,3-butanediol | 2.50 | 7.50 | 7.50 | — | — |
| Penetrating agent | 2-ethyl-1,3-hexanediol | — | — | — | 2.00 | 2.00 |
| | 2,2,4-trimethyl-1,3-pentanediol | 2.00 | 2.00 | 2.00 | — | — |
| Surfactant | KF-643 | 1.00 | 1.00 | 1.00 | — | — |
| | Zonyl FS-300 | 0.50 | 0.50 | 0.50 | — | — |
| | Compound of formula (q) of general formula (2) | — | — | — | 0.12 | 0.12 |
| | Surfynol 104E | — | — | — | — | — |
| | Softanol EP-7025 | — | — | — | — | — |
| Antifungal agent | Proxel GXL | 0.05 | 0.05 | 0.05 | 0.05 | 0.05 |
| Foam inhibitor (defoaming agent) | 2,4,7,9-tetramethyldecane-4,7-diol | — | — | — | 0.48 | 0.48 |
| | 2,5,8,11-tetramethyldodecane-5,8-diol | 0.10 | 0.10 | 0.10 | — | — |
| pH regulator | 2-amino-2-ethyl-1,3-propanediol | 0.15 | 0.15 | 0.15 | 0.20 | 0.10 |
| | Pure water | balance | balance | balance | balance | balance |
| | Total (% by mass) | 100 | 100 | 100 | 100 | 100 |

TABLE 3

| Ingredient (% by mass) | | Pro. Ex, 11 | Pro. Ex, 12 | Pro. Ex, 13 | Pro. Ex, 14 | Pro. Ex, 15 |
|---|---|---|---|---|---|---|
| Water-dispersible colorant (pigment dispersion) | Surface modified black pigment dispersion (1) (Prep. Ex. 1) | — | — | — | — | — |
| | Surface modified black pigment dispersion (2) (Prep. Ex. 2) | — | — | 37.50 | — | — |
| | Surface modified magenta pigment dispersion (1) (Prep. Ex. 3) | — | — | — | — | — |
| | Surface modified cyan pigment dispersion (1) (Prep. Ex. 4) | 22.50 | — | — | — | — |
| | Surface modified yellow pigment dispersion (1) (Prep. Ex. 5) | — | 22.50 | — | — | — |
| | Magenta pigment-containing polymer particle dispersion (Prep. Ex. 6) | — | — | — | — | — |
| | Cyan pigment-containing polymer particle dispersion (Prep. Ex. 7) | — | — | — | — | — |
| | Yellow pigment-containing polymer particle dispersion (Prep. Ex. 8) | — | — | — | — | — |
| | Carbon black pigment-containing polymer particle dispersion (Prep. Ex. 9) | — | — | — | — | — |

TABLE 3-continued

| | Ingredient (% by mass) | Pro. Ex, 11 | Pro. Ex, 12 | Pro. Ex, 13 | Pro. Ex, 14 | Pro. Ex, 15 |
|---|---|---|---|---|---|---|
| | Yellow pigment surfactant dispersion (Prep. Ex. 10) | — | — | — | 13.90 | — |
| | Magenta pigment surfactant dispersion (Prep. Ex. 11) | — | — | — | — | 26.79 |
| | Cyan pigment surfactant dispersion (Prep. Ex. 12) | — | — | — | — | — |
| Water-dispersible resin | Acryl-silicone resin emulsion | 5.01 | 5.01 | — | — | — |
| | Fluororesin emulsion | — | — | 6.00 | — | — |
| | Polyurethane emulsion | — | — | — | 4.44 | 4.44 |
| Organic solvent represented by formula | Amide compound of structural formula (I-1) | 10.00 | 10.00 | 10.00 | — | — |
| | Amide compound of structural formula (I-2) | — | — | — | — | 10.00 |
| | Amide compound of structural formula (I-3) | — | — | — | 10.00 | — |
| | Oxetane compound of structural formula (II-1) | 17.50 | 17.50 | 7.50 | — | 10.00 |
| | Oxetane compound of structural formula (II-2) | — | — | — | 12.50 | — |
| | Amide compound of structural formula (1) | 10.00 | 10.00 | 10.00 | 10.00 | 10.00 |
| Alkyl alkane diol | 3-methyl-1,3-butanediol | — | — | — | — | — |
| | 3-methyl-1,5-pentanediol | — | — | — | 3.00 | — |
| Organic solvent | Propylene glycol | — | — | — | — | — |
| | Glycerin | 12.00 | 12.00 | 10.00 | 10.00 | 11.00 |
| | 1,3-butanediol | — | — | — | — | — |
| Penetrating agent | 2-ethyl-1,3-hexanediol | 2.00 | 2.00 | 2.00 | — | — |
| | 2,2,4-trimethyl-1,3-pentanediol | — | — | — | 2.00 | 2.00 |
| Surfactant | KF-643 | — | — | — | — | — |
| | Zonyl FS-300 | — | — | — | — | — |
| | Compound of formula (q) of general formula (2) | 0.12 | 0.12 | — | — | — |
| | Surfynol 104E | — | — | 1.00 | 1.25 | 1.25 |
| | Softanol EP-7025 | — | — | — | — | — |
| Antifungal agent | Proxel GXL | 0.05 | 0.05 | 0.05 | 0.05 | 0.05 |
| Foam inhibitor (defoaming agent) | 2,4,7,9-tetramethyldecane-4,7-diol | 0.48 | 0.48 | 0.25 | — | — |
| | 2,5,8,11-tetramethyldodecane-5,8-diol | — | — | — | 0.25 | 0.25 |
| pH regulator | 2-amino-2-ethyl-1,3-propanediol | 0.10 | 0.10 | 0.20 | 0.10 | 0.10 |
| | Pure water | balance | balance | balance | balance | balance |
| | Total (% by mass) | 100 | 100 | 100 | 100 | 100 |

TABLE 4

| | Ingredient (% by mass) | Pro. Ex, 16 | Pro. Ex, 17 | Pro. Ex, 18 | Pro. Ex, 19 | Pro. Ex, 20 |
|---|---|---|---|---|---|---|
| Water-dispersible colorant (pigment dispersion) | Surface modified black pigment dispersion (1) (Prep. Ex. 1) | — | — | — | — | — |
| | Surface modified black pigment dispersion (2) (Prep. Ex. 2) | — | 37.50 | — | — | — |
| | Surface modified magenta pigment dispersion (1) (Prep. Ex. 3) | — | — | — | — | — |
| | Surface modified cyan pigment dispersion (1) (Prep. Ex. 4) | — | — | — | — | — |
| | Surface modified yellow pigment dispersion (1) (Prep. Ex. 5) | — | — | — | — | — |
| | Magenta pigment-containing polymer particle dispersion (Prep. Ex. 6) | — | — | — | — | — |
| | Cyan pigment-containing polymer particle dispersion (Prep. Ex. 7) | — | — | — | — | — |
| | Yellow pigment-containing polymer particle dispersion (Prep. Ex. 8) | — | — | — | — | — |
| | Carbon black pigment-containing polymer particle dispersion (Prep. Ex. 9) | — | — | — | — | — |
| | Yellow pigment surfactant dispersion (Prep. Ex. 10) | — | — | 13.90 | — | — |
| | Magenta pigment surfactant dispersion (Prep. Ex. 11) | — | — | — | 26.79 | — |
| | Cyan pigment surfactant dispersion (Prep. Ex. 12) | 14.00 | — | — | — | 14.00 |
| Water dispersible resin | Acryl-silicone resin emulsion | — | 6.27 | 6.27 | 6.27 | 6.27 |
| | Fluororesin emulsion | — | — | — | — | — |
| | Polyurethane emulsion | 4.44 | — | — | — | — |
| Organic solvent represented by formula | Amide compound of structural formula (I-1) | — | — | — | — | — |
| | Amide compound of structural formula (I-2) | — | — | — | — | — |
| | Amide compound of structural formula (I-3) | 10.00 | — | — | — | — |
| | Oxetane compound of structural formula (II-1) | 10.00 | — | — | — | — |
| | Oxetane compound of structural formula (II-2) | 12.50 | — | — | — | — |
| | Amide compound of structural formula (1) | 10.00 | — | — | — | — |
| Alkyl alkane diol | 3-methyl-1,3-butanediol | — | 5.00 | — | — | — |
| | 3-methyl-1,5-pentanediol | 3.00 | — | — | — | — |
| Organic solvent | Propylene glycol | — | 7.50 | 7.50 | 7.50 | 7.50 |
| | Glycerin | 10.00 | 17.50 | 15.00 | 17.50 | 15.00 |
| | 1,3-butanediol | — | — | 15.00 | 7.00 | 15.00 |

TABLE 4-continued

|  | Ingredient (% by mass) | Pro. Ex, 16 | Pro. Ex, 17 | Pro. Ex, 18 | Pro. Ex, 19 | Pro. Ex, 20 |
|---|---|---|---|---|---|---|
| Penetrating agent | 2-ethyl-1,3-hexanediol | — | 2.00 | 2.00 | 2.00 | 2.00 |
|  | 2,2,4-trimethyl-1,3-pentanediol | 2.00 | — | — | — | — |
| Surfactant | KF-643 | — | — | — | — | — |
|  | Zonyl FS-300 | — | — | — | — | — |
|  | Compound of formula (q) of general formula (2) | — | — | — | — | — |
|  | Surfynol 104E | 1.25 | — | — | — | — |
|  | Softanol EP-7025 | — | 1.25 | 1.50 | 1.50 | 1.50 |
| Antifungal agent | Proxel GXL | 0.05 | 0.05 | 0.05 | 0.05 | 0.05 |
| Foam inhibitor (defoaming agent) | 2,4,7,9-tetramethyldecane-4,7-diol | — | 0.20 | 0.20 | 0.20 | 0.20 |
|  | 2,5,8,11-tetramethyldodecane-5,8-diol | 0.25 | — | — | — | — |
| pH regulator | 2-amino-2-ethyl-1,3-propanediol | 0.20 | 0.40 | 0.25 | 0.25 | 0.25 |
|  | Pure water | balance | balance | balance | balance | balance |
|  | Total (% by mass) | 100 | 100 | 100 | 100 | 100 |

TABLE 5

|  | Ingredient (% by mass) | Pro. Ex, 21 | Pro. Ex, 22 | Pro. Ex, 23 | Pro. Ex, 24 | Pro. Ex, 25 |
|---|---|---|---|---|---|---|
| Water-dispersible colorant (pigment dispersion) | Surface modified black pigment dispersion (1) (Prep. Ex. 1) | 37.50 | — | — | — | — |
|  | Surface modified black pigment dispersion (2) (Prep. Ex. 2) | — | — | — | — | — |
|  | Surface modified magenta pigment dispersion (1) (Prep. Ex. 3) | — | 37.50 | — | — | — |
|  | Surface modified cyan pigment dispersion (1) (Prep. Ex. 4) | — | — | 22.50 | — | — |
|  | Surface modified yellow pigment dispersion (1) (Prep. Ex. 5) | — | — | — | 22.50 | — |
|  | Magenta pigment-containing polymer particle dispersion (Prep. Ex. 6) | — | — | — | — | 50.00 |
|  | Cyan pigment-containing polymer particle dispersion (Prep. Ex. 7) | — | — | — | — | — |
|  | Yellow pigment-containing polymer particle dispersion (Prep. Ex. 8) | — | — | — | — | — |
|  | Carbon black pigment-containing polymer particle dispersion (Prep. Ex. 9) | — | — | — | — | — |
|  | Yellow pigment surfactant dispersion (Prep. Ex. 10) | — | — | — | — | — |
|  | Magenta pigment surfactant dispersion (Prep. Ex. 11) | — | — | — | — | — |
|  | Cyan pigment surfactant dispersion (Prep. Ex. 12) | — | — | — | — | — |
| Water-dispersible resin | Acryl-silicone resin emulsion | 6.27 | 6.27 | 6.27 | 6.27 | — |
|  | Fluororesin emulsion | — | — | — | — | — |
|  | Polyurethane emulsion | — | — | — | — | — |
| Organic solvent represented by formula | Amide compound of structural formula (I-1) | — | — | — | — | — |
|  | Amide compound of structural formula (I-2) | — | — | — | — | — |
|  | Amide compound of structural formula (I-3) | — | — | — | — | — |
|  | Oxetane compound of structural formula (I-1) | — | — | — | — | — |
|  | Oxetane compound of structural formula (II-2) | — | — | — | — | — |
|  | Amide compound of structural formula (1) | — | — | — | — | — |
| Alkyl alkane diol | 3-methyl-1,3-butanediol | — | — | — | — | — |
|  | 3-methyl-1,5-pentanediol | — | — | — | — | — |
| Organic solvent | Propylene glycol | 37.00 | 38.00 | 44.00 | 44.50 | — |
|  | Glycerin | — | — | — | — | 12.00 |
|  | 1,3-butanediol | — | — | — | — | 24.00 |
| Penetrating agent | 2-ethyl-1,3-hexanediol | — | — | — | — | 2.00 |
|  | 2,2,4-trimethyl-1,3-pentanediol | 2.00 | 2.00 | 2.00 | 2.00 | — |
| Surfactant | KF-643 | 1.00 | 1.00 | 1.00 | 1.00 | — |
|  | Zonyl FS-300 | — | 0.50 | 0.50 | 0.50 | — |
|  | Compound of formula (q) of general formula (2) | — | — | — | — | — |
|  | Surfynol 104E | — | — | — | — | — |
|  | Softanol EP-7025 | — | — | — | — | — |
| Antifungal agent | Proxel GXL | 0.05 | 0.05 | 0.05 | 0.05 | 0.05 |
| Foam inhibitor (defoaming agent) | 2,4,7,9-tetramethyldecane-4,7-diol | — | — | — | — | — |
|  | 2'5'8,11-tetramethyldodecane-5,8-diol | 0.10 | 0.10 | 0.10 | 0.10 | — |
| pH regulator | 2-amino-2-ethyl-1,3-propanediol | 0.30 | 0.15 | 0.15 | 0.15 | 0.20 |
|  | Pure water | balance | balance | balance | balance | balance |
|  | Total (% by mass) | 100 | 100 | 100 | 100 | 100 |

TABLE 6

| Ingredient (% by mass) | | Pro. Ex. 26 | Pro. Ex. 27 | Pro. Ex. 28 |
|---|---|---|---|---|
| Water dispersible colorant (pigment dispersion) | Surface modified black pigment dispersion (1) (Prep. Ex. 1) | — | — | — |
| | Surface modified black pigment dispersion (2) (Prep. Ex. 2) | — | — | — |
| | Surface modified magenta pigment dispersion (1) (Prep. Ex. 3) | — | — | — |
| | Surface modified cyan pigment dispersion (1) (Prep. Ex. 4) | — | — | — |
| | Surface modified yellow pigment dispersion (1) (Prep. Ex. 5) | — | — | — |
| | Magenta pigment-containing polymer particle dispersion (Prep. Ex. 6) | — | — | — |
| | Cyan pigment-containing polymer particle dispersion (Prep. Ex. 7) | 30.00 | — | — |
| | Yellow pigment-containing polymer particle dispersion (Prep. Ex. 8) | — | 30.00 | — |
| | Carbon black pigment-containing polymer particle dispersion (Prep. Ex. 9) | — | — | 50.00 |
| | Yellow pigment surfactant dispersion (Prep. Ex. 10) | — | — | — |
| | Magenta pigment surfactant dispersion (Prep. Ex. 11) | — | — | — |
| | Cyan pigment surfactant dispersion (Prep. Ex. 12) | — | — | — |
| Water-dispersible resin | Acryl-silicone resin emulsion | — | — | — |
| | Fluororesin emulsion | — | — | — |
| | Polyurethane emulsion | — | — | — |
| Organic solvent represented by formula | Amide compound of structural formula (I-1) | — | — | — |
| | Amide compound of structural formula (I-2) | — | — | — |
| | Amide compound of structural formula (I-3) | — | — | — |
| | Oxetane compound of structural formula (II-1) | — | — | — |
| | Oxetane compound of structural formula (11-2) | — | — | — |
| | Amide compound of structural formula (1) | — | — | — |
| Alkyl alkane diol | 3-methyl-1,3-butanediol | — | — | 17.00 |
| | 3-methyl-1,5-pentanediol | — | — | — |
| Organic solvent | Propylene glycol | — | — | — |
| | Glycerin | 21.00 | 21.00 | 17.00 |
| | 1,3-butanediol | 21.00 | 21.00 | — |
| Penetrating agent | 2-ethyl-1,3-hexanediol | 2.00 | 2.00 | 1.50 |
| | 2,2,4-trimethyl-1,3-pentanediol | — | — | — |
| Surfactant | KF-643 | — | — | — |
| | Zonyl FS-300 | — | — | — |
| | Compound of formula (q) of general formula (2) | — | — | — |
| | Surnol 104E | — | — | — |
| | Softanol EP-7025 | — | — | — |
| Antifungal agent | Proxel GXL | 0.05 | 0.05 | 0.05 |
| Foam inhibitor (defoaming agent) | 2,4,7,9-tetramethyldecane-4,7-diol | — | — | — |
| | 2,5,8,11-tetramethyldodecane-5,8-diol | — | — | — |
| pH regulator | 2-amino-2-ethyl-1,3-propanediol | 0.20 | 0.20 | 0.30 |
| | Pure water | balance | balance | balance |
| | Total (% by mass) | 100 | 100 | 100 |

The abbreviations in Tables 1 to 6 are as follows.

[Structural Formula (I-1)]

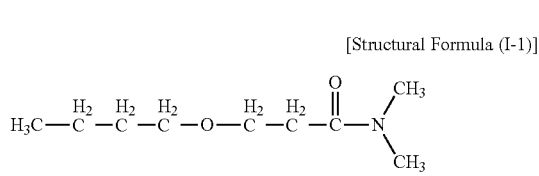

[Structural Formula (I-2)]

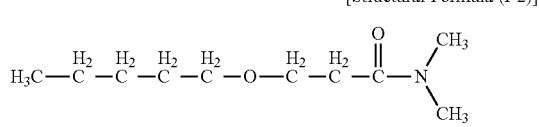

[Structural Formula (I-3)]

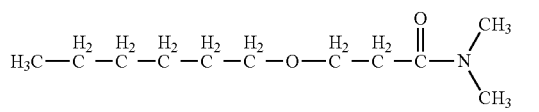

[Structural Formula (II-1)]

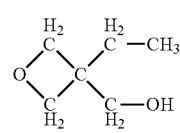

[Structural Formula (II-2)]

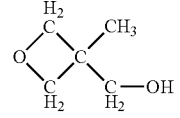

[Amide Compound of Structural Formula (1)]

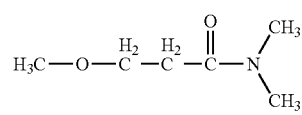

Acryl-silicone resin emulsion: POLYZOL ROY6312 manufactured by Showa Highpolymer Co., Ltd., solid content: 37.2% by mass, the volume average particle diameter: 171 nm, minimum film forming temperature (MFT): 20° C.

Fluororesin Emulsion B: LUMIFLON FE4500, manufactured by ASAHI GLASS CO., LTD., solid content: 50% by mass, the average particle diameter: 160 nm, MFT: 28° C. or lower Polyurethane emulsion: HYDRAN APX-101H, manufactured by DIC Corporation, solid content: 45% by mass, the volume average particle diameter: 160 nm, the minimum film forming temperature (MFT): 20° C.

KF-643: polyether-modified silicone compound (manufactured by Shin-Etsu Chemical Co., Ltd., ingredient: 100% by mass)

Zonyl FS-300: polyoxyethylene perfluoroalkyl ether (manufactured by Du Pont Kabushiki Kaisha, active ingredient: 40% by mass)

Fluorine-based surfactant (the formula (q) of the general formula (2)) $C_6F_{13}$—$CH_2CH(OH)CH_2O$—$(CH_2CH_2O)_{21}$—$C_{12}H_{25}$ Surfynol 104E: an acetylene glycol-based compound (manufactured by Nissin Chemical Industry Co., Ltd., active ingredient: 50% by mass, containing ethylene glycol)

Softanol EP-7025: polyoxyalkylene alkyl ether (manufactured by NIPPON SHOKUBAI CO., LTD., ingredient: 100% by mass)

Proxel GXL: an antifungal agent containing 1,2-benzothiazolin-3-one as a main ingredient (manufactured by Avecia Inc., ingredient: 20% by mass, containing dipropylene glycol)

Next, the physical properties of each of the inkjet recording inks of Production Examples 1 to 28 were measured. The results are presented in Table 7.

<Viscosity>

The viscosity of the ink was measured at 25° C. by means of a viscometer (RE-550L, manufactured by Toki Sangyo Co., Ltd.).

<pH>

The pH of the ink was measured at 25° C. using a pH meter (HM-30R, manufactured by TOA-DKK CORPORATION).

<Static Surface Tension>

The static surface tension of the ink was measured at 25° C. by means of an automatic surface tensiometer (CBVP-Z, manufactured by Kyowa Interface Science Co., Ltd.).

<Dynamic Surface Tension>

The dynamic surface tension as measured by the maximum bubble pressure method with surface lifetime of 15 ms was measured at 25° C. by means of SITA DynoTester (manufactured by SITA Messtechnik).

TABLE 7

| | Physical properties values of ink | | | |
|---|---|---|---|---|
| | Viscosity (mPa·s) | pH | 15 ms dynamic surface tension (mN/m) | Static surface tension (mN/m) |
| Production Ex. 1 | 8.1 | 9.7 | 33.6 | 24.5 |
| Production Ex. 2 | 8.0 | 9.6 | 33.8 | 24.7 |
| Production Ex. 3 | 7.9 | 9.4 | 33.7 | 24.6 |
| Production Ex. 4 | 8.2 | 9.3 | 34.5 | 25.9 |
| Production Ex. 5 | 7.5 | 9.8 | 31.5 | 22.8 |
| Production Ex. 6 | 7.7 | 9.2 | 30.2 | 21.6 |
| Production Ex. 7 | 7.4 | 9.4 | 30.0 | 21.7 |
| Production Ex. 8 | 7.3 | 9.4 | 30.7 | 21.6 |
| Production Ex. 9 | 8.5 | 9.4 | 32.5 | 23.6 |
| Production Ex. 10 | 8.6 | 9.1 | 31.4 | 22.7 |
| Production Ex. 11 | 8.2 | 9.3 | 31.6 | 22.5 |
| Production Ex. 12 | 8.3 | 9.2 | 31.5 | 22.8 |
| Production Ex. 13 | 8.2 | 9.5 | 29.8 | 24.9 |
| Production Ex. 14 | 8.0 | 9.3 | 29.3 | 24.2 |

TABLE 7-continued

| | Physical properties values of ink | | | |
|---|---|---|---|---|
| | Viscosity (mPa·s) | pH | 15 ms dynamic surface tension (mN/m) | Static surface tension (mN/m) |
| Production Ex. 15 | 7.8 | 9.6 | 29.7 | 24.4 |
| Production Ex. 16 | 7.9 | 9.5 | 29.4 | 24.2 |
| Production Ex. 17 | 8.4 | 9.7 | 37.9 | 31.8 |
| Production Ex. 18 | 8.5 | 9.4 | 37.1 | 30.9 |
| Production Ex. 19 | 8.4 | 9.4 | 36.5 | 30.5 |
| Production Ex. 20 | 8.5 | 9.3 | 37.0 | 30.7 |
| Production Ex. 21 | 8.5 | 9.6 | 33.6 | 24.7 |
| Production Ex. 22 | 8.4 | 9.5 | 34.0 | 24.6 |
| Production Ex. 23 | 8.3 | 9.4 | 33.9 | 24.7 |
| Production Ex. 24 | 8.6 | 9.2 | 34.4 | 25.9 |
| Production Ex. 25 | 7.9 | 9.5 | 40.7 | 31.5 |
| Production Ex. 26 | 7.8 | 9.3 | 40.9 | 32.9 |
| Production Ex. 27 | 7.7 | 9.2 | 38.7 | 32.5 |
| Production Ex. 28 | 8.0 | 9.1 | 41.4 | 32.7 |

Examples 1 to 9 and Comparative Examples 1 to 7

Recording Media

The following recording media (1) to (10) was provided.

(1) OK Top Coat+: offset printing paper manufactured by Oji Paper Co., Ltd., Grade A2

(2) OK Kanefuji+: offset printing paper manufactured by Oji Paper Co., Ltd., Grade A1

(3) SA Kanefuji+: offset printing paper manufactured by Oji Paper Co., Ltd., Grade A0

(4) Aurora Coat: offset printing paper manufactured by NIPPON PAPER INDUSTRIES CO., LTD., Grade A2

(5) Super MI Dull: offset printing paper manufactured by NIPPON PAPER INDUSTRIES CO., LTD., Grade A2

(6) Ricoh Business Coat Gloss 100: gel jet paper manufactured by Ricoh Company Limited, Grade A2

(7) Space DX: gravure printing sheet manufactured by NIPPON PAPER INDUSTRIES CO., LTD.

(8) Mirror Coat Platinum: offset printing paper, cast coating paper, manufactured by Oji Paper Co., Ltd.

(9) Super Fine Paper: inkjet paper, manufactured by Seiko Epson Corporation

(10) Type6200: PPC paper, manufactured by Ricoh Company Limited

The grades mentioned in the (1) to (5) are as follows. The coated paper is paper, in which a base, wood free paper or wood containing paper, is coated with a coating. The coated paper can be classified as depicted in the following table 8, depending on paper used for the base, and the coating weight. Moreover, art paper is classified as Grade A1 or A0 in view of glossiness and smoothness, other than the coating weight.

TABLE 8

| Name | Paper for base | Coating weight | Main use |
|---|---|---|---|
| Fine coating paper | Wood free paper/wood containing paper | About 5 g/m² | Flyers etc. |
| Lightweight coated (A3 coated) paper | Wood free paper/wood containing paper | About 10 g/m² | Article or color pages of magazines, flyers etc. |

TABLE 8-continued

| Name | Paper for base | Coating weight | Main use |
|---|---|---|---|
| Coated (A2 coated) paper | Wood free paper/wood containing paper | About 15 g/m² | Posters, catalogs, calendars, etc. |
| Art (A1 coated) paper | Wood free paper | About 20 g/m² | Calendars, high quality art printing, etc. |

As for A0 coating (super art), those having better glossiness and smoothness than A1 coating, although the coating weight thereof in the both sides is 40 g/m² and is the same as the A1 coating, are classified.

The recording media (1) to (10) was subjected to the measurement of a transferred amount of pure water in the following manner. The results are presented in Table 9-1.

<Measurement of Transfer Amount of Pure Water by Dynamic Scanning Absorptometer>

An pure water absorption curve of each of the recording media (1) to (10) was measured by means of a dynamic scanning absorptometer (KM500win type, manufactured by Kumagai Riki Kogyo Co., Ltd.). As for the absorption curve, a transfer amount (mL/m²) and a square root of contact time √(ms) were plotted to draw a straight line having a constant slope. From the curve, the transfer amount pure water at the contact time of 100 ms was determined by an interpolation method.

<Surface Modification Treatment (Corona Discharge Treatment or Plasma Treatment)>

As for a surface modification treatment of the recording medium, a corona discharge treatment or a plasma treatment was carried out as follows at the throughput rate as depicted in Table 9-2.

(1) Corona Discharge Treatment

The surface modification treatment was carried out by means of a corona surface modification evaluation device TEC-4AX, manufactured by KASUGA ELECTRIC WORKS LTD.

(2) Plasma Treatment

The surface modification treatment was carried out by means of a plasma shower irradiation device PS-601SW, manufactured by Asakusa Machinery Co., Ltd.

<Image Formation (Inkjet Step)>

Next, an inkjet recording device (IPSIO GXe-5500, manufactured by Ricoh Company Limited) was set using the inkjet recording ink indicated in the column of each Production Example, under the environmental conditions controlled to be the temperature of 23° C.±0.5° C., and the relative humidity of 50%±5% in the following manner. The driving voltage of a piezo element was varied to give the same ejecting amount of the ink, so that the same amount of the ink is deposited onto a recording medium (sheet), which had been pre-treated with corona discharge or plasma. Then, image formation was carried out using a combination depicted in Table 9-2 by setting the printing mode of the inkjet recording device to "glossy paper_high image quality."

Note that, as illustrated in FIGS. 6 to 8, a surface modification unit is mounted in the image forming device to constitute as an integrated image forming device. The same effects as in Examples could be attained by using such an integrated image forming device.

TABLE 9-1

| | Paper | Manufacturer | Use | Grade | Paper quality Water transfer amount (ml/m²) 100 ms |
|---|---|---|---|---|---|
| Ex. 1 | OK Top Coat+ | Oji Paper | Offset printing | A2 | 3 |
| Ex. 2 | OK Top Coat+ | Oji Paper | Offset printing | A2 | 3 |
| Ex. 3 | OK Top Coat+ | Oji Paper | Offset printing | A2 | 3 |
| Ex. 4 | OK Kanafuji+ | Oji Paper | Offset printing | A1 | 1.9 |
| Ex. 5 | SA Kanafuji+ | Oji Paper | Offset printing | A0 | 1.9 |
| Ex. 6 | Aurora Coat | Nippon Paper | Offset printing | A2 | 2.8 |
| Ex. 7 | Super MI Dull | Nippon Paper | Offset printing | A2 | 7 |
| Ex. 8 | Ricoh Business Coat Gloss100 | Ricoh | Gel jet paper | A2 | 5.8 |
| Ex. 9 | Space DX | Nippon Paper | Gravure printing | — | 9.9 |
| Comp. Ex. 1 | OK Top Coat+ | Oji Paper | Offset printing | A2 | 3 |
| Comp. Ex. 2 | OK Top Coat+ | Oji Paper | Offset printing | A2 | 3 |
| Comp. Ex. 3 | OK Top Coat+ | Oji Paper | Offset printing | A2 | 3 |
| Comp. Ex. 4 | Mirror Coat Platinum | Oji Paper | Offset printing | Cast coating paper | 0.2 |
| Comp. Ex. 5 | Type6200 | Ricoh | PPC paper | — | 11.5 |
| Comp. Ex. 6 | OK Top Coat+ | Oji Paper | Offset printing | A2 | 3 |
| Comp. Ex. 7 | OK Top Coat+ | Oji Paper | Offset printing | A2 | 3 |

The transfer amount of pure water is an value determined before surface modifying the recording medium through a corona discharge treatment or a plasma treatment.

TABLE 9-2

| | Surface modification treatment (corona discharge or plasma treatment) | | Inkjet step (Image formation) | |
|---|---|---|---|---|
| | Treatment method | Throughput rate (W · min/m²) | Ink set | GXe5500 printing mode |
| Ex. 1 | corona | 200 | Production Ex. 1-4 | glossy paper_high image quality |
| Ex. 2 | corona | 100 | Production Ex. 5-8 | glossy paper_high image quality |
| Ex. 3 | plasma | 30 | Production Ex. 9-12 | glossy paper_high image quality |
| Ex. 4 | plasma | 100 | Production Ex. 13-16 | glossy paper_high image quality |
| Ex. 5 | plasma | 200 | Production Ex. 9-12 | glossy paper_high image quality |
| Ex. 6 | corona | 500 | Production Ex. 9-12 | glossy paper_high image quality |
| Ex. 7 | plasma | 100 | Production Ex. 9-12 | glossy paper_high image quality |
| Ex. 8 | corona | 100 | Production Ex. 9-12 | glossy paper_high image quality |
| Ex. 9 | corona | 100 | Production Ex. 9-12 | glossy paper_high image quality |
| Comp. Ex. 1 | NA | NA | Production Ex. 1-4 | glossy paper_high image quality |
| Comp. Ex. 2 | NA | NA | Production Ex. 9-12 | glossy paper_high image quality |
| Comp. Ex. 3 | plasma | 100 | Production Ex. 17-20 | glossy paper_high image quality |
| Comp. Ex. 4 | corona | 100 | Production Ex. 1-4 | glossy paper_high image quality |
| Comp. Ex. 5 | corona | 50 | Production Ex. 13-16 | glossy paper_high image quality |
| Comp. Ex. 6 | corona | 100 | Production Ex. 21-24 | glossy paper_high image quality |
| Comp. Ex. 7 | corona | 100 | Production Ex. 25-28 | glossy paper_high image quality |

Next, Examples 1 to 9 and Comparative Examples 1 to 7 were evaluated in terms of image density, drying performance (Spur Smear), beading, and color bleeding between different colors in the following manners. The results are presented in Table 10.

Note that, a judgment of the evaluation was performed on each color based on the evaluation criteria. Then, the most common judgment result was described as the result of each image quality item for the evaluation. In the case where the same numbers of the judgment results were attained in each evaluation item, the better result was described as the judgment result.

<Image Density>

A chart including a 64-point symbol "black square" produced using Microsoft Word 2000 (of Microsoft) was printed on each recording medium.

The color in the "black square" portions on a printed surface was measured by X-Rite939, and the result was evaluated based on the following evaluation criteria. As for the printing mode, "glossy paper_high image quality" mode was changed to the "no color correction" mode by using a driver that accompanied a printer. Note that, the "black square" is a symbol that is a square filled in black, but it is unavoidably described as "black square" as the symbol itself cannot be used here.

[Evaluation Criteria]
A: (Black) 2.0 or greater,
   (Yellow) 1.25 or greater,
   (Magenta) 2.0 or greater, or
   (Cyan) 2.0 or greater
B: (Black) 1.9 or greater but less than 2.0,
   (Yellow) 1.2 or greater but less than 1.25,
   (Magenta) 1.9 or greater but less than 2.0, or
   (Cyan) 1.9 or greater but less than 2.0
C: (Black) 1.8 or greater but less than 1.9,
   (Yellow) 1.15 or greater but less than 1.2,
   (Magenta) 1.8 or greater but less than 1.9, or
   (Cyan) 1.8 or greater but less than 1.9
D: (Black) less than 1.8,
   (Yellow) less than 1.15,
   (Magenta) less than 1.8, or
   (Cyan) less than 1.8

<Drying Performance (Spur Smear)>

The chart was printed out on each recording medium in the same manner as in the evaluation of the image density. Just after the printing, a spur was brought into contact with the print, and the smear formed by transferring the ink deposited on the spur onto the background area of the recording medium was visually evaluated. The spur smear mark was evaluated as drying performance, and the results were evaluated with ranks based on the following criteria. Note that, the evaluation was performed on a black ink that had the worst drying performance among all the color inks.

[Evaluation Criteria]
I, Rank 1: Clearly observed
II, Rank 2: Slightly observed
III, Rank 3: No mark at all <Beading>

Solid images of cyan, magenta, and green were printed on each recording medium, and dried with warm air. The density unevenness (bleeding) of the solid image was observed, and judged based on the following evaluation criteria. The evaluation was performed on cyan, magenta, and green, which had the worst beading amount all the colors.

[Evaluation]
A: No density unevenness at all
B: Slight density unevenness
C: Noticeable density unevenness
D: Significant density unevenness <Color Bleeding Between Colors>

On each recording medium, a yellow solid image, and, on the yellow solid image, a 0.5 mm line image of each of magenta, cyan, and black were formed. Blurring formed at an interface of colors when recording liquids of different colors were deposited next to each other was visually observed. Similarly, occurrences of blurring at an interface of colors, in the case where 0.5 mm line images of magenta, yellow, and black were formed in a cyan solid image and the case where 0.5 mm line images of cyan, yellow, and black were formed in a magenta solid image, were also observed. Note that, similarly to the beading, the color bleeding was evaluated on the combination that had the worst bleeding.

[Evaluation Criteria]
A: No problem
B: Blurring slightly occurred, but no problem.
C: Blurring was confirmed, but it was at the acceptable level.
D: Blurring occurred, which was problematic.

TABLE 10

| | Image Density | Drying performance (Spur Smear) | Beading | Color bleeding between colors |
|---|---|---|---|---|
| Ex. 1 | A | III | B | A |
| Ex. 2 | A | III | A | A |
| Ex. 3 | A | III | A | A |
| Ex. 4 | A | III | A | A |
| Ex. 5 | A | III | A | A |
| Ex. 6 | A | III | A | A |
| Ex. 7 | A | III | A | A |
| Ex. 8 | A | III | A | A |
| Ex. 9 | A | III | A | A |
| Comp. Ex. 1 | A | I | C | D |
| Comp. Ex. 2 | A | II | C | C |
| Comp. Ex. 3 | A | II | C | D |
| Comp. Ex. 4 | A | II | C | D |
| Comp. Ex. 5 | D | III | B | B |
| Comp. Ex. 6 | D | III | B | B |
| Comp. Ex. 7 | D | II | C | C |

The embodiments of the present invention are, for example, as follows:

<1> An inkjet recording method, including:
applying stimuli to an inkjet recording ink to make the inkjet recording ink jet onto a recording medium to thereby form an image,
wherein the recording medium contains a support, and a surface layer provided on at least one surface of the support, where a transfer amount of pure water with contact time of 100 ms determined by measuring the surface of the recording medium to which the surface layer is provided by means of a dynamic scanning absorptometer is 1 mL/m² to 10 mL/m²,
wherein the recording medium is surface treated through a corona discharge treatment, or a plasma treatment,
wherein the inkjet recording ink contains a water-dispersible colorant, an organic solvent, a surfactant, and water,
wherein the organic solvent contains at least one polyhydric alcohol, which has an equilibrium moisture content of 30% by mass or greater at temperature of 23° C. and relative humidity of 80%, and
wherein a dynamic surface tension of the inkjet recording ink, as measured by a maximum bubble pressure method with surface lifetime of 15 ms, is 35 mN/m or lower at 25° C.

<2> The inkjet recording method according to <1>, wherein the organic solvent contains at least one selected from compounds represented by the following general formulae (I) and (II):

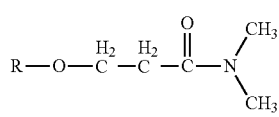

<General Formula (I)> where R is a C4-C6 alkyl group,

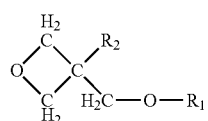

<General Formula (II)> where $R_1$ is a hydrogen atom, a C1-C8 alkyl group, a cyclohexyl group, or an aryl group, and $R_2$ is a methyl group or an ethyl group.

<3> The inkjet recording method according to any of <1> or <2>, wherein the inkjet recording ink contains a compound represented by the following structural formula (1):

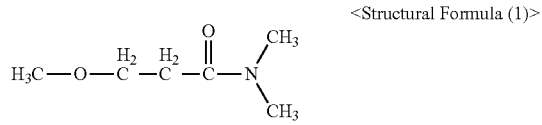

<Structural Formula (1)>

<4> The inkjet recording method according to any one of <1> to <3>, wherein the polyhydric alcohol is glycerin, or 1,3-butanediol, or both.

<5> The inkjet recording method according to any one of <1> to <4>, wherein the water-dispersible colorant is a resin-coated pigment or a self-dispersible pigment, and is anionic.

<6> The inkjet recording method according to any one of <1> to <5>, wherein the surfactant is at least one selected from the group consisting of a silicone-based surfactant, a fluorine-based surfactant, and an acetylene alcohol-based surfactant.

<7> The inkjet recording method according to any one of <1> to <6>, wherein a throughput rate of the corona discharge treatment or the plasma treatment is 50 W·min/m² to 500 W·min/m².

<8> An inkjet recording device, including:
a surface treatment unit configured to perform a surface treatment on a recording medium through a corona discharge treatment, or a plasma treatment; and
an inkjet unit configured to apply stimuli to an inkjet recording ink to make the inkjet recording ink jet onto the recording medium to thereby form an image,
wherein the recording medium contains a support, and a surface layer provided on at least one surface of the support, where a transfer amount of pure water with contact time of 100 ms determined by measuring the surface of the recording medium to which the surface layer is provided by means of a dynamic scanning absorptometer is 1 mL/m² to 10 mL/m²,
wherein the inkjet recording ink contains a water-dispersible colorant, an organic solvent, a surfactant, and water,
wherein the organic solvent contains at least one polyhydric alcohol, which has an equilibrium moisture content of 30% by mass or greater at temperature of 23° C. and relative humidity of 80%, and
wherein a dynamic surface tension of the inkjet recording ink, as measured by a maximum bubble pressure method with surface lifetime of 15 ms, is 35 mN/m or lower at 25° C.

<9> An inkjet recording device, including:
an inkjet unit configured to apply stimuli to an inkjet recording ink to make the inkjet recording ink jet onto a recording medium to thereby form an image,
wherein the recording medium contains a support, and a surface layer provided on at least one surface of the support, where a transfer amount of pure water with contact time of 100 ms determined by measuring the surface of the recording medium to which the surface layer is provided by means of a dynamic scanning absorptometer is 1 mL/m² to 10 mL/m²,
wherein the recording medium is surface treated through a corona discharge treatment, or a plasma treatment, or both,
wherein the inkjet recording ink contains a water-dispersible colorant, an organic solvent, a surfactant, and water,
wherein the organic solvent contains at least one polyhydric alcohol, which has an equilibrium moisture content of 30% by mass or greater at temperature of 23° C. and relative humidity of 80%, and wherein a dynamic surface tension of the inkjet recording ink, as measured by a maximum bubble pressure method with surface lifetime of 15 ms, is 35 mN/m or lower at 25° C.

This application claims priority to Japanese application No. 2013-161538, filed on Aug. 2, 2013 and Japanese application No. 2014-143246, filed on Jul. 11, 2014, and incorporated herein by reference.

What is claimed is:

1. An inkjet recording method, comprising:

applying stimuli to an inkjet recording ink to make the inkjet recording ink jet onto a recording medium to thereby form an image, wherein the recording medium contains a support, and a surface layer provided on at least one surface of the support, where a transfer amount of pure water with contact time of 100 ms determined by measuring the surface of the recording medium to which the surface layer is provided by means of a dynamic scanning absorptometer is 1 mL/m² to 10 mL/m², wherein the recording medium is surface treated through a corona discharge treatment, or a plasma treatment, wherein the inkjet recording ink contains a water-dispersible colorant, an organic solvent, a surfactant, and water, wherein the organic solvent contains at least one polyhydric alcohol, which has an equilibrium moisture content of 30% by mass or greater at temperature of 23° C. and relative humidity of 80%, and wherein a dynamic surface tension of the inkjet recording ink, as measured by a maximum bubble pressure method with surface lifetime of 15 ms, is 35 mN/m or lower at 25° C.

2. The inkjet recording method according to claim 1, wherein the organic solvent contains at least one selected from compounds represented by the following general formulae (I) and (II):

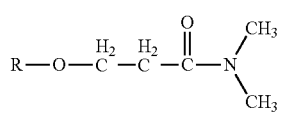

<General Formula (I)> where R is a C4-C6 alkyl group,

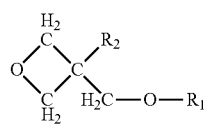

<General Formula (II)> where $R_1$ is a hydrogen atom, a C1-C8 alkyl group, a cyclohexyl group, or an aryl group, and $R_2$ is a methyl group or an ethyl group.

3. The inkjet recording method according to claim 1, wherein the inkjet recording ink contains a compound represented by the following structural formula (1):

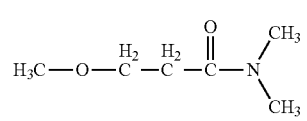

<Structural Formula (1)>

4. The inkjet recording method according to claim 1, wherein the polyhydric alcohol is glycerin, or 1,3-butanediol, or both.

5. The inkjet recording method according to claim 1, wherein the water-dispersible colorant is a resin-coated pigment or a self-dispersible pigment, and is anionic.

6. The inkjet recording method according to claim 1, wherein the surfactant is at least one selected from the group consisting of a silicone-based surfactant, a fluorine-based surfactant, and an acetylene alcohol-based surfactant.

7. The inkjet recording method according to claim 1, wherein a throughput rate of the corona discharge treatment or the plasma treatment is 50 W·min/m² to 500 W·min/m².

8. An inkjet recording device, comprising:

a surface treatment unit configured to perform a surface treatment on a recording medium through a corona discharge treatment, or a plasma treatment; and an inkjet unit configured to apply stimuli to an inkjet recording ink to make the inkjet recording ink jet onto the recording medium to thereby form an image, wherein the recording medium contains a support, and a surface layer provided on at least one surface of the support, where a transfer amount of pure water with contact time of 100 ms determined by measuring the surface of the recording medium to which the surface layer is provided by means of a dynamic scanning absorptometer is 1 mL/m² to 10 mL/m², wherein the inkjet recording ink contains a water-dispersible colorant, an organic solvent, a surfactant, and water, wherein the organic solvent contains at least one polyhydric alcohol, which has an equilibrium moisture content of 30% by mass or greater at temperature of 23° C. and relative humidity of 80%, and wherein a dynamic surface tension of the inkjet recording ink, as measured by a maximum bubble pressure method with surface lifetime of 15 ms, is 35 mN/m or lower at 25° C.

9. An inkjet recording device, comprising:

an inkjet unit configured to apply stimuli to an inkjet recording ink to make the inkjet recording ink jet onto a recording medium to thereby form an image, wherein the recording medium contains a support, and a surface layer provided on at least one surface of the support, where a transfer amount of pure water with contact time of 100 ms determined by measuring the surface of the recording medium to which the surface layer is provided by means of a dynamic scanning absorptometer is 1 mL/m² to 10 mL/m², wherein the recording medium is surface treated through a corona discharge treatment, or a plasma treatment, or both, wherein the inkjet recording ink contains a water-dispersible colorant, an organic solvent, a surfactant, and water, wherein the organic solvent contains at least one polyhydric alcohol, which has an equilibrium moisture content of 30% by mass or greater at temperature of 23° C. and relative humidity of 80%, and wherein a dynamic surface tension of the inkjet recording ink, as measured by a maximum bubble pressure method with surface lifetime of 15 ms, is 35 mN/m or lower at 25° C.

* * * * *